(12) United States Patent
Li et al.

(10) Patent No.: US 11,259,141 B2
(45) Date of Patent: Feb. 22, 2022

(54) POSITIONING ASSISTANCE DATA SENDING METHOD AND SYSTEM, AND DEVICE

(71) Applicant: HUAWEI TECHNOLOGIES CO., LTD., Guangdong (CN)

(72) Inventors: Chenwan Li, Beijing (CN); Yinghui Yu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/778,532

(22) Filed: Jan. 31, 2020

(65) Prior Publication Data
US 2020/0169831 A1 May 28, 2020

Related U.S. Application Data

(63) Continuation of application No. PCT/CN2017/095327, filed on Jul. 31, 2017.

(51) Int. Cl.
H04W 4/02 (2018.01)
H04W 8/22 (2009.01)
(Continued)

(52) U.S. Cl.
CPC ............. H04W 4/02 (2013.01); H04W 8/22 (2013.01); H04W 88/02 (2013.01); H04W 88/08 (2013.01); H04W 88/18 (2013.01)

(58) Field of Classification Search
CPC ..... H04W 76/50; H04W 64/00; H04W 40/02; H04W 64/006; H04W 4/023; H04W 4/02;
(Continued)

(56) References Cited

U.S. PATENT DOCUMENTS 6,823,260 B1   11/2004   Turcotte
7,714,779 B2 *  5/2010   Abraham ............... G01S 19/06
                                                342/357.31
(Continued)

FOREIGN PATENT DOCUMENTS

CN   101877818 A   11/2010
CN   101888587 A   11/2010
(Continued)

OTHER PUBLICATIONS

Enhancing SIP with spatial location for emergency call services . . . by J. Costa-Requena; Haitao Tang . . . Published in: Proceedings Tenth International Conference on Computer Communications and Networks (Cat. No. 01EX495) Oct. 2001 (Year: 2001).*

(Continued)

Primary Examiner — William D Cumming
(74) Attorney, Agent, or Firm — Fish & Richardson P.C.

(57) ABSTRACT

This application relates to the field of communications technologies, and provides example positioning assistance data sending methods, systems, and devices. One example solution includes receiving, by a positioning server, at least one positioning request sent by a core network device, where the positioning request includes an identifier of user equipment (UE) and an identifier of a serving cell of the UE. The positioning server can then send at least one piece of positioning assistance data to a base station based on the at least one positioning request.

9 Claims, 25 Drawing Sheets

(51) Int. Cl.
  *H04W 88/02*   (2009.01)
  *H04W 88/08*   (2009.01)
  *H04W 88/18*   (2009.01)

(58) Field of Classification Search
  CPC ......... H04W 4/06; H04W 48/08; H04W 4/29; H04W 76/40
  USPC ............................ 455/404.1, 411, 433, 456.1
  See application file for complete search history.

(56) References Cited

U.S. PATENT DOCUMENTS

| | | | |
|---|---|---|---|
| 8,085,195 B2 * | 12/2011 | Abraham | G01S 19/06 342/357.42 |
| 8,131,290 B2 * | 3/2012 | Lamba | H04W 64/00 455/433 |
| 8,436,769 B2 * | 5/2013 | Huang | G01S 19/05 342/357.42 |
| 10,349,379 B2 * | 7/2019 | Liu | H04W 4/023 |
| 10,638,268 B2 * | 4/2020 | Xing | G01S 5/0215 |
| 10,880,693 B2 * | 12/2020 | Li | H04W 64/00 |
| 2008/0096527 A1 * | 4/2008 | Lamba | G01S 19/05 455/411 |
| 2009/0311987 A1 * | 12/2009 | Edge | H04W 76/50 455/404.1 |
| 2010/0182196 A1 * | 7/2010 | Abraham | H04W 4/02 342/357.42 |
| 2011/0098057 A1 * | 4/2011 | Edge | G01S 5/0236 455/456.1 |
| 2011/0117925 A1 | 5/2011 | Sampath et al. | |
| 2012/0015654 A1 | 1/2012 | Palanki et al. | |
| 2012/0044107 A1 * | 2/2012 | Huang | G01S 19/05 342/357.42 |
| 2012/0252487 A1 * | 10/2012 | Siomina | G01S 5/0205 455/456.1 |
| 2014/0113608 A1 | 4/2014 | Wirola et al. | |
| 2015/0018010 A1 | 1/2015 | Fischer | |
| 2018/0267134 A1 * | 9/2018 | Xing | H04W 4/02 |
| 2018/0310275 A1 * | 10/2018 | Liu | H04W 64/006 |
| 2019/0239031 A1 * | 8/2019 | Li | H04W 64/00 |
| 2020/0084586 A1 * | 3/2020 | Ryden | H04W 76/40 |
| 2020/0154242 A1 * | 5/2020 | Yu | H04W 4/06 |
| 2020/0169831 A1 * | 5/2020 | Li | H04W 4/02 |
| 2020/0229072 A1 * | 7/2020 | Li | H04W 48/08 |
| 2020/0314795 A1 * | 10/2020 | Wakabayashi | H04W 64/00 |

FOREIGN PATENT DOCUMENTS

| | | | | |
|---|---|---|---|---|
| CN | 102164340 A | 8/2011 | | |
| CN | 102405420 A | 4/2012 | | |
| CN | 103765927 A | 4/2014 | | |
| CN | 105393612 A | 3/2016 | | |
| CN | 105827840 A | 8/2016 | | |
| CN | 106604390 A | 4/2017 | | |
| EP | 3648482 A1 * | 5/2020 | ............ | G01S 19/48 |
| JP | 2008175824 A | 7/2008 | | |
| JP | 2012524906 A | 10/2012 | | |
| JP | 2014502477 A | 1/2014 | | |
| JP | 2014529968 A | 11/2014 | | |
| KR | 20140053420 A | 5/2014 | | |
| WO | 2013033464 A2 | 3/2013 | | |
| WO | WO-2018058948 A1 * | 4/2018 | ............ | G01S 19/05 |
| WO | WO2018141087 A1 * | 8/2018 | | |

OTHER PUBLICATIONS

LTE location technologies and delivery solutions by Suma S. Cherian, Ashok N. Rudrapatna Published in: Bell Labs Technical Journal (vol. 18, Issue: 2, Sep. 2013) (Year: 2013).*
Yilin Zhao, "Standardization of mobile phone positioning for 3G systems," in IEEE Communications Magazine, vol. 40, No. 7, pp. 108-116, Jul. 2002, doi: 10.1109/MCOM.2002.1018015. Aug. 2002 (Year: 2002).*
3GPP TS 36.355 V14.2.0 (Jun. 2017), "3rd Generation Partnership Project; Technical Specification Group Radio Access Network; Evolved Universal Terrestrial Radio Access (E-UTRA); LTE Positioning Protocol (LPP) (Release 14)," Jun. 2017, 167 pages.
3GPP TS 36.455 V14.2.0 (Jun. 2017), "3rd Generation Partnership Project; Technical Specification Group Radio Access Network; Evolved Universal Terrestrial Radio Access (E-UTRA); LTE Positioning Protocol A (LPPa) (Release 14)," Jun. 2017, 74 pages.
Extended European Search Report issued in European Application No. 17920095.1 dated Apr. 29, 2020, 9 pages.
PCT International Search Report and Written Opinion issued in International Application No. PCT/CN2017/095327 dated Dec. 28, 2017, 21 pages (with English translation).
Office Action issued in Chinese Application No. 201780089707.6 dated Aug. 20, 2020, 21 pages (with English translation).
Office Action issued in Korean Application No. 2020-7004912 dated Mar. 4, 2021, 11 pages (with English translation).
Office Action issued in Japanese Application No. 2020-503749 dated Mar. 23, 2021, 8 pages (with English translation).

* cited by examiner

POSITIONING ASSISTANCE DATA SENDING METHOD AND SYSTEM, AND DEVICE

CROSS-REFERENCE TO RELATED APPLICATIONS

This application is a continuation of International Application No. PCT/CN2017/095327, filed on Jul. 31, 2017, the disclosure of which is hereby incorporated by reference in its entirety.

TECHNICAL FIELD

Embodiments of the present invention relate to the field of communications technologies, and in particular, to a positioning assistance data sending method and system, and a device.

BACKGROUND

With development of communications technologies, the global positioning system (Global Positioning System, GPS) has been applied more widely in recent years. Accordingly, a higher requirement is posed for positioning precision. For example, a requirement for positioning precision in fields such as unmanned aerial vehicles and intelligent driving is increasingly high.

As a new GPS measurement method, a carrier phase difference (Real time kinematic, RTK) technology uses a carrier-phase real-time kinematic difference method and can obtain centimeter-level positioning precision in real time, greatly improving the positioning precision. Specifically, an RTK server may obtain reference data from a reference station, and obtain a rough location of user equipment (User Equipment, UE). Subsequently, the RTK server may obtain RTK-related information (for example, positioning assistance data) of the UE through calculation based on the reference data and the rough location. In this way, the UE may correct the rough location of the UE based on the RTK-related information, to obtain a precise location.

In the prior art, 3GPP rel-15 agreed to support unicast and broadcast of RTK-related information. In this way, positioning precision in the 3rd generation partnership project (3rd Generation Partnership Project, 3GPP) technology can be improved, and spectral efficiency and resource utilization can be improved.

However, in the prior art, whether to send, in unicast mode or in broadcast mode, RTK-related information that supports precise positioning of the UE has not been determined in the 3GPP technology.

SUMMARY

This application provides a positioning assistance data sending method and system, and a device. In a positioning assistance data sending process, this application is specifically applied to a process of switching sending of positioning assistance data from a unicast mode to a broadcast mode, improving positioning precision, spectral efficiency, and resource utilization.

To achieve the foregoing objective, the following technical solutions are used in this application.

According to a first aspect, a positioning assistance data sending method provided in this application may include: receiving, by a positioning server, at least one positioning request sent by a core network device, where the positioning request includes an identifier of user equipment UE and an identifier of a serving cell of the UE; and sending, by the positioning server, at least one piece of positioning assistance data to a base station based on the at least one positioning request.

It should be noted that the positioning assistance data sending method provided in this application may be applied to a positioning system using a 3GPP technology. After receiving the at least one positioning request, the positioning server may send, to the base station, the positioning assistance data of the UE (that is, UE that needs to be positioned) corresponding to the at least one positioning request, so that the base station can broadcast the positioning assistance data. In addition, because positioning assistance data in a cell is the same for UEs in the cell, the positioning server sends the positioning assistance data in broadcast mode, and does not need to separately send same positioning assistance data to the plurality of UEs, so that all of the plurality of UEs can obtain the positioning assistance data. Therefore, the positioning assistance data provided in this application may be sent in broadcast mode, improving resource utilization and spectral efficiency.

With reference to the first aspect, in a first possible implementation, before sending the at least one piece of positioning assistance data to the base station based on the at least one positioning request, the positioning server may further interact with the UE that needs to be positioned, to generate the at least one piece of positioning assistance data. Specifically, before the sending, by the positioning server, at least one piece of positioning assistance data to a base station, the method may further include: receiving, by the positioning server, a first message sent by the UE, where the first message includes at least one of positioning capability indication information, positioning precision indication information, and/or service type indication information of the UE, where the positioning capability indication information is used to indicate a positioning capability of the UE, the positioning precision indication information is used to indicate positioning precision supported by the UE, and the service type indication information is used to indicate a service type supported by the UE.

Provided that UE that needs to be positioned provides one of positioning capability indication information, positioning precision indication information, or service type indication information of the UE, the positioning server can generate corresponding positioning assistance data based on the indication information, making a positioning assistance data generating process more reliable.

With reference to the first possible implementation, in a second possible implementation, the positioning capability supported by the UE includes at least one of a downlink observed time difference of arrival OTDOA method, a real-time carrier phase RTK method, a real-time kinematic pesudorange difference RTD method, a state space representation SSR method, a virtual reference station VRS method, a master auxiliary concept MAC method, an area correction parameter FKP method, and a precise point positioning PPP method.

The positioning capability of the UE provided in this application may support one or more positioning methods. For example, UE may support an RTK method while supporting an OTDOA method. In this way, the UE can be positioned by using both a positioning procedure in the OTDOA method and a positioning procedure in the RTK method, improving positioning precision in a positioning process of the UE.

With reference to the first possible implementation or the second possible implementation, in a third possible implementation, for a first serving cell, the sending, by the positioning server, at least one piece of positioning assistance data to a base station based on the at least one positioning request may include: when a first condition is met for a base station corresponding to the first serving cell, sending, by the positioning server based on an identifier of the first serving cell, the at least one piece of positioning assistance data to the base station corresponding to the first serving cell, where the first condition is any one of the following conditions: the positioning server determines that a quantity of UEs that need to be positioned in the first serving cell is greater than a first threshold; and/or the positioning server determines that a quantity of UEs meeting any positioning capability in the UEs that need to be positioned in the first serving cell is greater than a second threshold; and/or the positioning server determines that a quantity of UEs meeting any supported positioning precision in the UEs that need to be positioned in the first serving cell is greater than a third threshold; and/or the positioning server determines that a quantity of UEs meeting any positioning service type in the UEs that need to be positioned in the first serving cell is greater than a fourth threshold; and/or the positioning server receives first instruction information sent by the core network device, where the first instruction information is used to instruct to send, in broadcast mode, the positioning assistance data to the UEs that need to be positioned in the first serving cell.

It should be noted that, in the positioning assistance data sending method provided in this application, the positioning server can determine whether to send the positioning assistance data in broadcast mode or in unicast mode, provided that the positioning server receives the first instruction information sent by the core network device and obtains one of the positioning capability indication information, the positioning precision indication information, or the service type indication information of the UE that needs to be positioned. In this way, sending of positioning assistance data in a positioning process of UE is switched from a unicast mode to a broadcast mode, reliability of the broadcast mode that is determined to be switched from the unicast mode for sending of the positioning assistance data is relatively high, and resource utilization in a positioning assistance data sending process is improved.

With reference to the third possible implementation, in a fourth possible implementation, the sending, by the positioning server based on an identifier of the first serving cell, the at least one piece of positioning assistance data to the base station corresponding to the first serving cell may include: classifying, by the positioning server, the at least one piece of positioning assistance data based on positioning capabilities and/or positioning precision and/or positioning service types of the UEs that need to be positioned in the first serving cell, to obtain the at least one piece of positioning assistance data of different types; and sending, by the positioning server based on the identifier of the first serving cell, the at least one piece of positioning assistance data of the different types to the base station corresponding to the first serving cell.

It should be noted that, in the positioning assistance data sending method provided in this application, before determining to send the positioning assistance data in unicast mode or in broadcast mode, the positioning server classifies a plurality of pieces of positioning assistance data that are sent by the positioning server into different types, so that the base station can broadcast the positioning assistance data based on the different types. In this way, UE that needs to be positioned can obtain positioning assistance data that is of a corresponding type and that is broadcast by the base station, improving positioning precision of the UE.

With reference to the fourth possible implementation, in a fifth possible implementation, after the sending, by the positioning server based on an identifier of the first serving cell, the at least one piece of positioning assistance data to the base station corresponding to the first serving cell, the method may further include: sending, by the positioning server based on the identifier of the first serving cell, a stop indication message to the base station corresponding to the first serving cell, where the stop indication message is used to indicate that sending of the at least one piece of positioning assistance data to the base station is stopped.

The stop indication message is used to indicate that the positioning server stops sending the at least one piece of positioning assistance data to the base station. In this way, when the positioning server does not need to broadcast positioning assistance data, the positioning server may send the positioning assistance data in unicast mode, so that sending of the positioning assistance data is switched between a broadcast mode and a unicast mode, implementing proper use of resources.

With reference to the fifth possible implementation, in a sixth possible implementation, the sending, by the positioning server, a stop indication message to the base station corresponding to the first serving cell may include: for the base station corresponding to the first serving cell, when a second condition is met, sending, by the positioning server, the stop indication message to the base station corresponding to the first serving cell, where the stop indication message is used to indicate sending of the at least one piece of positioning assistance data to the base station is stopped, and the second condition is any one of the following conditions: the positioning server determines that the quantity of UEs that need to be positioned in the first serving cell is less than or equal to a fifth threshold, where the fifth threshold is less than or equal to the first threshold; and/or the positioning server determines that the quantity of UEs meeting any UE positioning capability in the UEs that need to be positioned in the first serving cell is less than or equal to a sixth threshold, where the sixth threshold is less than or equal to the second threshold; and/or the positioning server determines that the quantity of UEs meeting any supported positioning method in the UEs that need to be positioned in the first serving cell is less than or equal to a seventh threshold, where the seventh threshold is less than or equal to the third threshold; and/or the positioning server determines that the quantity of UEs meeting any positioning service type in the UEs that need to be positioned in the first serving cell is less than or equal to an eighth threshold, where the eighth threshold is less than or equal to the fourth threshold; and/or the positioning server receives second instruction information sent by the core network device, where the second instruction information is used to instruct to stop sending, in broadcast mode, the positioning assistance data to the UEs that need to be positioned in the first serving cell.

In the positioning assistance data sending method provided in this application, the positioning server can switch sending of the positioning assistance data from a broadcast mode to a unicast mode, provided that the positioning server receives the second instruction information sent by the core network device or obtains one of the positioning capability indication information, the positioning precision indication information, or the service type indication information of the UE that needs to be positioned. In this way, when the positioning assistance data does not need to be broadcast, for example, when there are a relatively small quantity of UEs that need to be positioned, the positioning assistance data can be sent in unicast mode, improving resource utilization.

With reference to any one of the first aspect or the foregoing possible implementations, in a seventh possible implementation, before the sending, by the positioning server, at least one piece of positioning assistance data to a base station based on the at least one positioning request, the method may further include: receiving, by the positioning server, a base station location message sent by the base station corresponding to the first serving cell, where the base station location message may include location indication information of the base station corresponding to the first serving cell, and the location indication information of the base station may indicate a location of the base station and a location of the first serving cell; and generating or obtaining, by the positioning server, the positioning assistance data based on the base station location message, the first message of the UE in the first serving cell, and reference data.

In the positioning assistance data sending method provided in this embodiment of the present invention, the positioning assistance data may be generated based on the positioning capability indication information and/or the positioning precision indication information and/or the service type indication information of the UE, the base station location message (that is, the indicated location of the base station and/or the indicated location of the cell), and the reference data. In other words, the positioning assistance data may be obtained by the positioning server by using an RTK technology. That is, positioning precision of the positioning assistance data is relatively high.

With reference to any one of the first aspect or the foregoing possible implementations, in an eighth possible implementation, before the sending, by the positioning server, at least one piece of positioning assistance data to a base station based on the at least one positioning request, the method may further include: sending, by the positioning server, a rough-location request to the UE; receiving, by the positioning server, a rough location sent by the UE; and generating or obtaining, by the positioning server, the positioning assistance data based on the first message of the UE that needs to be positioned in the first serving cell, the rough location, and the reference data.

In the positioning assistance data sending method provided in this embodiment of the present invention, the positioning assistance data is generated based on at least one of the positioning capability indication information, the positioning precision indication information, and/or the service type indication information of the UE that needs to be positioned, the rough location of the UE, and the reference data. In other words, the positioning assistance data provided in this embodiment of the present invention may be obtained by the positioning server by using the RTK technology. That is, positioning precision of the positioning assistance data is relatively high.

According to a second aspect, this application provides a positioning assistance data sending method. The methods include: receiving, by a base station, at least one piece of positioning assistance data sent by a positioning server; and broadcasting, by the base station, the at least one piece of positioning assistance data.

It should be noted that when a network element such as the base station or the positioning server is not connected to UE, the base station sends the at least one piece of positioning assistance data in broadcast mode, so that the UE can obtain the corresponding positioning assistance data. In this way, resource utilization in a UE positioning process can be improved.

With reference to the second aspect, in a first possible implementation, the broadcasting, by the base station, the at least one piece of positioning assistance data may include: for a base station corresponding to a first serving cell, broadcasting, by the base station corresponding to the first serving cell, at least one piece of positioning assistance data of different types With reference to the first possible implementation, in a second possible implementation, before the receiving, by a base station, at least one piece of positioning assistance data sent by a positioning server, the method may further include: receiving, by the base station, a positioning notification message sent by a core network device, where the positioning notification message includes a positioning request, and the positioning request includes an identifier of the UE and an identifier of a serving cell of the UE; and sending, by the base station, the positioning notification message to the UE that needs to be positioned.

The positioning notification message includes one or more positioning requests, and the one or more positioning requests may include different identifiers of the UE and identifiers of the serving cell of the UE. Therefore, when the base station subsequently receives the at least one piece of positioning assistance data, a specific cell, for example, the first serving cell, is identified based on the different identifiers of the UE and the identifiers of the serving cell of the UE. In addition, when a positioning request is initiated on a network side for the UE that needs to be positioned, after receiving a positioning message sent by the base station, the UE can be precisely positioned based on the positioning assistance data broadcast by the base station.

With reference to any one of the second aspect or the foregoing possible implementations, in a third possible implementation, after the receiving, by a base station, at least one piece of positioning assistance data sent by a positioning server, the method may further include: sending, by the base station, a first change paging message to first UE, where the first change paging message carries change indication information used to indicate that a system message related to first positioning assistance data changes, and the first UE is UE that needs to be positioned in the first serving cell.

In the method provided in this application, when the positioning assistance data is sent in broadcast mode, after sending the change paging message, the base station may instruct the UE that needs to be positioned to start to receive the corresponding positioning assistance data broadcast by the base station. In this way, spectral efficiency and resource utilization in a positioning process of the UE that needs to be positioned can be improved.

With reference to any one of the second aspect or the foregoing possible implementations, in a fourth possible implementation, the base station may send a base station location message to the positioning server, where the base station location message may include location indication information of the base station corresponding to the first serving cell, and the location indication information of the base station may indicate a location of the base station and/or a location of the first serving cell. For specific descriptions of this implementation, refer to related descriptions in the seventh possible implementation of the first aspect. Details are not described again in this application.

According to a third aspect, this application provides a positioning assistance data sending method. The method includes: sending, by a core network device, at least one positioning request to a positioning server, where each of the at least one positioning request includes an identifier of UE and an identifier of a serving cell of the UE; and sending, by the core network device, first instruction information to the positioning server when a first condition is met, where the first instruction information is used to instruct to send, in broadcast mode, positioning assistance data to UE that needs to be positioned in the first serving cell, and the first condition is any one of the following conditions: the core network device determines that a quantity of UEs that need to be positioned in the first serving cell is greater than a first threshold, and/or the core network device determines that a quantity of UEs meeting any UE positioning capability in the UEs that need to be positioned in the first serving cell is greater than a second threshold; and/or the core network device determines that a quantity of UEs meeting any supported positioning precision in the UEs that need to be positioned in the first serving cell is greater than a third threshold; and/or the core network device determines that a quantity of UEs meeting any positioning service type in the UEs that need to be positioned in the first serving cell is greater than a fourth threshold.

In the positioning assistance data sending method provided in this application, both the positioning server and the core network device can determine whether the at least positioning assistance data is sent in broadcast mode or in unicast mode. Therefore, even if either the positioning server or the core network device cannot determine switching to the broadcast mode or the unicast mode, the other can perform the determining, so that the switching between the broadcast mode and the unicast mode that are used for the positioning assistance data is more reliable.

With reference to the third aspect, in a first possible implementation, after the sending, by the core network device, first instruction information to the positioning server, the method may further include: sending, by the core network device, second instruction information to the positioning server, where the second instruction information is used to instruct to stop sending, in broadcast mode, the positioning assistance data to the UEs in the first serving cell.

With reference to the first possible implementation, in a second possible implementation, the sending, by the core network device, second instruction information to the positioning server may include: sending, by the core network device, the second instruction information to the positioning server when a second condition is met. In this application, the second condition that the core network device meets is any one of the following conditions: the core network device determines that the quantity of UEs that need to be positioned in the first serving cell is less than or equal to a fifth threshold, where the fifth threshold is less than or equal to the first threshold; and/or the core network device determines that the quantity of UEs meeting any UE positioning capability in the UEs that need to be positioned in the first serving cell is less than or equal to a sixth threshold, where the sixth threshold is less than or equal to the second threshold; and/or the core network device determines that the quantity of UEs meeting any supported positioning method in the UEs that need to be positioned in the first serving cell is less than or equal to a seventh threshold, where the seventh threshold is less than or equal to the third threshold; and/or the core network device determines that the quantity of UEs meeting any positioning service type in the UEs that need to be positioned in the first serving cell is less than or equal to an eighth threshold, where the eighth threshold is less than or equal to the fourth threshold. For specific descriptions of the second condition for sending the second instruction information by the core network device to the positioning server in this application, refer to related descriptions of the second condition in the first aspect. Details are not described herein again.

With reference to the first possible implementation, in a second possible implementation, before the sending, by a core network device, at least one positioning request to a positioning server, the method may further include: sending, by the core network device, a positioning notification message to a base station, where the positioning notification message carries the positioning request. For specific descriptions of "sending, by the core network device, a positioning notification message to a base station" in this application, refer to related descriptions in the second possible implementation of the second aspect. Details are not described again in this application.

According to a fourth aspect, this application provides a positioning assistance data sending method. The method includes: obtaining, by first UE, first positioning assistance data broadcast by a base station corresponding to a first serving cell, where the first positioning assistance data is used by the first UE to obtain a precise location through calculation, or the first positioning assistance data is used by the first UE to perform positioning measurement, and the first UE is UE that needs to be positioned in the first serving cell.

It should be noted that, in the positioning assistance data sending method provided in this application, the UE that needs to be positioned may obtain the positioning assistance data broadcast by the base station, and the positioning assistance data may be obtained by using an RTK technology. For example, the positioning assistance data may be obtained by a positioning server based on a rough location of the UE, positioning capability indication information of the UE, and reference data. Therefore, positioning precision of a precise location, of the UE, obtained by the UE that needs to be positioned based on the positioning assistance data is relatively high. In addition, because the positioning assistance data may be sent in broadcast mode, in a process in which the UE that needs to be positioned obtains the precise location of the UE, resource utilization is relatively high.

With reference to the fourth aspect, in a first possible implementation, before the obtaining, by first UE, first positioning assistance data broadcast by a base station corresponding to a first serving cell, the method may further include: sending, by the first UE, a first message of the first UE to the positioning server, where the first message of the first UE includes at least one of positioning capability indication information of the first UE, positioning method indication information of the first UE, or service type indication information of the first UE, where the positioning capability indication information is used to indicate a positioning capability of the UE, the positioning precision indication information is used to indicate positioning precision supported by the UE, and the service type indication information is used to indicate a service type supported by the UE. Herein in this application, for specific descriptions of "sending, by the first UE, a first message of the first UE to the positioning server", refer to related descriptions in the first possible implementation of the first aspect. Details are not described again in this application.

With reference to the first possible implementation, in a second possible implementation, the positioning capability supported by the UE includes at least one of an OTDOA method, an RTK method, an RTD method, an SSR method, a VRS method, a MAC method, an FKP method, or a PPP method.

With reference to the second possible implementation, in a third possible implementation, before the obtaining, by first UE, first positioning assistance data broadcast by a base station corresponding to a first serving cell, the method may further include: receiving, by the first UE, a first change paging message sent by the base station corresponding to the first serving cell, where the first change paging message carries change indication information used to indicate that a system message related to the first positioning assistance data changes. The first UE is UE served by the first serving cell, and the first UE corresponds to the first positioning assistance data.

It should be noted that, when the positioning assistance data is sent in broadcast mode, before the UE that needs to be positioned obtains the positioning assistance data of the UE, the UE may not receive a message from another network element. After receiving the change paging message sent by the base station, the UE starts to receive the corresponding positioning assistance data broadcast by the base station. In this way, spectral efficiency and resource utilization in a positioning process of the UE that needs to be positioned can be improved.

With reference to the third possible implementation, in a fourth possible implementation, after the obtaining, by first UE, first positioning assistance data broadcast by a base station corresponding to a first serving cell, the method may further include: receiving, by the first UE, a first positioning paging message sent by the base station corresponding to the first serving cell, where the first positioning paging message carries positioning request indication information.

It should be noted that, because the first UE can obtain, before establishing a connection to a core network device or the base station, the first positioning assistance data broadcast by the base station, the first UE can be precisely positioned based on the first positioning assistance data before connecting to the core network device or the base station, improving spectral efficiency and resource utilization.

With reference to the fourth possible implementation, in a fifth possible implementation, after the obtaining, by first UE, first positioning assistance data broadcast by a base station corresponding to a first serving cell, the method may further include: sending, by the first UE, a first assistance data request message to the positioning server, where the first assistance data request message carries additional request indication information used to request additional first positioning assistance information.

In the positioning assistance data sending method provided in this application, the UE that needs to be positioned may obtain, based on positioning precision required by the UE, the positioning assistance data of the UE and one or more pieces of additional positioning assistance data that are generated on the positioning server. In this way, positioning precision in a positioning process of the UE that needs to be positioned can be improved to meet the positioning precision required by the UE.

With reference to the fourth possible implementation, in a sixth possible implementation, the first UE receives a rough-location request sent by the positioning server, and the first UE sends a rough location to the positioning server. The first UE is UE that needs to be positioned in the first serving cell. For specific descriptions of this implementation, refer to related descriptions in the eighth possible implementation of the first aspect. Details are not described again in this application.

According to a fifth aspect, this application provides a positioning server. The positioning server includes a receiving module and a sending module. The receiving module is configured to receive at least one positioning request sent by a core network device, where the positioning request includes an identifier of UE and an identifier of a serving cell of the UE. The sending module is configured to send at least one piece of positioning assistance data to a base station based on the at least one positioning request received by the receiving module.

With reference to the fifth aspect, in a first possible implementation, the receiving module is further configured to: before the sending module sends the at least one piece of positioning assistance data to the base station based on the at least one positioning request received by the receiving module, receive a first message sent by UE that needs to be positioned in a first serving cell, where the first message includes at least one of positioning capability indication information, positioning precision indication information, and/or service type indication information of the UE, where the positioning capability indication information is used to indicate a positioning capability of the UE, the positioning precision indication information is used to indicate positioning precision supported by the UE, and the service type indication information is used to indicate a service type supported by the UE.

With reference to the first possible implementation, in a second possible implementation, the positioning capability supported by the UE includes at least one of an OTDOA method, an RTK method, an RTD method, an SSR method, a VRS method, a MAC method, an FKP method, or a PPP method.

With reference to the first possible implementation or the second possible implementation, in a third possible implementation, the positioning server may further include the sending module. The sending module is specifically configured to: for the first serving cell, send, based on the at least one positioning request, the at least one piece of positioning assistance data to a base station corresponding to the first serving cell.

With reference to the third possible implementation, in a fourth possible implementation, the sending module may further include a sending submodule and a determining submodule. The sending submodule is configured to: for the base station corresponding to the first serving cell, if it is determined that a first condition is met, send, based on an identifier of the first serving cell, the at least one piece of positioning assistance data to the base station corresponding to the first serving cell. The determining submodule is specifically configured to: determine that a quantity of UEs that need to be positioned in the first serving cell is greater than a first threshold; and/or determine that a quantity of UEs meeting any positioning capability in the UEs that need to be positioned in the first serving cell is greater than a second threshold; and/or determine that a quantity of UEs meeting any supported positioning precision in the UEs that need to be positioned in the first serving cell is greater than a third threshold; and/or determine that a quantity of UEs meeting any positioning service type in the UEs that need to be positioned in the first serving cell is greater than a fourth threshold. The receiving module is further configured to receive first instruction information sent by the core network device, where the first instruction information is used to instruct to send, in broadcast mode, the positioning assistance data to the UEs that need to be positioned in the first serving cell.

With reference to the fourth possible implementation, in a fifth possible implementation, the sending module may further include a classification submodule. The classification submodule is configured to classify, based on positioning capabilities and/or positioning precision and/or positioning service types of the UEs that need to be positioned in the first serving cell, the at least one piece of positioning assistance data of the UEs that need to be positioned in the first serving cell, to obtain the at least one piece of positioning assistance data of different types. The sending submodule is further configured to send, based on the at least one positioning request, the at least one piece of positioning assistance data of the different types obtained by the classification submodule to the base station corresponding to the first serving cell.

With reference to the fifth possible implementation, in a sixth possible implementation, the sending submodule is further configured to: after the sending submodule sends, based on the identifier of the first serving cell, the at least one piece of positioning assistance data to the base station corresponding to the first serving cell, send a stop indication message to the base station corresponding to the first serving cell, where the stop indication message is used to indicate that sending of the at least one piece of positioning assistance data to the base station is stopped.

With reference to the sixth possible implementation, in a seventh possible implementation, the sending submodule is further configured to: when the first condition is met, send a stop indication message to the base station corresponding to the first serving cell, where the stop indication message is used to indicate sending of the at least one piece of positioning assistance data to the base station is stopped. The determining submodule is specifically configured to: determine that the quantity of UEs that need to be positioned in the first serving cell is less than or equal to a fifth threshold, where the fifth threshold is less than or equal to the first threshold; and/or determine that the quantity of UEs meeting any UE positioning capability in the UEs that need to be positioned in the first serving cell is less than or equal to a sixth threshold, where the sixth threshold is less than or equal to the second threshold; and/or determine that the quantity of UEs meeting any supported positioning method in the UEs that need to be positioned in the first serving cell is less than or equal to a seventh threshold, where the seventh threshold is less than or equal to the third threshold; and/or determine that the quantity of UEs meeting any positioning service type in the UEs that need to be positioned in the first serving cell is less than or equal to an eighth threshold, where the eighth threshold is less than or equal to the fourth threshold. The receiving module is further configured to receive second instruction information sent by the core network device, where the second instruction information is used to instruct to stop sending, in broadcast mode, the positioning assistance data to the UEs that need to be positioned in the first serving cell.

With reference to any one of the fifth aspect or the foregoing possible implementations, in a seventh possible implementation, the receiving module may be further configured to: before the sending module sends the at least one piece of positioning assistance data to the base station based on the at least one positioning request, receive a base station location message sent by the base station corresponding to the first serving cell, where the base station location message may include location indication information of the base station corresponding to the first serving cell, and the location indication information of the base station may indicate a location of the base station and a location of the first serving cell. The positioning server may further include a generation module. The generation module is configured to generate or obtain positioning assistance data based on the first message of the UE in the first serving cell, reference data, and the base station location message received by the receiving module.

With reference to any one of the fifth aspect or the foregoing possible implementations, in a seventh possible implementation, the receiving module may be further configured to: before the sending module sends the at least one piece of positioning assistance data to the base station based on the at least one positioning request, receive a base station location message sent by the base station corresponding to the first serving cell, where the base station location message may include location indication information of the base station corresponding to the first serving cell, and the location indication information of the base station may indicate a location of the base station and a location of the first serving cell. The positioning server may further include a generation module. The generation module is configured to generate or obtain positioning assistance data based on the first message of the UE in the first serving cell, reference data, and the base station location message received by the receiving module.

With reference to any one of the fifth aspect or the foregoing possible implementations, in an eighth possible implementation, the sending module may be further configured to: send a rough-location request to the UE before sending the at least one piece of positioning assistance data to the base station based on the at least one positioning request. The receiving module is further configured to receive a rough location sent by the UE. The positioning server may further include a generation module. The generation module is configured to generate or obtain the positioning assistance data based on the first message of the UE that needs to be positioned in the first serving cell, the reference data, and the rough location received by the receiving module.

According to a sixth aspect, this application provides a base station. The base station includes a receiving module and a sending module. The receiving module is configured to receive at least one piece of positioning assistance data sent by a positioning server. The sending module is configured to broadcast the at least one piece of positioning assistance data received by the receiving module.

With reference to the sixth aspect, in a first possible implementation, the sending module is specifically configured to broadcast at least one of positioning assistance data of different types to UE that needs to be positioned in a first serving cell.

With reference to the first possible implementation, in a second possible implementation, the receiving module is further configured to: before receiving the at least one piece of positioning assistance data sent by the positioning server, receive a positioning notification message sent by a core network device, where the positioning notification message includes a positioning request, and the positioning request includes an identifier of the UE and an identifier of a serving cell of the UE. The sending module is further configured to send the positioning notification message received by the receiving module to the UE that needs to be positioned.

With reference to any one of the sixth aspect or the foregoing possible implementations, in a third possible implementation, the sending module is further configured to send a first change paging message to first UE after the receiving module receives the at least one piece of positioning assistance data sent by the positioning server, where the first change paging message carries change indication information used to indicate that a system message related to first positioning assistance data changes, the first UE is UE in the first serving cell, and the first UE corresponds to the first positioning assistance data.

With reference to the sixth aspect, in a fourth possible implementation, the sending module may include a classification submodule and a sending submodule. The classification submodule is configured to classify the at least one piece of positioning assistance data based on positioning capabilities and/or positioning precision and/or positioning service types of UEs that need to be positioned in the first serving cell, to obtain the at least one piece of positioning assistance data of different types. The sending submodule is configured to send, based on the at least one positioning request, the at least one piece of positioning assistance data of the different types to the base station corresponding to the first serving cell.

With reference to the sixth aspect, in a fifth possible implementation, the sending module may be further configured to send a base station location message to the positioning server, where the base station location message may include location indication information of the base station corresponding to the first serving cell, and the location indication information of the base station may indicate a location of the base station and/or a location of the first serving cell.

According to a seventh aspect, this application provides a core network device. The core network device includes a sending module and a determining module. The sending module is configured to send at least one positioning request to a positioning server, where each of the at least one positioning request includes an identifier of UE and an identifier of a serving cell of the UE. The sending module is further configured to send first instruction information to the positioning server when a first condition is met, where the first instruction information is used to instruct to send, in broadcast mode, positioning assistance data to UE that needs to be positioned in a first serving cell. The determining module is configured to determine that the first condition is met. The determining module is specifically configured to: determine that a quantity of UEs that need to be positioned in the first serving cell is greater than a first threshold; and/or determine that a quantity of UEs meeting any UE positioning capability in the UEs that need to be positioned in the first serving cell is greater than a second threshold; and/or determine that a quantity of UEs meeting any supported positioning precision in the UEs that need to be positioned in the first serving cell is greater than a third threshold; and/or determine that a quantity of UEs meeting any positioning service type in the UEs that need to be positioned in the first serving cell is greater than a fourth threshold.

With reference to the seventh aspect, in a first possible implementation, the sending module is further configured to send second instruction information to the positioning server after sending the first instruction information to the positioning server, where the second instruction information is used to instruct to stop sending, in broadcast mode, the positioning assistance data to the UEs that need to be positioned in the first serving cell.

With reference to the first possible implementation, in a second possible implementation, the sending module is specifically configured to send the second instruction information to the positioning server when a second condition is met. The determining module is further configured to: determine that the quantity of UEs that need to be positioned in the first serving cell is less than or equal to a fifth threshold, where the fifth threshold is less than or equal to the first threshold; and/or determine that the quantity of UEs meeting any UE positioning capability in the UEs that need to be positioned in the first serving cell is less than or equal to a sixth threshold, where the sixth threshold is less than or equal to the second threshold; and/or determine that the quantity of UEs meeting any supported positioning method in the UEs that need to be positioned in the first serving cell is less than or equal to a seventh threshold, where the seventh threshold is less than or equal to the third threshold; and/or determine that the quantity of UEs meeting any positioning service type in the UEs that need to be positioned in the first serving cell is less than or equal to an eighth threshold, where the eighth threshold is less than or equal to the fourth threshold.

With reference to the second possible implementation, in a third possible implementation, the sending module is further configured to send a positioning notification message to a base station before sending the positioning request to the positioning server, where the positioning notification message carries the positioning request.

According to an eighth aspect, this application provides UE (referred to as first UE below). The first UE includes a receiving module. The receiving module is configured to obtain first positioning assistance data broadcast by a base station corresponding to a first serving cell, where the first positioning assistance data is used by the first UE to obtain a precise location through calculation, or the first positioning assistance data is used by the first UE to perform positioning measurement, and the first UE is UE that needs to be positioned in the first serving cell.

With reference to the eighth aspect, in a first possible implementation, the first UE may further include a sending module. The sending module is configured to send a first message of the first UE to a positioning server before the receiving module obtains the first positioning assistance data broadcast by the base station corresponding to the first serving cell, where the first message of the first UE includes at least one of positioning capability indication information of the first UE, positioning method indication information of the first UE, or service type indication information of the first UE, where the positioning capability indication information is used to indicate a positioning capability of the UE, the positioning precision indication information is used to indicate positioning precision supported by the UE, and the service type indication information is used to indicate a service type supported by the UE.

With reference to the first possible implementation, in a second possible implementation, the positioning capability supported by the UE includes at least one of an OTDOA method, an RTK method, an RTD method, an SSR method, a VRS method, a MAC method, an FKP method, or a PPP method.

With reference to the second possible implementation, in a third possible implementation, the receiving module is configured to: before obtaining the first positioning assistance data broadcast by the base station corresponding to the first serving cell, receive a first change paging message sent by the base station corresponding to the first serving cell, where the first change paging message carries change indication information used to indicate that a system message related to the first positioning assistance data changes.

With reference to the third possible implementation, in a fourth possible implementation, the receiving module is further configured to: after obtaining the first positioning assistance data broadcast by the base station corresponding to the first serving cell, receive a first positioning paging message sent by the base station corresponding to the first serving cell, where the first positioning paging message carries positioning request indication information.

With reference to the fourth possible implementation, in a fifth possible implementation, the sending module is further configured to send a first assistance data request message to the positioning server after the receiving module obtains the first positioning assistance data broadcast by the base station corresponding to the first serving cell, where the first assistance data request message carries additional request indication information used to request additional first positioning assistance information.

With reference to the fourth possible implementation, in a sixth possible implementation, the receiving module is further configured to receive a rough-location request sent by the positioning server, and the sending module may be further configured to send a rough location to the positioning server.

According to a ninth aspect, this application provides a positioning assistance data sending system. The system includes:

the positioning server according to any one of the fifth aspect or the possible implementations of the fifth aspect; and the base station according to any one of the sixth aspect or the possible implementations of the sixth aspect; and the core network device according to any one of the seventh aspect or the possible implementations of the seventh aspect; and at least one UE according to any one of the eighth aspect or the possible implementations of the eighth aspect.

According to a tenth aspect, this application provides a positioning server, where the positioning server includes one or more processors, a memory, a communications interface, and a bus. The memory is configured to store at least one instruction; the one or more processors, the memory, and the communications interface are connected by using the bus; when the positioning server runs, the one or more processors execute the at least one instruction stored in the memory, so that the positioning server performs the positioning assistance data sending method according to any one of the first aspect or the possible implementations of the first aspect.

According to an eleventh aspect, this application provides a computer storage medium, where the computer storage medium includes at least one instruction. When the at least one instruction is run on a computer, the computer is enabled to perform the positioning assistance data sending method according to any one of the first aspect or the possible implementations of the first aspect.

According to a twelfth aspect, this application provides a computer program product, where the computer program product includes at least one instruction. When the at least one instruction is run on a computer, the computer is enabled to perform the positioning assistance data sending method according to any one of the first aspect or the possible implementations of the first aspect.

It may be understood that the positioning server provided in the tenth aspect, the computer storage medium provided in the eleventh aspect, or the computer program product provided in the twelfth aspect is configured to perform the corresponding method provided above. Therefore, for beneficial effects that can be achieved, refer to beneficial effects in the corresponding method provided above. Details are not described herein again.

According to a thirteenth aspect, this application provides a base station, where the base station includes one or more processors, a memory, a communications interface, and a bus. The memory is configured to store at least one instruction; the one or more processors, the memory, and the communications interface are connected by using the bus; when the base station runs, the one or more processors execute the at least one instruction stored in the memory, so that the base station performs the positioning assistance data sending method according to any one of the second aspect or the possible implementations of the second aspect.

According to a fourteenth aspect, this application provides a computer storage medium, where the computer storage medium includes at least one instruction. When the at least one instruction is run on a computer, the computer is enabled to perform the positioning assistance data sending method according to any one of the second aspect or the possible implementations of the second aspect.

According to a fifteenth aspect, this application provides a computer program product, where the computer program product includes at least one instruction. When the at least one instruction is run on a computer, the computer is enabled to perform the positioning assistance data sending method according to any one of the second aspect or the possible implementations of the second aspect.

It may be understood that the base station provided in the thirteenth aspect, the computer storage medium provided in the fourteenth aspect, or the computer program product provided in the fifteenth aspect is configured to perform the corresponding method provided above. Therefore, for beneficial effects that can be achieved, refer to beneficial effects in the corresponding method provided above. Details are not described herein again.

According to a sixteenth aspect, this application provides a core network device, where the core network device includes one or more processors, a memory, a communications interface, and a bus. The memory is configured to store at least one instruction; the one or more processors, the memory, and the communications interface are connected by using the bus; when the core network device runs, the one or more processors execute the at least one instruction stored in the memory, so that the core network device performs the positioning assistance data sending method according to any one of the third aspect or the possible implementations of the third aspect.

According to a seventeenth aspect, this application provides a computer storage medium, where the computer storage medium includes at least one instruction. When the at least one instruction is run on a computer, the computer is enabled to perform the positioning assistance data sending method according to any one of the third aspect or the possible implementations of the third aspect.

According to an eighteenth aspect, this application provides a computer program product, where the computer program product includes at least one instruction. When the at least one instruction is run on a computer, the computer is enabled to perform the positioning assistance data sending method according to any one of the third aspect or the possible implementations of the third aspect.

It may be understood that the core device provided in the sixteenth aspect, the computer storage medium provided in the seventeenth aspect, or the computer program product provided in the eighteenth aspect is configured to perform the corresponding method provided above. Therefore, for beneficial effects that can be achieved, refer to beneficial effects in the corresponding method provided above. Details are not described herein again.

According to a nineteenth aspect, this application provides UE, where the UE includes one or more processors, a memory, a communications interface, and a bus. The memory is configured to store at least one instruction; the one or more processors, the memory, and the communications interface are connected by using the bus; when the UE runs, the one or more processors execute the at least one instruction stored in the memory, so that the UE performs the positioning assistance data sending method according to any one of the fourth aspect or the possible implementations of the fourth aspect.

According to a twentieth aspect, this application provides a computer storage medium, where the computer storage medium includes at least one instruction. When the at least one instruction is run on a computer, the computer is enabled to perform the positioning assistance data sending method according to any one of the fourth aspect or the possible implementations of the fourth aspect.

According to a twenty-first aspect, this application provides a computer program product, where the computer program product includes at least one instruction. When the at least one instruction is run on a computer, the computer is enabled to perform the positioning assistance data sending method according to any one of the fourth aspect or the possible implementations of the fourth aspect.

It may be understood that the UE provided in the nineteenth aspect, the computer storage medium provided in the twentieth aspect, or the computer program product provided in the twenty-first aspect is configured to perform the corresponding method provided above. Therefore, for beneficial effects that can be achieved, refer to beneficial effects in the corresponding method provided above. Details are not described herein again.

According to a twenty-second aspect, this application provides a positioning assistance data sending system. The system includes the positioning server according to any one of the tenth aspect or the possible implementations of the tenth aspect, the base station according to any one of the thirteenth aspect or the possible implementations of the thirteenth aspect, the core network device according to any one of the sixteenth aspect or the possible implementations of the sixteenth aspect, and at least one UE according to any one of the nineteenth aspect or the possible implementations of the nineteenth aspect.

BRIEF DESCRIPTION OF DRAWINGS

FIG. 11a-1 and FIG. 11a-2 is a seventh schematic flowchart of a positioning assistance data sending method according to an embodiment of the present invention;

DESCRIPTION OF EMBODIMENTS

Figure 1:
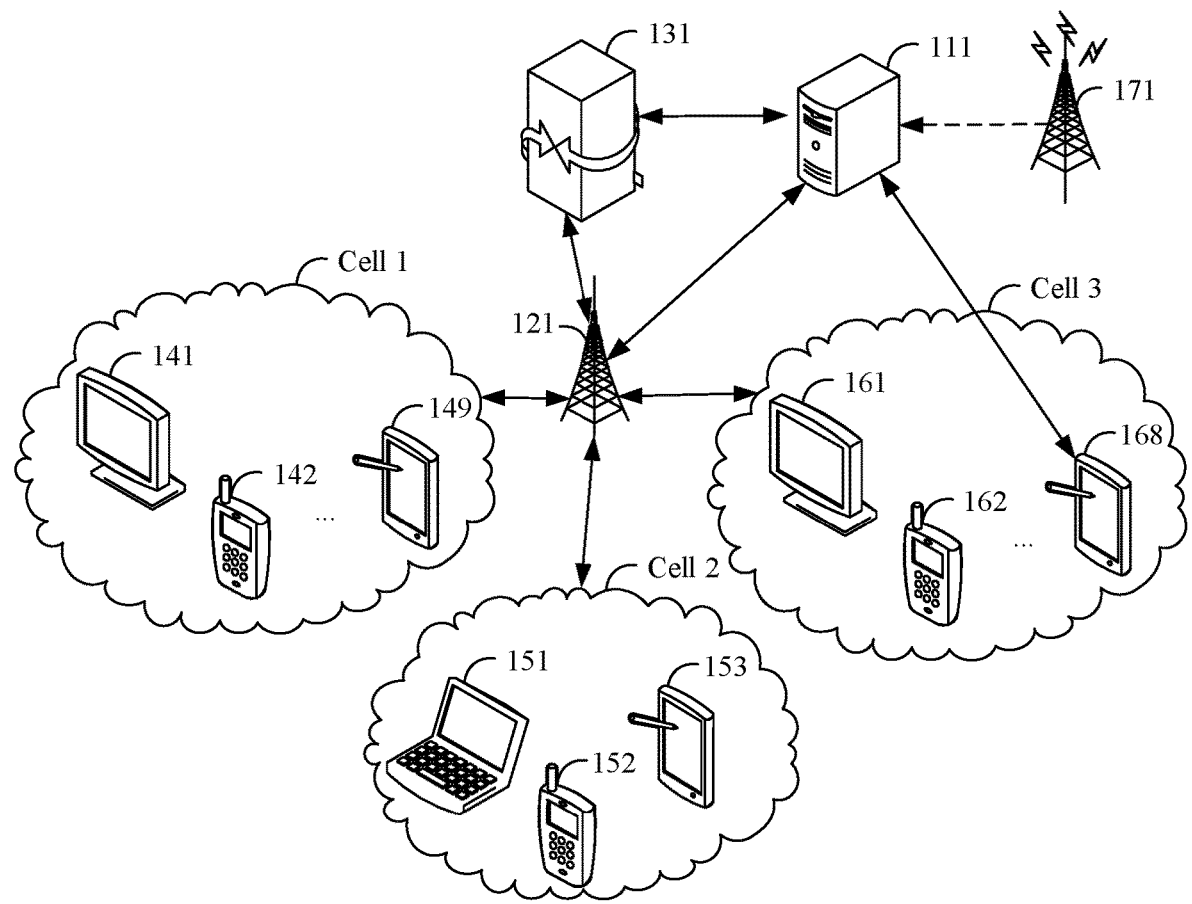
FIG. 1 is a schematic composition diagram of a positioning system to which a positioning assistance data sending method is applied according to an embodiment of the present invention.

In the specification and claims in the embodiments of the present invention, the terms "first", "second", "third", "fourth", and so on are intended to distinguish between different objects but do not indicate a particular order of the objects. For example, a first threshold, a second threshold, and the like are intended to distinguish between different values, but do not indicate a particular order of devices. In the descriptions of the embodiments of the present invention, unless otherwise stated, "multiple" means two or more than two.

In addition, in the embodiments of the present invention, the word "exemplary" or "for example" is used to represent giving an example, an illustration, or a description. Any embodiment or design scheme described as an "exemplary" or "for example" in the embodiments of the present invention should not be explained as being more preferred or having more advantages than another embodiment or design scheme. Exactly, use of the word "exemplary" or "example" or the like is intended to present a related concept in a specific manner.

A positioning assistance data sending method and system, and a device that are provided in the embodiments of the present invention may be applied to a positioning assistance data sending process, and is specifically applied to a process of sending positioning assistance data first in unicast mode and then in broadcast mode. This can improve positioning precision, spectral efficiency, and resource utilization.

The following describes the technical solutions in the embodiments of the present invention in detail with reference to the accompanying drawings in the embodiments of the present invention.

A positioning system to which the positioning assistance data sending method provided in the embodiments of the present invention is applied may include a positioning server, at least one base station, at least one core network device, and at least one user equipment (User Equipment, UE). In addition, the positioning system may further include at least one reference station (Reference Stations). One base station may cover one or more cells, and each cell may cover one or more UEs.

The positioning server provided in the embodiments of the present invention may be a positioning server such as an enhanced serving mobile location center (Enhanced Serving Mobile Location Centre, E-SMLC), a gateway mobile location center (Gateway Mobile Location Center, G-MLC), or an RTK server. This is not specifically limited in the embodiments of the present invention.

The core network device may be a core network device that supports a 3GPP technology, such as a mobility management entity (Mobility Management Entity, MME), a serving gateway (Serving GateWay, S-GW), and a PDN gateway (PDN GateWay, P-GW). This is not specifically limited in the embodiments of the present invention.

The base station may be a base station (Base Station, BS), an evolved NodeB (eNodeB, eNB), a gNB, an internet of things evolved NodeB (Internet of Thing eNB, IoT eNB), or the like. This is not specifically limited in the embodiments of the present invention.

The UE may be UE that supports communication types such as enhanced machine type communication (evolved Machine Type Communications, eMTC), narrowband internet of things (narrow band IoT, NB IoT), long term evolution (Long Term Evolution, LTE), and NR (New Radio Access Technology in 3GPP). In addition, the UE may further include an LCS client. The LCS client may be configured inside the UE, or configured outside the UE. This is not specifically limited in the embodiments of the present invention. A terminal (for example, UE) that includes an LCS client may be referred to as an LCS entity. For example, the UE may be a cellular phone, a personal digital assistant (PDA), a wireless device, a wireless modem, a wireless router, a laptop computer, a telemetering device, a tracking device, or the like.

The reference station may be a reference station that uses a virtual reference station (Virtual Reference Stations, VRS) technology, a master reference station and an auxiliary reference station that use a master auxiliary station method (Master Auxiliary Concept, MAC), or the like. This is not specifically limited in the embodiments of the present invention.

In the embodiments of the present invention, the following describes the positioning assistance data sending method provided in the embodiments of the present invention by using an example in which one positioning server interacts with one base station, one core network device, one reference station, and at least one UE.

For example, in a schematic architectural diagram of a positioning system shown in FIG. 1, a positioning system 10 may include a positioning server 111, a base station 121, a core network device 131, UEs 141 to 149, UEs 151 to 153, UEs 161 to 168, and a reference station 171. The base station 121 may cover a cell 1, a cell 2, and a cell 3. The cell 1 may cover the UEs 141 to 149, the cell 2 may cover the UEs 151 to 153, and the cell 3 may cover the UEs 161 to 168. That is, the cell 1 is a serving cell of the UEs 141 to 149, the cell 2 is a serving cell of the UEs 151 to 153, and the cell 3 is a serving cell of the UEs 161 to 168. For ease of description, a cell is sometimes referred to as a "serving cell" in the embodiments of the present invention. This is merely used to describe a relationship between a cell and UE served by the cell, and does not constitute a limitation on the cell.

Specifically, any UE in the UEs 141 to 149, the UEs 151 to 153, and the UEs 161 to 168 may proactively initiate a positioning request and send the positioning request to the core network device 131. The positioning request may be proactively initiated by an LCS client configured in the UE. Then, after receiving the positioning request (including the positioning request sent by the LCS client configured in the UE) sent by any UE described above, the core network device 131 may send the positioning request to the positioning server 111. In addition, alternatively, the core network device 131 may proactively initiate a positioning request, to request to precisely position the UE.

The positioning server 111 may receive the positioning request from the core network device 131. In addition, the positioning server 111 may interact with the UE that needs to be positioned, to obtain positioning capability indication information of the UE. Then, the positioning server 111 may process the positioning request of the UE based on the positioning capability indication information of the UE, to obtain positioning assistance data of the UE. Finally, the positioning server 111 may interact with the UE, so that the UE is precisely positioned based on the positioning assistance data.

In a possible case, if the positioning capability indication information of the UE indicates that the UE supports a downlink observed time difference of arrival (Observed Time Difference Of Arrival, OTDOA) method, the positioning server 111 may further interact with the base station 121, to obtain positioning signal configuration information of the UE that needs to be positioned. Correspondingly, "the positioning server 111 may process the positioning request of the UE based on the positioning capability indication information of the UE, to obtain positioning assistance data of the UE" described above may be specifically: The positioning server 111 processes the positioning request of the UE based on the positioning capability indication information of the UE and the positioning signal configuration information of the UE, to perform positioning measurement on the UE. The positioning signal configuration information is a positioning signal configuration in which the OTDOA method is applied.

It should be noted that the method for performing, by the positioning server when the positioning capability indication information of the UE indicates that the UE supports the OTDOA method, the foregoing operation to perform positioning measurement on the UE can be easily implemented by a person skilled in the art, and details are not described in the embodiments of the present invention.

In another possible case, if the positioning capability of the UE is that the UE supports an RTK method, the positioning server 111 may receive reference data from the reference station. In addition, the positioning server 111 may interact with the UE that needs to be positioned, to obtain a rough location of the UE. Correspondingly, "the positioning server 111 may process the positioning request of the UE based on the positioning capability indication information of the UE, to obtain positioning assistance data of the UE" may be specifically: The positioning server 111 processes the positioning request of the UE based on the rough location of the UE, the positioning capability indication information of the UE, and the reference data, to obtain a precise location of the UE. The positioning assistance data is positioning assistance data using the RTK method. The rough location of the UE may be obtained by using information measured by the UE.

It should be noted that the method for performing, by the positioning server when the positioning capability indication information of the UE indicates that the UE supports the RTK method, the foregoing operation to obtain the precise location of the UE can be easily implemented by a person skilled in the art, and details are not described in the embodiments of the present invention.

Arrows between the network elements shown in FIG. 1 merely represent directions of data flows between the network elements, and neither a connection between the network elements nor a manner such as wireless communication or wired communication for transmitting data between the network elements is limited. For example, data is transmitted between some network elements through wireless communication such as a paging message or dedicated signaling.

It should be noted that data may be transmitted between the positioning server and the base station by using a long term evolution positioning protocol A (LTE Positioning Protocol Annex, LPPa), and the data may be positioning-related information, for example, the foregoing positioning assistance data, or the positioning signal configuration information provided by the base station.

Data may be transmitted between the positioning server and the UE by using a long term evolution positioning protocol (LTE Positioning Protocol, LPP), and the data may be the positioning capability indication information, the positioning assistance data, a location (for example, the rough location of the UE), or the like of the UE.

Data may be transmitted between the positioning server and the core network device by using a location services application protocol (Location Services Application Protocol, LCS-AP), and the data may be a positioning request used to request to position the UE.

Data may be transmitted between the base station and the UE by using a radio resource control (Radio Resource Control, RRC) protocol, and the data may be the positioning assistance data broadcast by the base station.

It should be noted that the "UE that needs to be positioned" provided in the embodiments of the present invention may be "UE that proactively initiates a positioning request", "UE for which the core network device initiates a positioning request", or "UE for which the LCS entity initiates a positioning request for positioning the UE".

Figure 2:
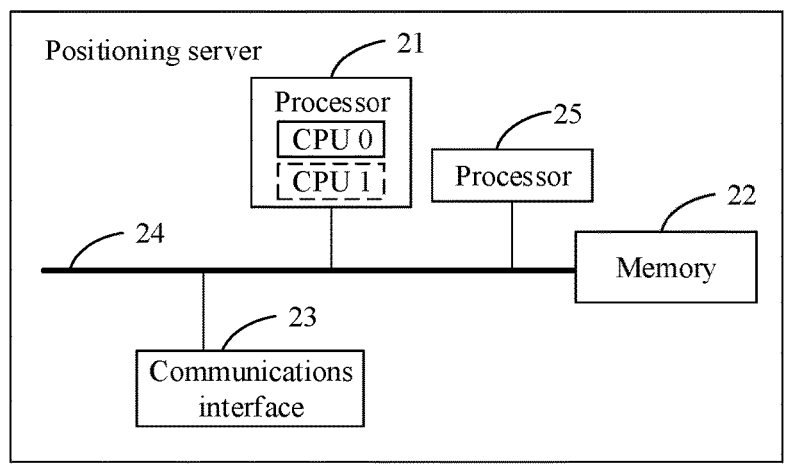
FIG. 2 is a first schematic structural diagram of a positioning server according to an embodiment of the present invention.

For example, FIG. 2 is a schematic composition diagram of a positioning server according to an embodiment of the present invention. As shown in FIG. 2, the positioning server may include a memory 22, a communications interface 23, and at least one processor 21.

The components of the positioning server are specifically described below with reference to FIG. 2.

The processor 21 is a control center of the device, and may be a processor, or may be a collective name of a plurality of processing elements. For example, the processor 21 may be a central processing unit (central processing unit, CPU), an application-specific integrated circuit (Application Specific Integrated Circuit, ASIC), or one or more integrated circuits configured to implement this embodiment of the present invention, for example, one or more microprocessors (digital signal processor, DSP) or one or more field programmable gate arrays (Field Programmable Gate Array, FPGA).

The processor 21 may perform various functions of the device by running or executing a software program stored in the memory 22 and invoking data stored in the memory 22. For example, the processor 21 may be configured to: process a positioning request of UE, and obtain positioning assistance data used for precisely positioning the UE that needs to be positioned.

During specific implementation, in an embodiment, the processor 21 may include one or more CPUs, for example, a CPU 0 and a CPU 1 shown in FIG. 2.

During specific implementation, in an embodiment, the positioning server may include a plurality of processors, for example, the processor 21 and a processor 25 shown in FIG. 2. Each of these processors may be a single-core processor (single-CPU), or may be a multi-core processor (multi-CPU). The processor herein may be one or more devices, circuits, and/or processing cores configured to process data (for example, a computer program instruction).

The memory 22 may be a read-only memory (read-only memory, ROM) or another type of static storage device that can store static information and instructions, a random access memory (random access memory, RAM) or another type of dynamic storage device that can store information and instructions, an electrically erasable programmable read-only memory (Electrically Erasable Programmable Read-Only Memory, EEPROM), a compact disc read-only memory (Compact Disc Read-Only Memory, CD-ROM) or another optical disk storage, optical disc storage (including a compact optical disc, a laser disc, an optical disc, a digital versatile disc, a Blu-ray disc, and the like), or magnetic disk storage medium or another magnetic storage device, or any other medium that can be configured to carry or store expected program code in a form of an instruction or a data structure and that can be accessed by a computer, but is not limited thereto. The memory 22 may exist independently, and is connected to the processor 21 by using a communications bus 24. Alternatively, the memory 22 may be integrated with the processor 21.

The memory 22 is configured to store the software program for performing the solutions provided in the embodiments of the present invention, and the processor 21 controls the execution.

There may be two communications interfaces 23: a sending interface configured to send data to an external device and a receiving interface configured to receive data from the external device. In other words, the positioning server can separately implement sending and receiving of data through two different communications interfaces. For example, with reference to FIG. 1, one communications interface of the positioning server 111 may send corresponding positioning assistance data to UE (for example, the UE 151) shown in FIG. 1, and the other communications interface may receive a positioning request sent by the core network device 121. Certainly, the communications interfaces 23 may integrate a data receiving function and a data sending function into one communications interface, where the communications interface has both the data receiving function and the data sending function.

The structure of the positioning server shown in FIG. 2 does not constitute a limitation on the positioning server. The positioning server may include components more or fewer than those shown in the figure, combine some components, or have different component arrangements.

Figure 3:
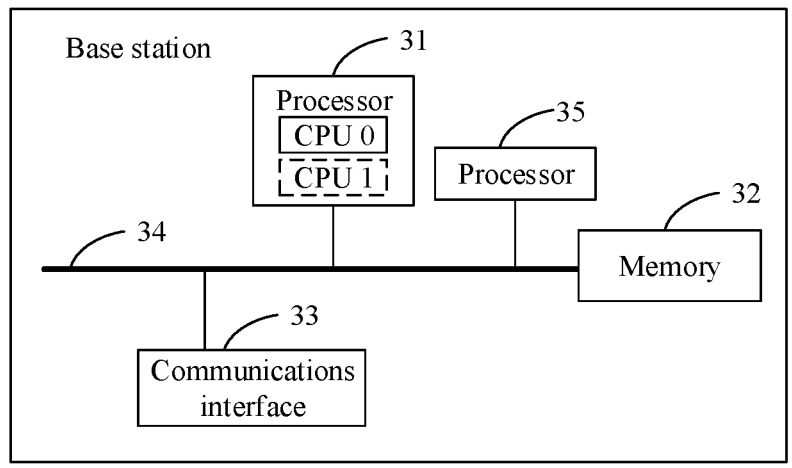
FIG. 3 is a first schematic structural diagram of a base station according to an embodiment of the present invention.

For example, FIG. 3 is a schematic composition diagram of a base station according to an embodiment of the present invention. As shown in FIG. 3, the base station may include at least one processor 31, a memory 32, and a communications interface 33.

The components of the base station are specifically described below with reference to FIG. 3.

The processor 31 is a control center of the device, and may be a processor, or may be a collective name of a plurality of processing elements. For example, the processor 31 may be a CPU, an ASIC, or one or more integrated circuits configured to implement this embodiment of the present invention, for example, one or more DSPs or one or more FPGAs.

The processor 31 may perform various functions of the device by running or executing a software program stored in the memory 32 and invoking data stored in the memory 32. For example, the processor 31 may be configured to distinguish between cells covered by the base station and UEs covered by the cells.

During specific implementation, in an embodiment, the processor 31 may include one or more CPUs, for example, a CPU 0 and a CPU 1 shown in FIG. 3.

During specific implementation, in an embodiment, the base station may include a plurality of processors, for example, the processor 31 and a processor 35 shown in FIG. 3. Each of these processors may be a single-core processor, or may be a multi-core processor. The processor herein may be one or more devices, circuits, and/or processing cores configured to process data (for example, a computer program instruction).

The memory 32 may be a ROM or another type of static storage device that can store static information and instructions, a RAM or another type of dynamic storage device that can store information and instructions, an EEPROM, a CD-ROM or another optical disk storage, optical disc storage (including a compact optical disc, a laser disc, an optical disc, a digital versatile disc, a Blu-ray disc, and the like), or magnetic disk storage medium or another magnetic storage device, or any other medium that can be configured to carry or store expected program code in a form of an instruction or a data structure and that can be accessed by a computer, but is not limited thereto. The memory 32 may exist independently, and is connected to the processor 31 by using a communications bus 34. Alternatively, the memory 32 may be integrated with the processor 31.

The memory 32 is configured to store the software program for performing the solutions provided in the embodiments of the present invention, and the processor 31 controls the execution. There may be two communications interfaces 33: a sending interface configured to send data to an external device and a receiving interface configured to receive data from the external device. In other words, the base station can separately implement sending and receiving of data through two different communications interfaces. For example, with reference to FIG. 1, one communications interface of the base station 121 may send measurement information of UE that needs to be positioned to the positioning server 111 shown in FIG. 1, and the other communications interface may receive positioning assistance data and the like sent by the positioning server 111. Certainly, the communications interfaces 33 may integrate a data receiving function and a data sending function into one communications interface, where the communications interface has both the data receiving function and the data sending function.

The structure of the base station shown in FIG. 3 does not constitute a limitation on the base station. The base station may include components more or fewer than those shown in the figure, combine some components, or have different component arrangements.

Figure 4:
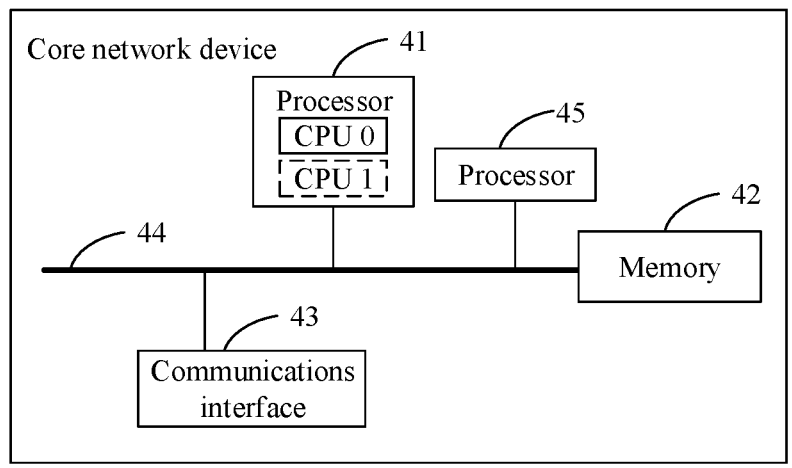
FIG. 4 is a first schematic structural diagram of a core network device according to an embodiment of the present invention.

For example, FIG. 4 is a schematic composition diagram of a core network device according to an embodiment of the present invention. As shown in FIG. 4, the core network device may include at least one processor 41, a memory 42, and a communications interface 43.

The components of the core network device are specifically described below with reference to FIG. 4.

The processor 41 is a control center of the device, and may be a processor, or may be a collective name of a plurality of processing elements. For example, the processor 41 may be a CPU, an ASIC, or one or more integrated circuits configured to implement this embodiment of the present invention, for example, one or more DSPs or one or more FPGAs.

The processor 41 may perform various functions of the device by running or executing a software program stored in the memory 42 and invoking data stored in the memory 42. For example, the processor 41 may be configured to determine whether to connect to UE. During specific implementation, in an embodiment, the processor 41 may include one or more CPUs, for example, a CPU 0 and a CPU 1 shown in FIG. 4.

During specific implementation, in an embodiment, the core network device may include a plurality of processors, for example, the processor 41 and a processor 45 shown in FIG. 4. Each of these processors may be a single-core processor, or may be a multi-core processor. The processor herein may be one or more devices, circuits, and/or processing cores configured to process data (for example, a computer program instruction).

The memory 42 may be a ROM or another type of static storage device that can store static information and instructions, a RAM or another type of dynamic storage device that can store information and instructions, an EEPROM, a CD-ROM or another optical disk storage, optical disc storage (including a compact optical disc, a laser disc, an optical disc, a digital versatile disc, a Blu-ray disc, and the like), or magnetic disk storage medium or another magnetic storage device, or any other medium that can be configured to carry or store expected program code in a form of an instruction or a data structure and that can be accessed by a computer, but is not limited thereto. The memory 42 may exist independently, and is connected to the processor 41 by using a communications bus 44. Alternatively, the memory 42 may be integrated with the processor 41.

The memory 42 is configured to store the software program for performing the solutions provided in the embodiments of the present invention, and the processor 41 controls the execution. There may be two communications interfaces 43: a sending interface configured to send data to an external device and a receiving interface configured to receive data from the external device. In other words, the core network device can separately implement sending and receiving of data through two different communications interfaces. For example, with reference to FIG. 1, one communications interface of the core network device 131 may send a positioning request to the positioning server 111 shown in FIG. 1, and initiate, to UE shown in FIG. 1, a paging message used to establish a connection. The other communications interface may receive a positioning request sent by UE shown in FIG. 1. Certainly, the communications interfaces 43 may integrate a data receiving function and a data sending function into one communications interface, where the communications interface has both the data receiving function and the data sending function.

The structure of the core network device shown in FIG. 4 does not constitute a limitation on the core network device. The core network device may include components more or fewer than those shown in the figure, combine some components, or have different component arrangements.

Figure 5:
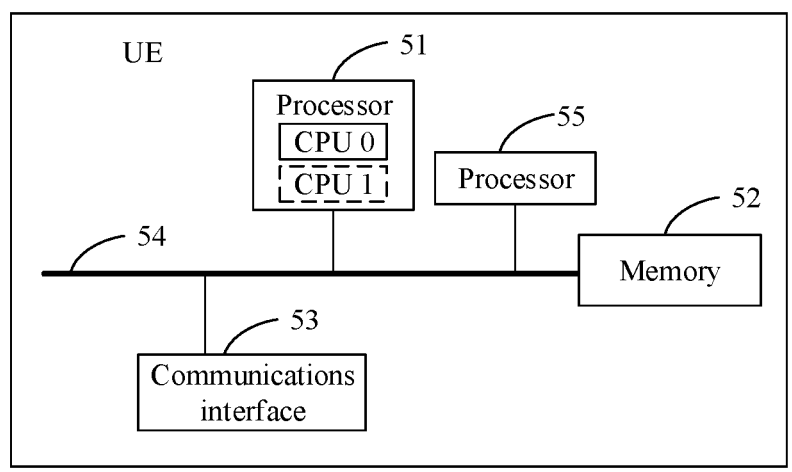
FIG. 5 is a first schematic structural diagram of UE according to an embodiment of the present invention.

For example, FIG. 5 is a schematic composition diagram of UE according to an embodiment of the present invention. As shown in FIG. 5, the UE may include at least one processor 51, a memory 52, and a communications interface 53.

The components of the UE are specifically described below with reference to FIG. 5.

The processor 51 is a control center of the device, and may be a processor, or may be a collective name of a plurality of processing elements. For example, the processor 51 may be a CPU, an ASIC, or one or more integrated circuits configured to implement this embodiment of the present invention, for example, one or more DSPs or one or more FPGAs.

The processor 51 may perform various functions of the device by running or executing a software program stored in the memory 52 and invoking data stored in the memory 52. For example, the processor 51 may be configured to determine whether to connect to UE. During specific implementation, in an embodiment, the processor 51 may include one or more CPUs, for example, a CPU 0 and a CPU 1 shown in FIG. 5.

During specific implementation, in an embodiment, the UE may include a plurality of processors, for example, the processor 51 and a processor 55 shown in FIG. 5. Each of these processors may be a single-core processor, or may be a multi-core processor. The processor herein may be one or more devices, circuits, and/or processing cores configured to process data (for example, a computer program instruction).

The memory 52 may be a ROM or another type of static storage device that can store static information and instructions, a RAM or another type of dynamic storage device that can store information and instructions, an EEPROM, a CD-ROM or another optical disk storage, optical disc storage (including a compact optical disc, a laser disc, an optical disc, a digital versatile disc, a Blu-ray disc, and the like), or magnetic disk storage medium or another magnetic storage device, or any other medium that can be configured to carry or store expected program code in a form of an instruction or a data structure and that can be accessed by a computer, but is not limited thereto. The memory 52 may exist independently, and is connected to the processor 51 by using a communications bus 54. Alternatively, the memory 52 may be integrated with the processor 51.

The memory 52 is configured to store the software program for performing the solutions provided in the embodiments of the present invention, and the processor 51 controls the execution. There may be two communications interfaces 53: a sending interface configured to send data to an external device and a receiving interface configured to receive data from the external device. In other words, the UE can separately implement sending and receiving of data through two different communications interfaces. For example, with reference to FIG. 1, one communications interface of the UE 141 may send a positioning request to the core network device 131 shown in FIG. 1, and send positioning capability indication information of the UE 141 and a rough location of the UE 141 to the positioning server 111 shown in FIG. 1. The other communications interface may receive positioning assistance data and the like sent by the positioning server 111 shown in FIG. 1. Certainly, the communications interfaces 53 may integrate a data receiving function and a data sending function into one communications interface, where the communications interface has both the data receiving function and the data sending function.

The structure of the UE shown in FIG. 5 does not constitute a limitation on the UE. The UE may include components more or fewer than those shown in the figure, combine some components, or have different component arrangements.

In the following embodiments of the present invention, an example is merely used, where in the positioning system to which the positioning assistance data sending method provided in the embodiments of the present invention is applied, the positioning server is an E-SMLC, the core network device is an MME, and the base station is an eNB. The method provided in the embodiments of the present invention may be applied to a positioning system using a 3GPP technology, and the positioning system supports an RTK technology.

Figure 6:
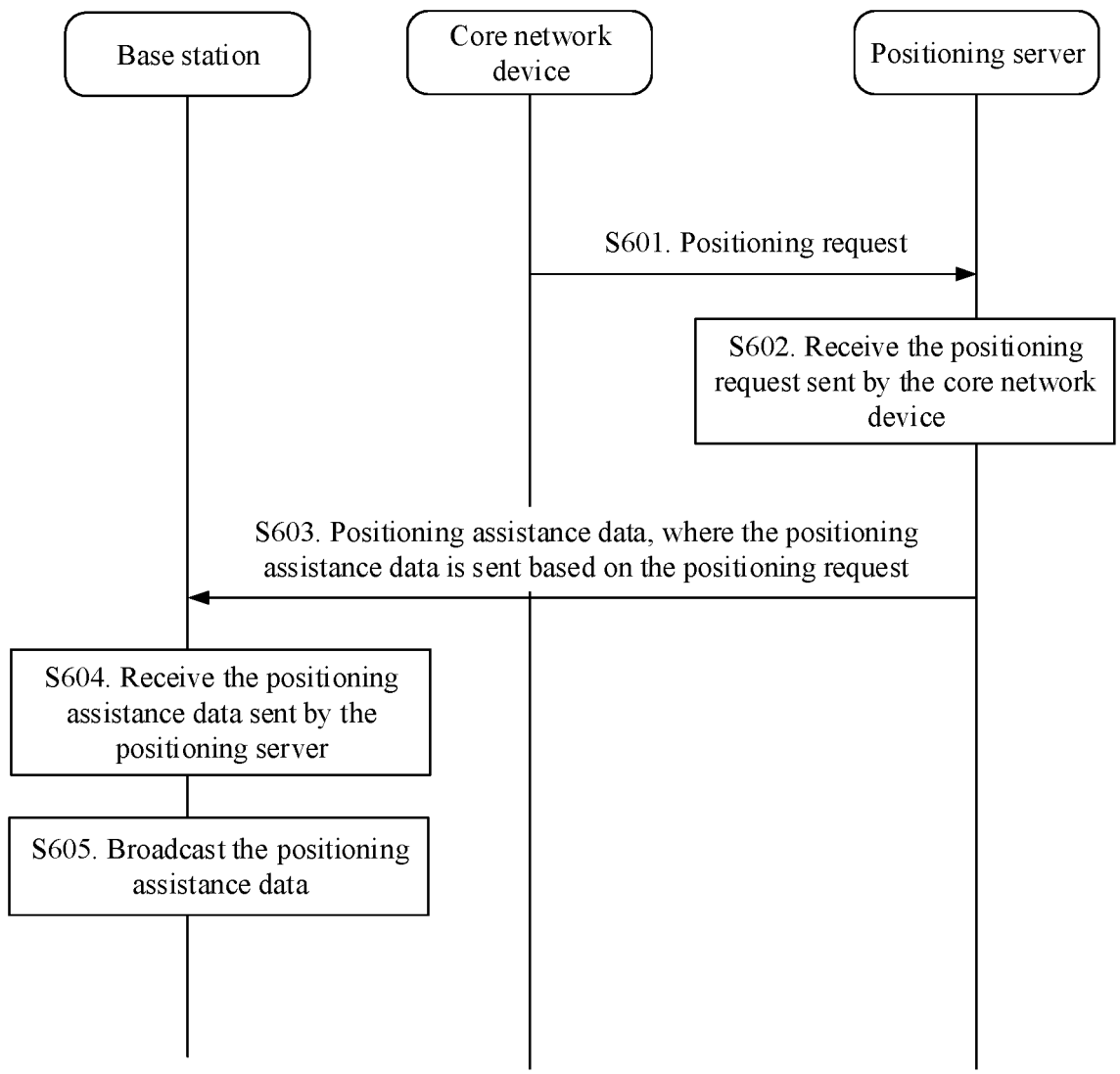
FIG. 6 is a first schematic flowchart of a positioning assistance data sending method according to an embodiment of the present invention.

To make the objectives, technical solutions, and advantages of the embodiments of the present invention clearer, with reference to the positioning system shown in FIG. 1, the positioning server shown in FIG. 2, the base station shown in FIG. 3, the core network device shown in FIG. 4, and the UE shown in FIG. 5, the following describes in detail a flowchart of a positioning assistance data sending method shown in FIG. 6. Referring to FIG. 6, the positioning assistance data sending method provided in Method Embodiment 1 of this application includes S601.

S601. The core network device sends a positioning request to the positioning server.

For example, step 601 may be performed by the communications interface 43 of the core network device shown in FIG. 4.

Specifically, the core network device may send at least one positioning request to the positioning server. The positioning request may be a positioning request that is proactively initiated by UE needing to be positioned and that is received by the core network device, or a positioning request that is initiated by the core network device for positioning UE needing to be positioned.

Each of the at least one positioning request may include an identifier of one UE and an identifier of a serving cell of the UE. For example, the identifier of the UE may be an international mobile equipment identity (International Mobile Equipment Identity, IMEI) of the UE, or may be an international mobile subscriber identity (International Mobile Subscriber Identification Number, IMSI), where one IMEI may uniquely identify one UE. The identifier of the serving cell may be an evolved universal mobile telecommunications system terrestrial radio access network cell global identifier (E-UTRAN Cell Global Identifier, E-CGI), where one E-CGI may be used to identify one cell and may indicate a base station corresponding to the cell. For example, one E-CGI may include 28-bit (bit) information, where the first 20 bits may indicate an identity (Identity, ID) of a base station corresponding to a cell, and the last 8 bits may indicate an ID of the cell.

It should be noted that a moment at which the UE that needs to be positioned sends the positioning request to the core network device is not limited in this embodiment of the present invention. For example, a plurality of UEs that need to be positioned may send positioning requests to the core network device at a same moment or at different moments separately. In addition, the at least one positioning request may be a positioning request generated in a period of time, and the at least one positioning request may be constantly updated. For example, at a moment after step 601 is performed, a positioning request initiated by UE that newly joins in a cell and that needs to be positioned may be used to update the at least one positioning request.

S602. The positioning server receives the positioning request sent by the core network device.

The positioning server may receive the at least one positioning request sent by the core network device. After receiving the at least one positioning request, the positioning server may determine, based on the at least one positioning request, to send positioning assistance data in broadcast mode.

Specifically, after step 602, the positioning assistance data sending method provided in this embodiment of the present invention may further include step 603 and step 604.

S603. The positioning server sends the positioning assistance data to the base station based on the positioning request.

For example, step 602 and step 603 may be performed by the communications interface 23 of the positioning server shown in FIG. 2.

For example, before sending the assistance data, the positioning server may first send a notification message to the base station. The notification message is used to notify the base station that the positioning server is to send the positioning assistance data to the base station. The notification message is LPPa signaling, and a specific signaling name is not limited.

For example, after receiving the notification message sent by the positioning server, the base station may reply with a response message. The response message may include information such as a size limitation and a transmission period of a data packet. After receiving the response message sent by the base station, the positioning server sends the positioning assistance data to the base station.

The positioning server may send at least one piece of positioning assistance data to the base station based on the at least one positioning request. Specifically, the positioning server may distinguish between different UEs based on different identifiers of the UEs that are included in different positioning requests, and distinguish between different cells based on different cell identifiers. Because serving cells of a plurality of UEs may be a same cell, a plurality of UEs with different identifiers may correspond to a same cell.

Specifically, for a serving cell, the positioning server may send, based on an identifier of the serving cell, positioning assistance data, for example, at least one piece of positioning assistance data, of UE that needs to be positioned in the serving cell to a base station corresponding to the serving cell.

S604. The base station receives the positioning assistance data sent by the positioning server.

S605. The base station broadcasts the positioning assistance data.

For example, step 604 and step 605 may be performed by the communications interface 33 of the base station shown in FIG. 3.

The base station may add the positioning assistance data to a system message broadcast by the base station, for example, add at least one piece of positioning assistance data, and broadcast the at least one piece of positioning assistance data.

It should be noted that, in the positioning assistance data sending method provided in this embodiment of the present invention, in a positioning system applying a 3GPP technology, after receiving the at least one positioning request, the positioning server may send, to the base station, the positioning assistance data of the UE (that is, the UE that needs to be positioned) corresponding to the at least one positioning request, so that the base station can broadcast the positioning assistance data. In this case, when a network element such as the base station or the positioning server is not connected to the UE that needs to be positioned, the UE can obtain corresponding positioning assistance data. In addition, because positioning assistance data in a cell is the same for UEs in the cell, the positioning server sends the positioning assistance data in broadcast mode, and does not need to separately send same positioning assistance data to the plurality of UEs, so that all of the plurality of UEs can obtain the positioning assistance data. In this way, resource utilization and spectral efficiency can be improved.

Before sending the positioning assistance data to the base station, the positioning server may further interact with the UE that needs to be positioned, to generate or obtain the positioning assistance data. The UE that needs to be positioned may be one or more UEs, and processes of interaction between the positioning server and the one or more UEs may be the same. In addition, because positioning assistance data in a cell is the same for UEs in the cell, the base station may broadcast positioning assistance data for one cell. In the following embodiments of the present invention, the positioning assistance data sending method provided in this embodiment of the present invention is described by merely using an example in which the positioning server interacts with one of UEs that needs to be positioned in one serving cell (for example, a first serving cell) covered by one base station.

Specifically, after step 602, a positioning assistance data sending method provided in Method Embodiment 2 of this application may further include step 701. For example, after step 602, the positioning assistance data sending method shown in FIG. 7 may further include step 701.

S701. The positioning server receives a first message sent by the UE to the positioning server.

For example, step 701 may be performed by the communications interface 23 of the positioning server shown in FIG. 2.

Specifically, the UE may be UE that needs to be positioned in a first serving cell. The first message includes at least one of positioning capability indication information, positioning precision indication information, and/or service type indication information of the UE.

A positioning capability of the UE that is indicated by the positioning capability indication information may include the foregoing OTDOA method and the foregoing RTK method. Specifically, the OTDOA method includes a UE-based OTDOA method and a UE-assisted OTDOA method, and the RTK method may include a UE-based RTK method and a UE-assisted RTK method. In other words, these may be separately used as methods for capability support. In addition, the positioning capability of the UE may further include at least one of a real-time kinematic pesudorange difference (real-time kinematic pesudorange difference, RTD) method, a state space representation (State Space Representation, SSR) method, a virtual reference station (Virtual Reference Station, VRS) method, a master auxiliary concept (Master Auxiliary Concept, MAC) method, an area correction parameter (German: Flachenkorrekturparameter, FKP) method, and a precise point positioning (point precise positioning, PPP) method, and a precise point positioning-carrier phase difference (point precise positioning-Real time kinematic, PPP-RTK) method. Certainly, a positioning method supported by the positioning capability of the UE provided in this embodiment of the present invention is not limited to the foregoing at least one method, and may further include another positioning method, for example, a satellite-based augmentation system (Satellite-Based Augmentation System, SBAS) method.

Because the positioning capability of the UE provided in this embodiment of the present invention may support one or more positioning methods. For example, UE may support an RTK method while supporting an OTDOA method. In this way, the UE can be positioned by using the OTDOA method in combination with the RTK method, improving positioning precision in a positioning process of the UE.

In addition to sending the positioning capability indication information of the UE to the positioning server, the UE may further send the positioning precision indication information and/or the service type indication information to the positioning server.

The positioning precision indication information is used to indicate positioning precision supported by the UE. For example, the UE supports centimeter-level precision, sub-meter-level precision, and meter-level precision.

The service type indication information is used to indicate a service type supported by the UE. For example, the UE supports real-time high-precision positioning, positioning allowing a specific delay, and positioning with different quality of service (Quality of Service, QoS) requirements.

Optionally, the UE may send any one or two or all of the positioning capability indication information, the positioning precision indication information, and the service type indication information of the UE to the positioning server. This is not limited in this embodiment of the present invention.

Optionally, the "first message sent by the UE" may be proactively sent by the UE to the positioning server, or may be sent by the UE after the UE receives a first message request that is sent by the positioning server and that is used to request the first message. In this embodiment of the present invention, the following merely uses an example in which the "first message sent by the UE" is sent by the UE after the UE receives the first message request that is sent by the positioning server and that is used to request the first message for description.

Figure 7:
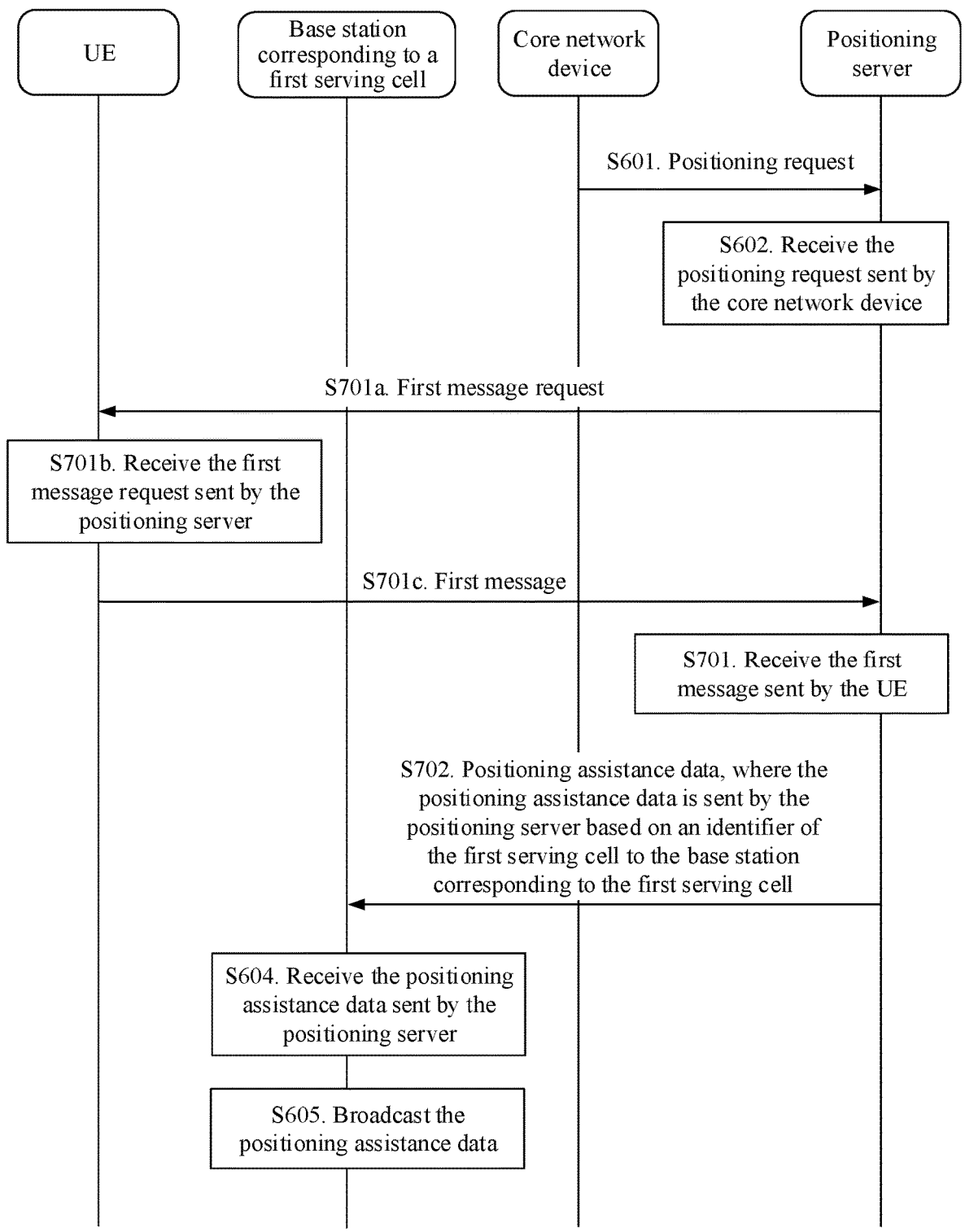
FIG. 7 is a second schematic flowchart of a positioning assistance data sending method according to an embodiment of the present invention.

For example, before step 701, the positioning assistance data sending method shown in FIG. 7 may further include step 701*a* to step 701*c*.

701*a*. The positioning server sends the first message request to the UE.

For example, step 701*a* and step 701 may be performed by the communications interface 23 of the positioning server shown in FIG. 2.

701*b*. The UE receives the first message request sent by the positioning server.

Specifically, one or more UEs that need to be positioned in the first serving cell may separately receive a corresponding first message request sent by the positioning server.

S701*c*. The UE sends the first message to the positioning server.

For example, step 701*b* and step 701*c* may be performed by the communications interface 23 of the UE shown in FIG. 5.

It should be noted that each of the plurality of UEs that need to be positioned in the first serving cell can implement the method provided in step 701*a* to step 701*c*. Details are not described again in this embodiment of the present invention. The positioning server may separately interact with one or more UEs that need to be positioned in the first serving cell, to obtain a first message request corresponding to each of the one or more UEs, that is, to obtain positioning capabilities and/or positioning precision and/or positioning service types of the one or more UEs that need to be positioned in the first serving cell.

In the positioning assistance data sending method provided in Method Embodiment 2, step 603 may be specifically step 702. For example, in the method shown in FIG. 7, step 603 in FIG. 6 may be specifically step 702.

S702. The positioning server sends, based on an identifier of the first serving cell, the positioning assistance data to a base station corresponding to the first serving cell.

For example, step 702 may be performed by the communications interface 23 of the positioning server shown in FIG. 2.

Specifically, the positioning server sends the positioning assistance data to the base station when a first condition is met. The positioning assistance data may be one or more pieces of positioning assistance data of one or more UEs that need to be positioned in the first serving cell.

The first condition on a side of the positioning server is any one of the following conditions 1 to 5, and there is an "and/or" relationship between the conditions 1 to 5.

1. The positioning server determines that a quantity of UEs that need to be positioned in the first serving cell is greater than a first threshold.

It should be noted that a specific value of the first threshold is not limited in this embodiment of the present invention, and the value does not constitute a limitation on realization of an objective of this application.

For example, if the first serving cell is the cell 1 shown in FIG. 1, the quantity of UEs that need to be positioned in the first serving cell may be 9. If the first serving cell is the cell 2 shown in FIG. 1, the quantity of UEs that need to be positioned in the first serving cell may be 3.

Assuming that the first threshold is 6, when the first condition is the condition 1:

If the first serving cell is the cell 1 shown in FIG. 1, and the quantity of UEs that need to be positioned in the first serving cell is 9 that is greater than 6, the first condition is met. Therefore, the positioning server may determine to send, in broadcast mode, the positioning assistance data, for example, at least one piece of positioning assistance data, of the UEs served by the first serving cell. In this case, the positioning server may send the at least one piece of positioning assistance data of the UEs in the first serving cell to the base station, so that the base station corresponding to the first serving cell can broadcast the at least one piece of positioning assistance data.

If the first serving cell is the cell 2 shown in FIG. 1, and the quantity of UEs that need to be positioned in the first serving cell is 3 that is not greater than 6, the first condition cannot be met. Therefore, the positioning server determines not to send, in broadcast mode, the at least one piece of positioning assistance data of the UEs that need to be positioned in the first serving cell, but may determine to send the at least one piece of positioning assistance data in unicast mode. In other words, the positioning server does not send the at least one piece of positioning assistance data of the UEs that need to be positioned in the first serving cell to the base station. In this case, the base station corresponding to the first serving cell cannot broadcast the at least one piece of positioning assistance data. The positioning server may separately interact with the UEs 151 to 153, so that the UEs 151 to 153 respectively obtain positioning assistance data of the UEs 151 to 153.

2. The positioning server determines that a quantity of UEs meeting any positioning capability in the UEs that need to be positioned in the first serving cell is greater than a second threshold.

A specific positioning capability of the UEs provided in this application is not limited to the positioning capability enumerated in this embodiment of the present invention.

It should be noted that a specific value of the second threshold is not limited in this embodiment of the present invention, and the value does not constitute a limitation on the realization of the objective of this application.

For example, if the first serving cell is the cell 1 shown in FIG. 1, the quantity of UEs that need to be positioned in the cell 1 is 9. Positioning capability indication information of the UEs 141 to 144 indicates that all of the corresponding UEs support a VRS method, positioning capability indication information of the UEs 145 to 148 indicates that all of the corresponding UEs support a MAC method, and positioning capability indication information of the UE 149 indicates that the corresponding UE supports an FKP method.

If the first serving cell is the cell 2 shown in FIG. 1, the quantity of UEs that need to be positioned in the cell 2 is 3. Positioning capability indication information of the UEs 151 to 153 indicates that the corresponding UEs support a VRS method.

For example, assuming that the second threshold is 3, and when the first condition is the condition 2:

If the first serving cell is the cell 1 shown in FIG. 1, and a quantity of UEs that support the VRS method in the UEs that need to be positioned in the first serving cell is 5 that is greater than 3, the first condition is met. Therefore, the positioning server may determine to send, in broadcast mode, at least one piece of positioning assistance data of the UEs 141 to 145 served by the first serving cell, and the at least one piece of positioning assistance data is positioning assistance data using the VRS method. That is, the positioning server may send, to the base station, the at least one piece of positioning assistance data that uses the VRS method and that is of the UEs 141 to 145 served by the first serving cell, so that the base station corresponding to the first serving cell can broadcast the at least one piece of positioning assistance data.

Meanwhile, if a quantity of UEs that support the MAC method in the UEs that need to be positioned in the first serving cell is 4 that is greater than 3, the first condition is met. Therefore, the positioning server may determine to send, in broadcast mode, at least one piece of positioning assistance data of the UEs 145 to 148 served by the first serving cell, and the at least one piece of positioning assistance data is positioning assistance data using the MAC method. That is, the positioning server may send, to the base station, the at least one piece of positioning assistance data that uses the MAC method and that is of the UEs 145 to 148 served by the first serving cell, so that the base station corresponding to the first serving cell can broadcast the at least one piece of positioning assistance data.

However, if a quantity of UEs that support the FKP method in the UEs that need to be positioned in the first serving cell is 1 that is not greater than 3, the first condition cannot be met. Therefore, the positioning server may determine to send, in unicast mode, positioning assistance data of the UE 149 served by the first serving cell, and the positioning assistance data is positioning assistance data using the FKP method. That is, the positioning server may interact with the UE 149, so that the UE 149 obtains the positioning assistance data that uses the FKP method and that is of the UE 149.

In addition, if the first serving cell is the cell 2 shown in FIG. 1, and a quantity of UEs that support the VRS method and that need to be positioned in the first serving cell is 3 that is not greater than 3, the first condition cannot be met. Therefore, the positioning server determines not to send, in broadcast mode, at least one piece of positioning assistance data of the UEs served by the first serving cell, but determines to send the at least one piece of positioning assistance data in unicast mode. In other words, the positioning server does not send, to the base station, the at least one piece of positioning assistance data that uses the VRS method and that is of the UEs served by the first serving cell, and the base station corresponding to the first serving cell does not broadcast the at least one piece of positioning assistance data. The positioning server may separately interact with the UEs 151 to 153, so that the UEs 151 to 153 respectively obtain the positioning assistance data that uses the VRS method and that is of the UEs 151 to 153.

3. The positioning server determines that a quantity of UEs meeting any positioning precision in the UEs that need to be positioned in the first serving cell is greater than a third threshold.

4. The positioning server determines that a quantity of UEs meeting any positioning service type in the UEs that need to be positioned in the first serving cell is greater than a fourth threshold.

Specific values of the third threshold and the fourth threshold are not limited in this embodiment of the present invention, and the values do not constitute a limitation on the realization of the objective of this application.

It should be noted that, for specific descriptions of a case in which the first condition is the condition 3 or the condition 4, refer to specific descriptions of the case in which the first condition is the condition 2, and details are not described again in this embodiment of the present invention.

Specifically, the quantity of UEs in the first serving cell, the quantity of UEs meeting any positioning capability, the quantity of UEs meeting any supported positioning precision, and the quantity of UEs meeting any positioning service type may be obtained by the positioning server through counting by using one or more counters.

For example, when the positioning server generates the positioning assistance data that uses the VRS method, the positioning server may perform counting by using a counter (for example, a counter 1). When the counter 1 reaches three, the positioning server determines to broadcast the positioning assistance data that uses the VRS method.

Optionally, the corresponding quantity of UEs may be obtained by the positioning server through counting by using one or more counters within a specific period of time. For example, the specific period of time is two hours.

In the foregoing four quantity statistical manners, specifically, a timer may be started before counting, to control, in the period of time, influence of a statistical result on whether to broadcast the positioning assistance data or not. Further, alternatively, a timer may be started when the E-SMLC determines to send the positioning assistance data in broadcast mode. During running of the timer, if an accumulated value on a counter is greater than one of the foregoing thresholds, broadcasting of the positioning assistance data continues, and the timer is restarted. Otherwise, the broadcasting of the positioning assistance data is stopped.

5. The positioning server receives first instruction information sent by the core network device, where the first instruction information is used to instruct to send, in broadcast mode, the positioning assistance data to the UEs in the first serving cell.

Before sending, to the base station, the at least one piece of positioning assistance data of the UEs served by the first serving cell, the positioning server may further receive the first instruction information that is used by the core network device to instruct to broadcast the positioning assistance data. In this case, the core network device determines to send the positioning assistance data in broadcast mode or in unicast mode.

In the positioning assistance data sending method provided in Method Embodiment 2 of this application, the positioning server can determine whether to send the positioning assistance data in broadcast mode or in unicast mode, provided that the positioning server receives the first instruction information sent by the core network device or obtains one of the positioning capability indication information, the positioning precision indication information, or the service type indication information of the UE that needs to be positioned. In this way, when the positioning assistance data is sent first in unicast mode and then in broadcast mode, reliability of the foregoing determined mode of sending the positioning assistance data can be relatively high, improving resource utilization in a positioning assistance data sending process.

It should be noted that, in the positioning assistance data sending method provided in Method Embodiment 2 of this application, provided that UE that needs to be positioned provides any one of positioning capability indication information, positioning precision indication information, or service type indication information of the UE, the positioning server can generate corresponding positioning assistance data based on the indication information, making a positioning assistance data generating process more reliable.

Figure 8A:
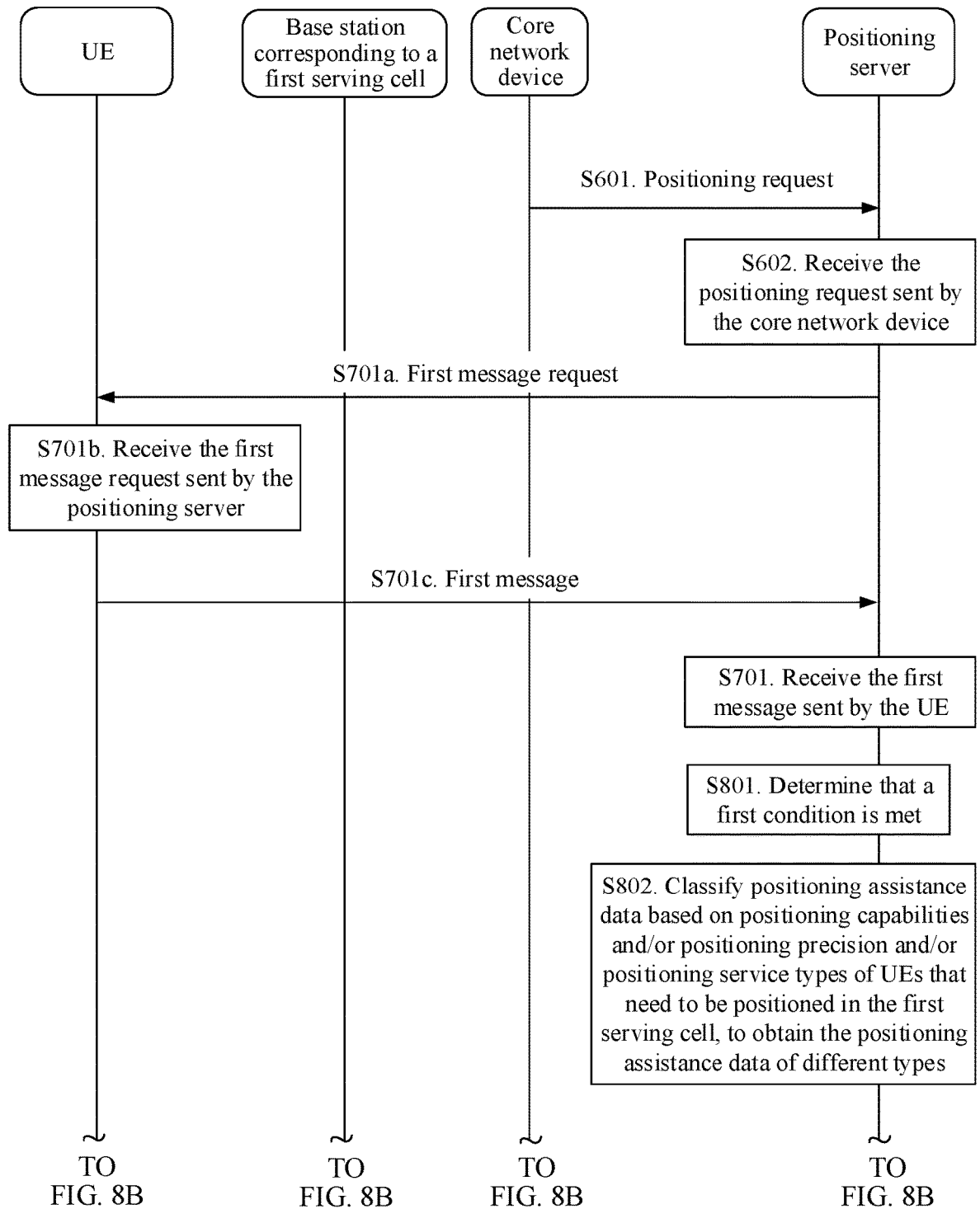
FIG. 8A and FIG. 8B are a third schematic flowchart of a positioning assistance data sending method according to an embodiment of the present invention.
Figure 8B:
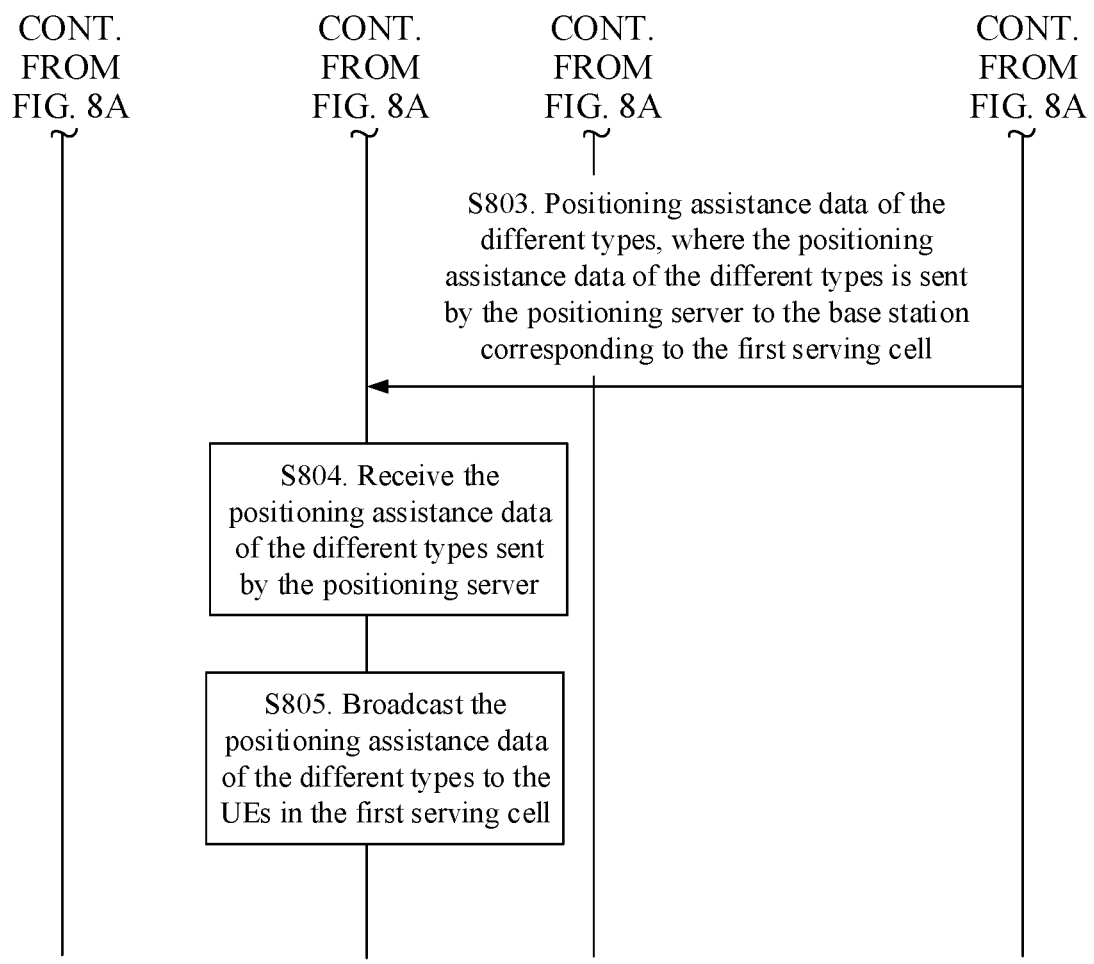

Specifically, in a positioning assistance data sending method provided in Method Embodiment 3 of this application, step 702 may include step 801 to step 803. For example, in the positioning assistance data sending method shown in FIG. 8A and FIG. 8B, step 702 shown in FIG. 7 may include step 801 to step 803.

S801. The positioning server determines that a first condition is met.

It should be noted that because the first condition is any one of the foregoing conditions 1 to 5, step 801 may include at least one of step 801*a*, step 801*b*, step 801*c*, step 801*d*, and step 801*e*.

801*a*. The positioning server determines that a quantity of UEs that need to be positioned in the first serving cell is greater than a first threshold.

801*b*. The positioning server determines that a quantity of UEs meeting any positioning capability in the UEs that need to be positioned in the first serving cell is greater than a second threshold.

801*c*. The positioning server determines that a quantity of UEs meeting any positioning precision in the UEs that need to be positioned in the first serving cell is greater than a third threshold.

801*d*. The positioning server determines that a quantity of UEs meeting any positioning service type in the UEs that need to be positioned in the first serving cell is greater than a fourth threshold.

801*e*. The positioning server receives first instruction information sent by the core network device.

The first instruction information is used to instruct to send, in broadcast mode, the positioning assistance data to the UEs in the first serving cell.

For specific descriptions of step 801 and step 801*a* to step 801*e* in this embodiment of the present invention, refer to corresponding parts in step 702. Details are not described herein again.

S802. The positioning server classifies the positioning assistance data based on positioning capabilities and/or positioning precision and/or positioning service types of the UEs that need to be positioned in the first serving cell, to obtain the positioning assistance data of different types.

For example, step 801*a* to step 801*d* and step 802 may be performed by the processor 21 of the positioning server shown in FIG. 2.

Positioning assistance data of one or more UEs that need to be positioned in the first serving cell may be classified into a same type or different types. That is, each piece of positioning assistance data may be classified into a corresponding type.

For example, the positioning server may obtain, through classification, positioning assistance data based on different positioning capabilities of the UEs in the first serving cell. For example, in the positioning assistance data of the UEs in the first serving cell, the positioning server may obtain, through classification, positioning assistance data using a VRS method, positioning assistance data using a MAC method, and positioning assistance data using an FKP method. That is, when the positioning server determines that a quantity of UEs having at least one positioning capability in the UEs that need to be positioned in the first serving cell is relatively large or is greater than a threshold, the positioning server sends the positioning assistance data to the base station, and the base station sends the positioning assistance data to the UEs in broadcast mode. For example, if the positioning server determines that there is a relatively large quantity of UEs having a VRS positioning capability, the positioning server sends VRS-based positioning assistance data to the base station, and the base station broadcasts the VRS-based positioning assistance data. There is not only one type of positioning method or one type of positioning assistance data.

It should be noted that, the positioning assistance data provided in this embodiment of the present invention not only may be classified based on the positioning capabilities and/or positioning precision and/or positioning service types of the UEs that need to be positioned, but also may be classified based on a data type of the positioning assistance data.

For example, the data type of the positioning assistance data may include a satellite ephemeris type, an ionosphere error type, a geometric error type, a satellite clock error type, a troposphere error type, a track error type, and the like. That is, the type of the positioning assistance data provided in this embodiment of the present invention may include a satellite ephemeris type, an ionosphere error type, a geometric error type, a satellite clock error type, a troposphere error type, a track error type, and the like.

In addition, the positioning assistance data is classified based on the data type of the positioning assistance data, and may be alternatively classified into positioning assistance data at different frequencies, positioning assistance data at different data rates, or positioning assistance data with different quantities of repetitions. Details are not described in this embodiment of the present invention.

During specific implementation, in an embodiment, the at least one piece of positioning assistance data generated by the positioning server may specifically include one or more data packets. However, the data packet may have a relatively large capacity, and needs to be segmented or split before the data packet is sent to the base station. For example, one data packet is split into a plurality of smaller packets. In a process of splitting a data packet, the positioning server can classify the positioning assistance data by type.

Each of the foregoing data packets may include different types of positioning assistance data, for example, a data packet (denoted as a data packet 1) includes positioning assistance data of a satellite ephemeris type, positioning assistance data of an ionosphere error type, and positioning assistance data of a satellite clock error type. In this case, the positioning server may split the data packet 1 into a sub-data packet a, a sub-data packet b, and a sub-data packet c. The sub-data packet a includes the positioning assistance data of the satellite ephemeris type, the sub-data packet b includes the positioning assistance data of the ionosphere error type, and the sub-data packet c includes the positioning assistance data of the satellite clock error type. In other words, the positioning server classifies the positioning assistance data in the data packet 1 into different types.

Alternatively, the data packet 1 includes positioning assistance data using a VRS method, positioning assistance data using a MAC method, and positioning assistance data using an FKP method. In this case, the sub-data packet a obtained by splitting the data packet 1 may include the positioning assistance data using the VRS method, the sub-data packet b may include the positioning assistance data using the MAC method, and the sub-data packet c may include the positioning assistance data using the FKP method.

S803. The positioning server sends the positioning assistance data of the different types to the base station corresponding to the first serving cell.

For example, step 803 may be performed by the communications interface 23 of the positioning server shown in FIG. 2.

Specifically, the positioning server may send, based on an identifier of the first serving cell, the positioning assistance data of the different types to the base station corresponding to the first serving cell. The identifier of the first serving cell may be obtained based on the positioning request sent by the core network device.

For example, the positioning server may send, to the base station, the positioning assistance data using the VRS method, the positioning assistance data using the MAC method, and the positioning assistance data using the FKP method that are in the at least one piece of positioning assistance data. The positioning assistance data sent by the positioning server to the base station may be specifically one or more data packets, and the data packets may be obtained by the positioning server through splitting.

In the positioning assistance data sending method provided in Method Embodiment 3, step 604 may be specifically step 804, and step 605 may be specifically step 805. For example, in the method shown in FIG. 7, step 604 in FIG. 6 may be specifically step 804, and step 605 may be specifically step 805.

S804. The base station corresponding to the first serving cell receives the positioning assistance data of the different types sent by the positioning server.

S805. The base station corresponding to the first serving cell broadcasts the positioning assistance data of the different types to the UEs in the first serving cell.

For example, step 804 and step 805 may be performed by the communications interface 33 of the base station shown in FIG. 3.

For example, the positioning server may obtain, through classification, at least one piece of positioning assistance data based on different positioning capabilities of the UEs that need to be positioned in the first serving cell, for example, to obtain positioning assistance data using a VRS method, positioning assistance data using a MAC method, positioning assistance data using an FKP method, and positioning assistance data using a PPP-RTK method that are in the at least one piece of positioning assistance data.

It should be noted that, in the positioning assistance data sending method provided in Method Embodiment 3 of this application, before determining to send the positioning assistance data in unicast mode or in broadcast mode, the positioning server classifies the positioning assistance data sent by the positioning server into different types, so that the base station can broadcast the positioning assistance data based on the different types. Therefore, the UEs that need to be positioned can obtain a corresponding type of positioning assistance data that is broadcast by the base station, improving positioning precision in a positioning process of the UEs.

Optionally, in a possible implementation, the step of "classifying the positioning assistance data of the UEs based on the positioning capabilities and/or the positioning precision and/or the positioning service types of the UEs that need to be positioned in the first serving cell" may be alternatively performed by the base station. In this case, in the positioning assistance data sending method provided in this embodiment of the present invention, step 605 may include step 605a and step 805. For example, step 605 in FIG. 6 may include step 605a and step 805.

S605a. The base station corresponding to the first serving cell classifies the positioning assistance data, to obtain the positioning assistance data of different types.

Specifically, the base station receives different types of data for broadcasting. For example, in a system information block (system information block, SIB), only positioning assistance data of a satellite ephemeris type is broadcast; in another SIB, positioning assistance data of an ionosphere error type is broadcast, and so on. Certainly, different transmission packets of one SIB may be alternatively classified.

Certainly, the positioning assistance data obtained by the base station may include positioning assistance data at different frequencies, positioning assistance data at different data rates, or positioning assistance data with different quantities of repetitions.

For example, step 605a may be performed by the processor 31 of the base station shown in FIG. 3.

Specifically, the base station may classify the positioning assistance data based on the positioning capabilities and/or the positioning precision and/or the positioning service types of the UEs that need to be positioned in the first serving cell, or separately send different received data.

S805. The base station corresponding to the first serving cell broadcasts the positioning assistance data of the different types to the UEs that need to be positioned in the first serving cell.

For example, the base station may classify at least one piece of positioning assistance data based on different positioning capabilities of the UEs served by the first serving cell, for example, to obtain positioning assistance data using a VRS method, positioning assistance data using a MAC method, and positioning assistance data using an FKP method that are in the at least one piece of positioning assistance data of the UEs served by the first serving cell.

It should be noted that the base station may classify the positioning assistance data into different types, and broadcast the positioning assistance data based on the different types. Therefore, the UEs that need to be positioned can obtain a corresponding type of positioning assistance data that is broadcast by the base station, improving positioning precision in a positioning process of the UEs.

After step 603, step 702, or step 803, a positioning assistance data sending method provided in Method Embodiment 4 of this application may further include step 901. For example, after step 702 in FIG. 7, the method shown in FIG. 9 may further include step 901.

S901. The positioning server sends a stop indication message to the base station corresponding to the first serving cell.

For example, step 901 may be performed by the communications interface 23 of the positioning server shown in FIG. 2.

The stop indication message is used to indicate that the positioning server stops sending the at least one piece of positioning assistance data to the base station. In this way, when the positioning server does not need to broadcast the positioning assistance data, the positioning server may send the positioning assistance data in unicast mode, so that the positioning assistance data is sent in unicast mode instead of in broadcast mode, and resources are properly used. The at least one piece of positioning assistance data sent by the positioning server to the base station may be specifically at least one data packet sent by the positioning server to the base station, and each data packet carries one piece of positioning assistance data. For example, the stop indication message may be carried in the last data packet.

Specifically, the stop indication message may alternatively be a field that is used to instruct to stop broadcasting and that is added to the last data packet carrying the positioning assistance data, where the last data packet is sent by the positioning server to the base station corresponding to the first serving cell. Alternatively, the stop indication message may be included in a data packet that carries only a field instructing to stop broadcasting. This is not limited in this embodiment of the present invention.

If it is determined that a second condition is met, the positioning server may send, based on the identifier of the first serving cell, the stop indication message to the base station corresponding to the first serving cell, where the stop indication message is used to indicate that sending of the at least one piece of positioning assistance data to the base station is stopped.

The second condition is any one of the following conditions 6 to 10, and there is an "and/or" relationship between the conditions 6 to 10.

6. The positioning server determines that the quantity of UEs that need to be positioned in the first serving cell is less than or equal to a fifth threshold, where the fifth threshold is less than or equal to the first threshold.

7. The positioning server determines that the quantity of UEs meeting any UE positioning capability in the UEs that need to be positioned in the first serving cell is less than or equal to a sixth threshold, where the sixth threshold is less than or equal to the second threshold.

8. The positioning server determines that the quantity of UEs meeting any supported positioning method in the UEs that need to be positioned in the first serving cell is less than or equal to a seventh threshold, where the seventh threshold is less than or equal to the third threshold.

9. The positioning server determines that the quantity of UEs meeting any positioning service type in the UEs that need to be positioned in the first serving cell is less than or equal to an eighth threshold, where the eighth threshold is less than or equal to the fourth threshold.

10. The positioning server receives second instruction information sent by the core network device, where the second instruction information is used to instruct to stop sending, in broadcast mode, the positioning assistance data to the UEs that need to be positioned in the first serving cell.

For specific descriptions of the second condition in this embodiment of the present invention, refer to descriptions of the first condition in the foregoing embodiment, and details are not described again in this embodiment of the present invention.

It should be noted that specific values of the fifth threshold, the sixth threshold, the seventh threshold, and the eighth threshold are not limited in this embodiment of the present invention, and the values do not affect realization of the objective of this application.

For example, in a process in which the positioning server generates the positioning assistance data that uses the VRS method, for example, when the counter 1 reaches three, the positioning server may restart the counter 1 after determining to broadcast the positioning assistance data that uses the VRS method. Subsequently, when the counter 1 cannot reach three, the positioning server may determine to send, in unicast mode, the positioning assistance data that uses the VRS method.

Optionally, in a process in which the positioning server generates the positioning assistance data that uses the VRS method, for example, when the counter 1 reaches three, the positioning server may start another counter (for example, the counter 2) after determining to broadcast the positioning assistance data that uses the VRS method. Subsequently, when the counter 2 cannot reach three, the positioning server may determine to send, in unicast mode, the positioning assistance data that uses the VRS method. This is not limited in this embodiment of the present invention.

In the positioning assistance data sending method provided in Method Embodiment 4 of this application, the positioning server obtains at least one of the positioning capability indication information, the positioning precision indication information, or the service type indication information of the UEs that need to be positioned, and receives the second instruction information sent by the core network device, and therefore can send the positioning assistance data first in broadcast mode and then in unicast mode. In this way, when the positioning assistance data does not need to be broadcast, for example, when there are a relatively small quantity of UEs that need to be positioned, the positioning assistance data can be sent only in unicast mode, improving resource utilization.

After the positioning server sends the stop indication message to instruct to stop sending the positioning assistance data in broadcast mode, after step 901, the method may further include step 902. After step 901, the positioning assistance data sending method shown in FIG. 9 may further include step 902.

S902. The base station corresponding to the first serving cell receives the stop indication message sent by the positioning server.

For example, step 902 may be performed by the communications interface 33 of the base station shown in FIG. 3.

After receiving the stop indication message, the base station corresponding to the first serving cell may stop broadcasting the positioning assistance data.

In a positioning assistance data sending method provided in Method Embodiment 5 of this application, whether the at least positioning assistance data is sent in broadcast mode or in unicast mode may be alternatively determined by the core network device. Specifically, after step 701, the method provided in this embodiment of the present invention may further include step 1001. For example, after step 701, the positioning assistance data sending method shown in FIG. 10A and FIG. 10B may further include step 1001.

S1001. When a first condition is met, the core network device sends first instruction information to the positioning server, where the first instruction information is used to instruct to send, in broadcast mode, the positioning assistance data to the UEs that need to be broadcast in the first serving cell.

For example, step 1001 may be performed by the communications interface 43 of the core network device shown in FIG. 4.

It should be noted that before sending the first instruction message to the positioning server, the core network device may receive a UE capability indication (for example, positioning capability indication information of the UE) sent by the positioning server to the core network. In addition, the first condition that is met is any one of the following conditions 11 to 14, and there is an "and/or" relationship between the conditions 11 to 14.

11. The core network device determines that a quantity of UEs that need to be positioned in the first serving cell is greater than a first threshold.

12. The core network device determines that a quantity of UEs meeting any positioning capability in the UEs that need to be positioned in the first serving cell is greater than a second threshold.

13. The core network device determines that a quantity of UEs meeting any supported positioning precision in the UEs that need to be positioned in the first serving cell is greater than a third threshold.

14. The core network device determines that a quantity of UEs meeting any positioning service type in the UEs that need to be positioned in the first serving cell is greater than a fourth threshold.

For descriptions of the conditions 11 to 14 in this embodiment of the present invention, refer to specific descriptions of the conditions 1 to 4 in the foregoing embodiment. Details are not described again in this embodiment of the present invention.

Specifically, if the core network device determines, based on the conditions 12 to 14, to broadcast the positioning assistance data, before step 1001, the positioning assistance data sending method provided in this embodiment of the present invention may further include step 1001*a* and step 1001*b*. For example, before step 1001, the method shown in FIG. 10A and FIG. 10B may further include step 1001*a* and step 1001*b*.

S1001*a*. The positioning server sends the first message of the UE to the core network device.

For example, step 1001*a* may be performed by the communications interface 23 of the positioning server shown in FIG. 2.

The UE may be UE that needs to be positioned in the first serving cell. In addition, the positioning server may send, to the core network device, a first message of one or more UEs that need to be positioned in the first serving cell.

S1001*b*. The core network device receives the first message of the UE sent by the positioning server.

For example, step 1001*b* may be performed by the communications interface 43 of the core network device shown in FIG. 4.

Optionally, the core network device may alternatively obtain the first information of the UE that needs to be positioned in the first serving cell, by referring to the method in step 701*a* to step 701*c* and step 701 in which the positioning server interacts with the UE that needs to be positioned in the first serving cell to obtain the first information of the UE that needs to be positioned in the first serving cell. Details are not described again in this embodiment of the present invention.

It may be figured out that after the core network device sends the first instruction information to the positioning server, the positioning server receives the first instruction information, and then can determine that the condition 14 in the first condition is met. In other words, after step 1001*b*, the positioning assistance data sending method provided in this embodiment may include step 801*e*. For example, after step 1001*b*, the method shown in FIG. 10A and FIG. 10B may further include step 801*e*.

Figure 9:
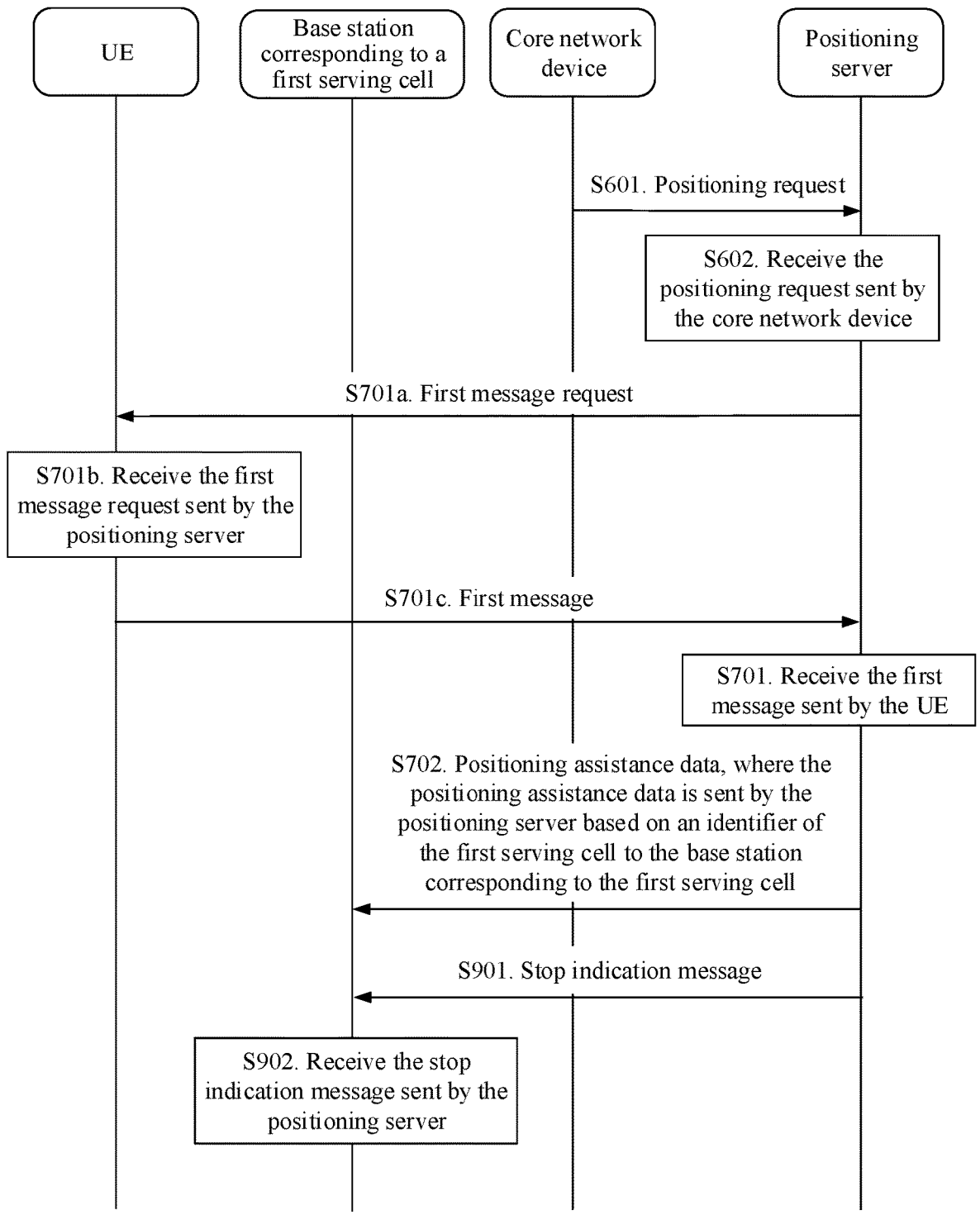
FIG. 9 is a fourth schematic flowchart of a positioning assistance data sending method according to an embodiment of the present invention.
Figure 10A:
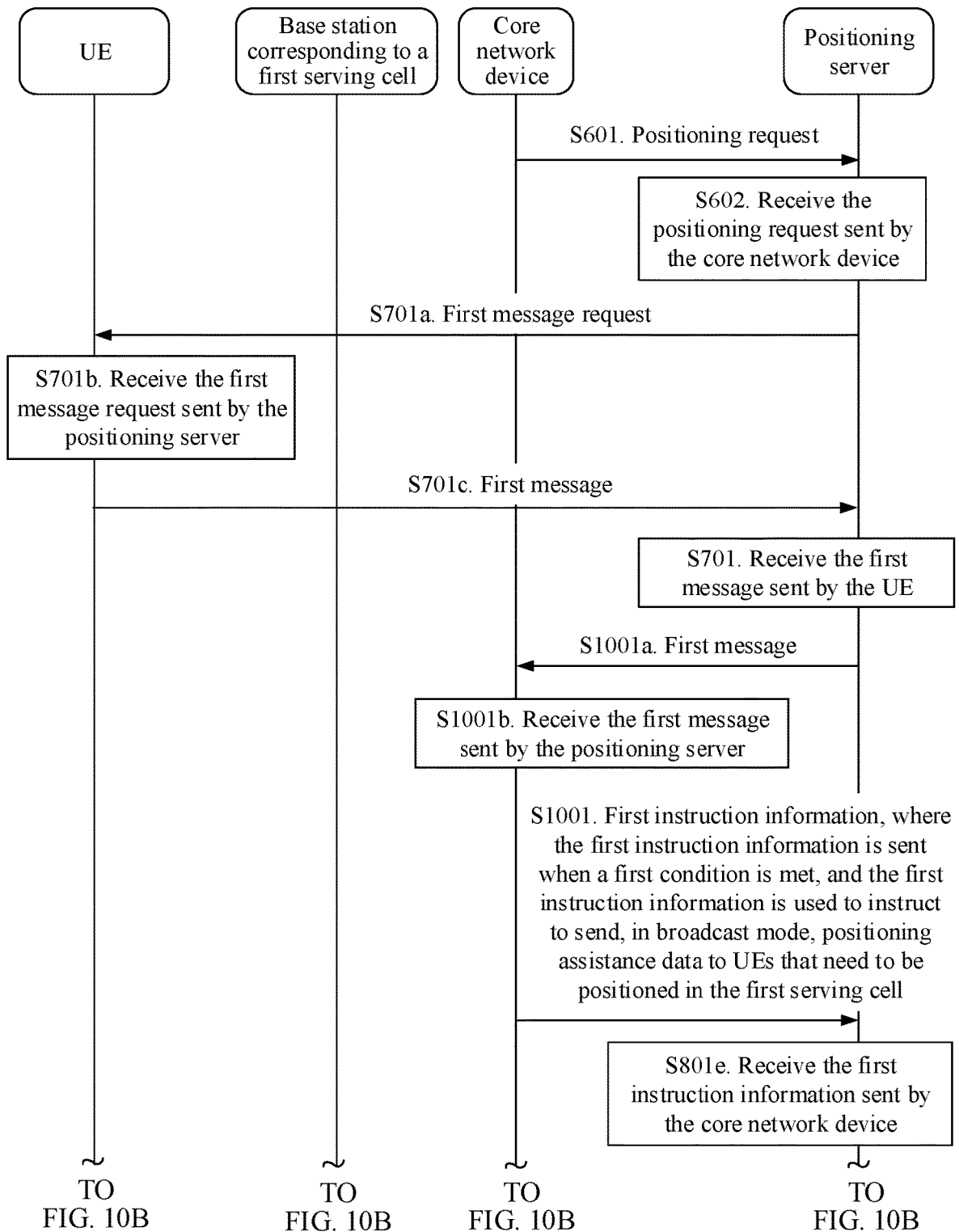
FIG. 10A and FIG. 10B are a fifth schematic flowchart of a positioning assistance data sending method according to an embodiment of the present invention.
Figure 10B:
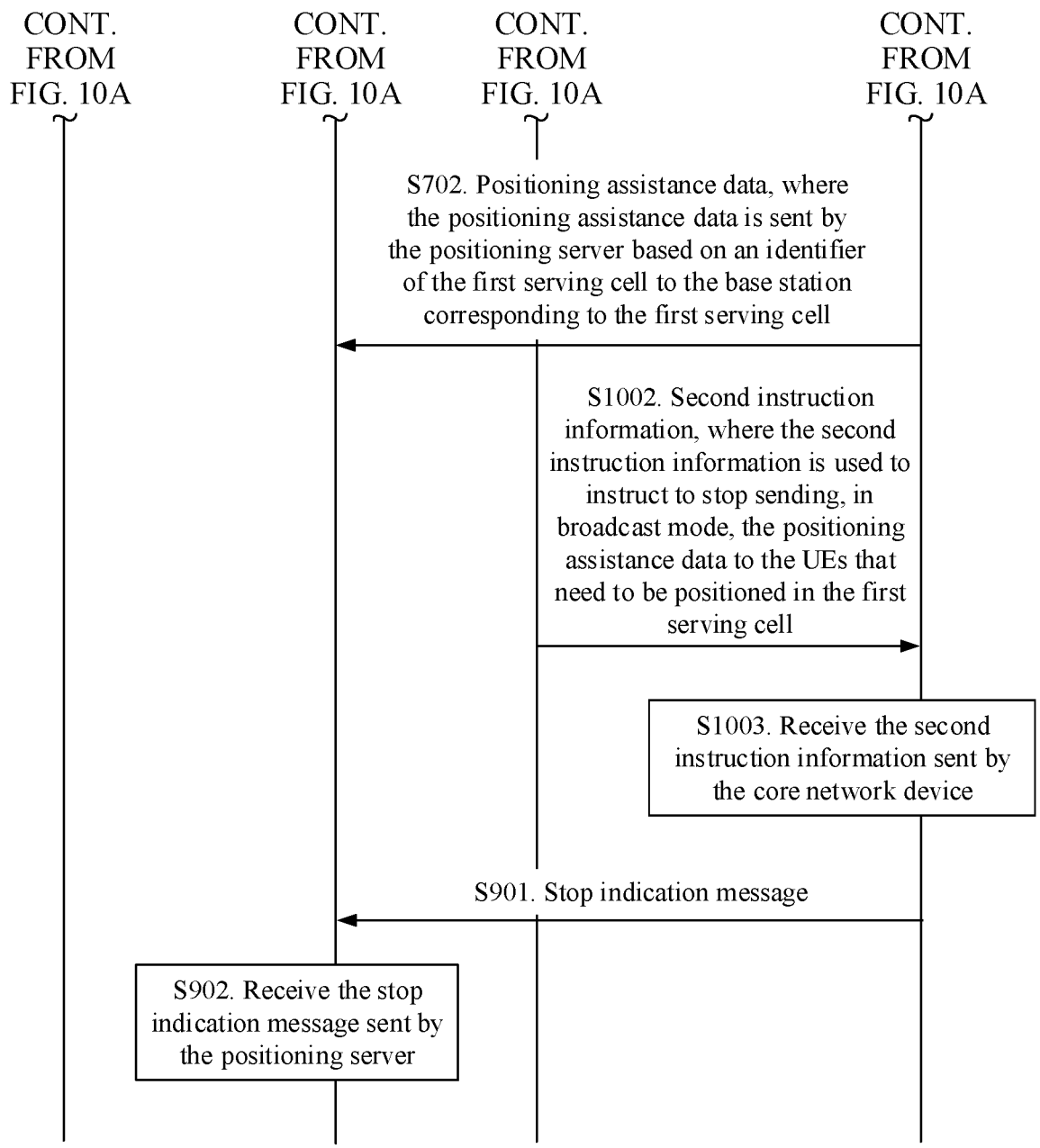

Similarly, before step 901 in FIG. 9, the method shown in FIG. 10A and FIG. 10B may further include step 1002 and step 1003.

S1002. The core network device sends second instruction information to the positioning server.

For example, step 1002 may be performed by the communications interface 43 of the core network device shown in FIG. 4.

S1003. The positioning server receives the second instruction information sent by the core network device, where the second instruction information is used to instruct to stop sending, in broadcast mode, the positioning assistance data to the UEs that need to be positioned in the first serving cell.

For example, step 1003 may be performed by the communications interface 23 of the positioning server shown in FIG. 2.

Specifically, if it is determined that a second condition is met, the core network device sends the second instruction information to the positioning server.

In this embodiment of the present invention, the second condition that the core network device meets is any one of the following conditions 15 to 18, and there is an "and/or" relationship between the conditions 15 to 18.

15. The core network device determines that the quantity of UEs that need to be positioned in the first serving cell is less than or equal to a fifth threshold, where the fifth threshold is less than or equal to the first threshold.

16. The core network device determines that the quantity of UEs meeting any UE positioning capability in the UEs that need to be positioned in the first serving cell is less than or equal to a sixth threshold, where the sixth threshold is less than or equal to the second threshold.

17. The core network device determines that the quantity of UEs meeting any supported positioning method in the UEs that need to be positioned in the first serving cell is less than or equal to a seventh threshold, where the seventh threshold is less than or equal to the third threshold.

18. The core network device determines that the quantity of UEs meeting any positioning service type in the UEs that need to be positioned in the first serving cell is less than or equal to an eighth threshold, where the eighth threshold is less than or equal to the fourth threshold.

Referring to the detailed descriptions of the condition 1 on the side of the positioning server in the foregoing embodiment, it is assumed that the first threshold is 6. When the first condition on a side of the core network device is the condition 15:

If the first serving cell is the cell 1 shown in FIG. 1, and the quantity of UEs that need to be positioned in the first serving cell is 9 that is greater than 6, the first condition is met. Therefore, the core network device may determine to send, in broadcast mode, the positioning assistance data, for example, at least one piece of positioning assistance data, of the UEs served by the first serving cell. In this case, the core network device may instruct the positioning server to send the at least one piece of positioning assistance data of the UEs in the first serving cell to the base station, so that the base station corresponding to the first serving cell can broadcast the at least one piece of positioning assistance data.

If the first serving cell is the cell 2 shown in FIG. 1, and the quantity of UEs that need to be positioned in the first serving cell is 3 that is not greater than 6, the first condition cannot be met. Therefore, the core network device determines not to send, in broadcast mode, the at least one piece of positioning assistance data of the UEs that need to be positioned in the first serving cell, but may determine to send the at least one piece of positioning assistance data in unicast mode. In other words, the core network device does not instruct the positioning server to send the at least one piece of positioning assistance data of the UEs that need to be positioned in the first serving cell to the base station. In this case, the base station corresponding to the first serving cell cannot broadcast the at least one piece of positioning assistance data. In this case, the positioning server may separately interact with the UEs 151 to 153, that is, send the positioning assistance data in unicast mode, so that the UEs 151 to 153 separately obtain positioning assistance data of the UEs 151 to 153.

Similarly, for detailed descriptions of the conditions 16 to 18 in the first condition on the side of the core network device in this embodiment of the present invention, refer to detailed descriptions of the conditions 2 to 4 in the first condition on the side of the positioning server in the foregoing embodiment. Details are not described herein again.

In the positioning assistance data sending method provided in this embodiment of the present invention, both the positioning server and the core network device can determine whether the positioning assistance data is sent in broadcast mode or in unicast mode. Therefore, even if either the positioning server or the core network device cannot determine switching to the broadcast mode or the unicast mode, the other can perform the determining, so that the switching between the broadcast mode and the unicast mode that are used for the positioning assistance data is more reliable.

It should be noted that, in the positioning assistance data sending method provided in this embodiment of the present invention, when a network element such as the positioning server or the core network device determines to broadcast the positioning assistance data, in a process of generating or obtaining the positioning assistance data of the UE in the first serving cell, the positioning server may not interact with the UE in the first serving cell, but may interact with the base station, to obtain location indication information of the base station corresponding to the first serving cell.

Specifically, the positioning request of the UE that needs to be positioned in the first serving cell carries the location indication information of the base station corresponding to the first serving cell. In this case, the positioning server does not need to interact with the UE that needs to be positioned in the first serving cell, to obtain the location indication information of the base station.

Optionally, the positioning server may alternatively obtain location indication information of the base station (that is, a location of the base station) based on deployment. In this case, the positioning server does not need to interact with the base station, for example, does not need to interact with the base station corresponding to the first serving cell. This is not limited in this embodiment of the present invention.

Figure 11A:
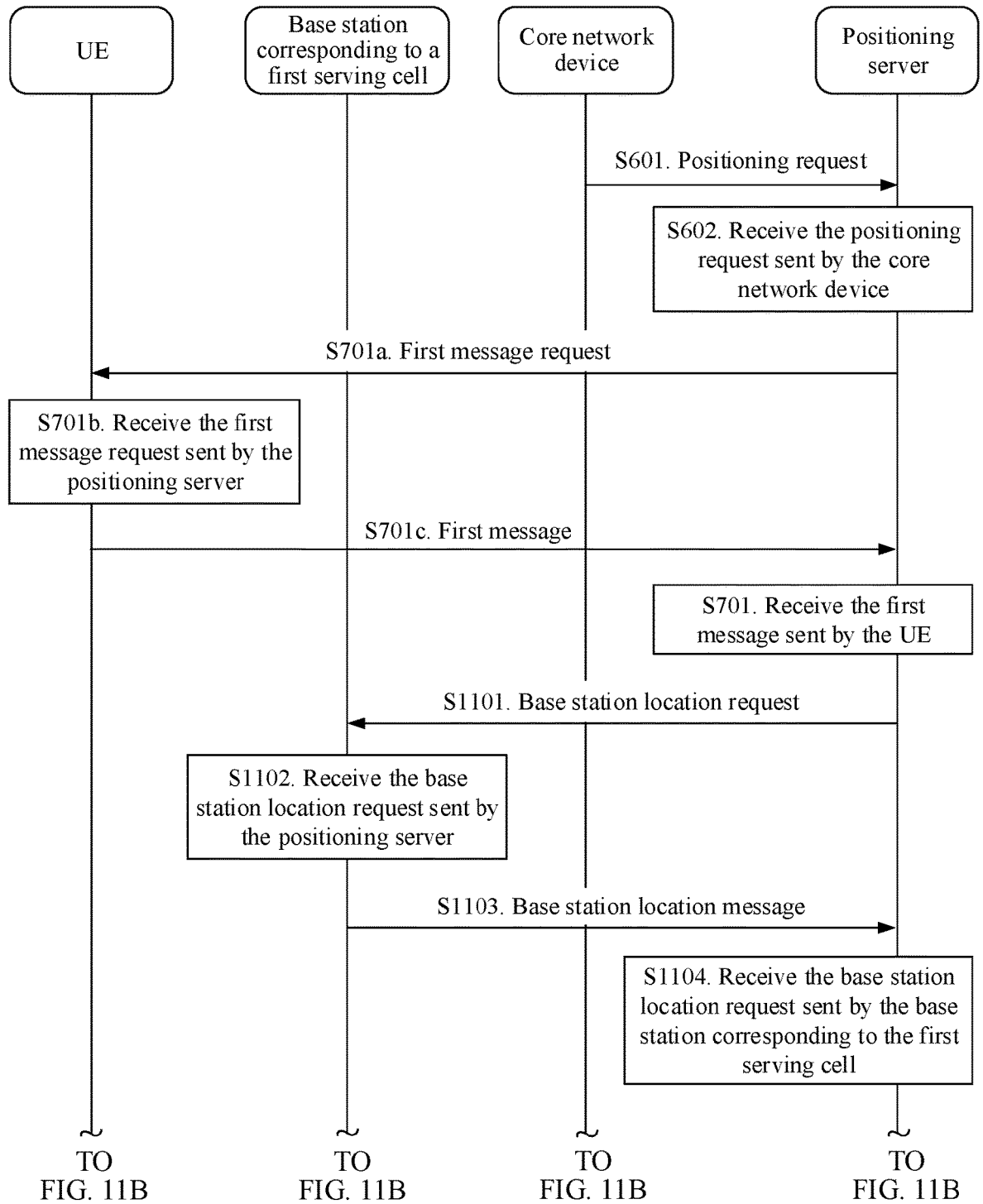
FIG. 11A and FIG. 11B is a sixth schematic flowchart of a positioning assistance data sending method according to an embodiment of the present invention.
Figure 11B:
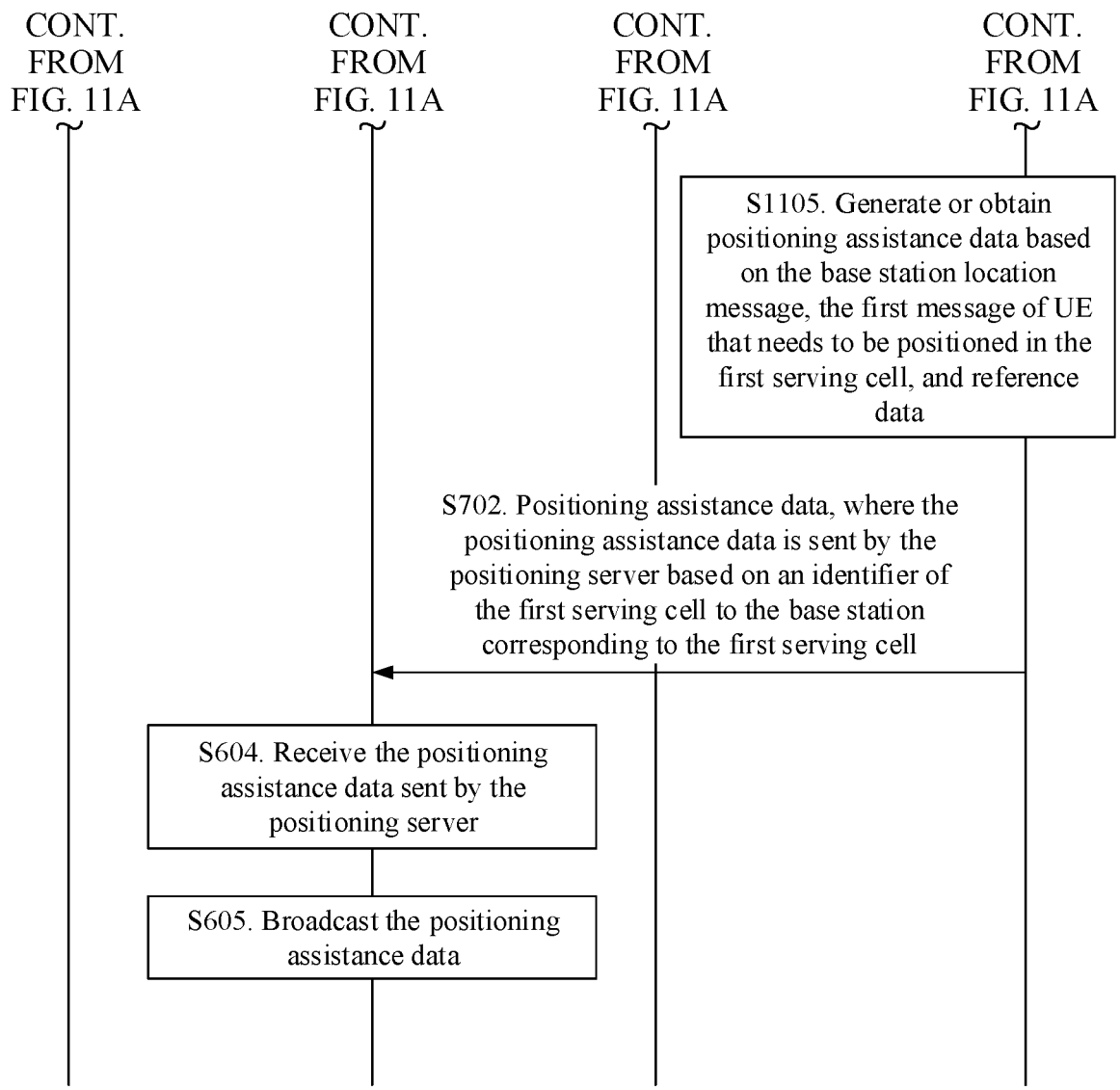
Figures 1, 11A:
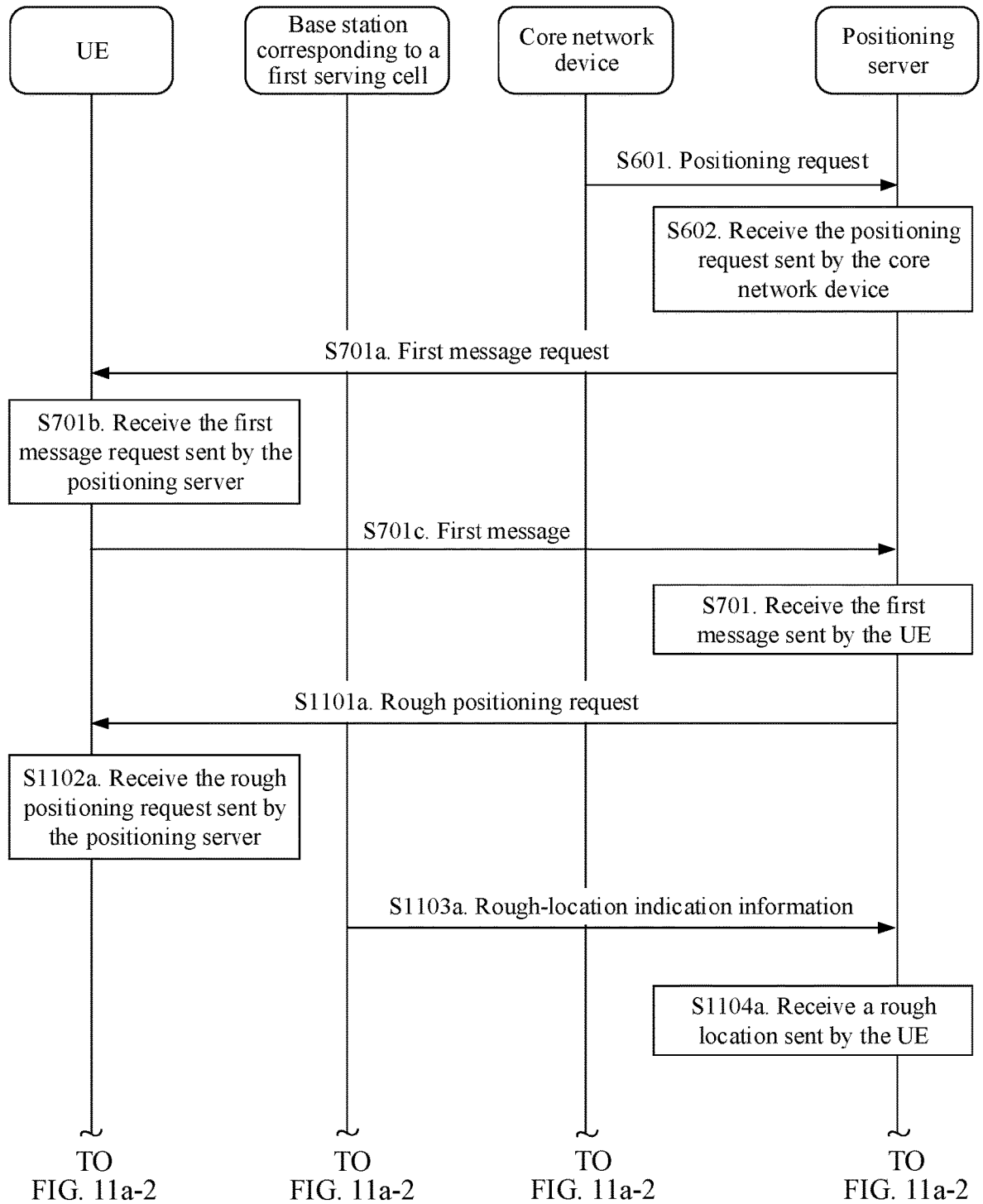
Figures 2, 11A:
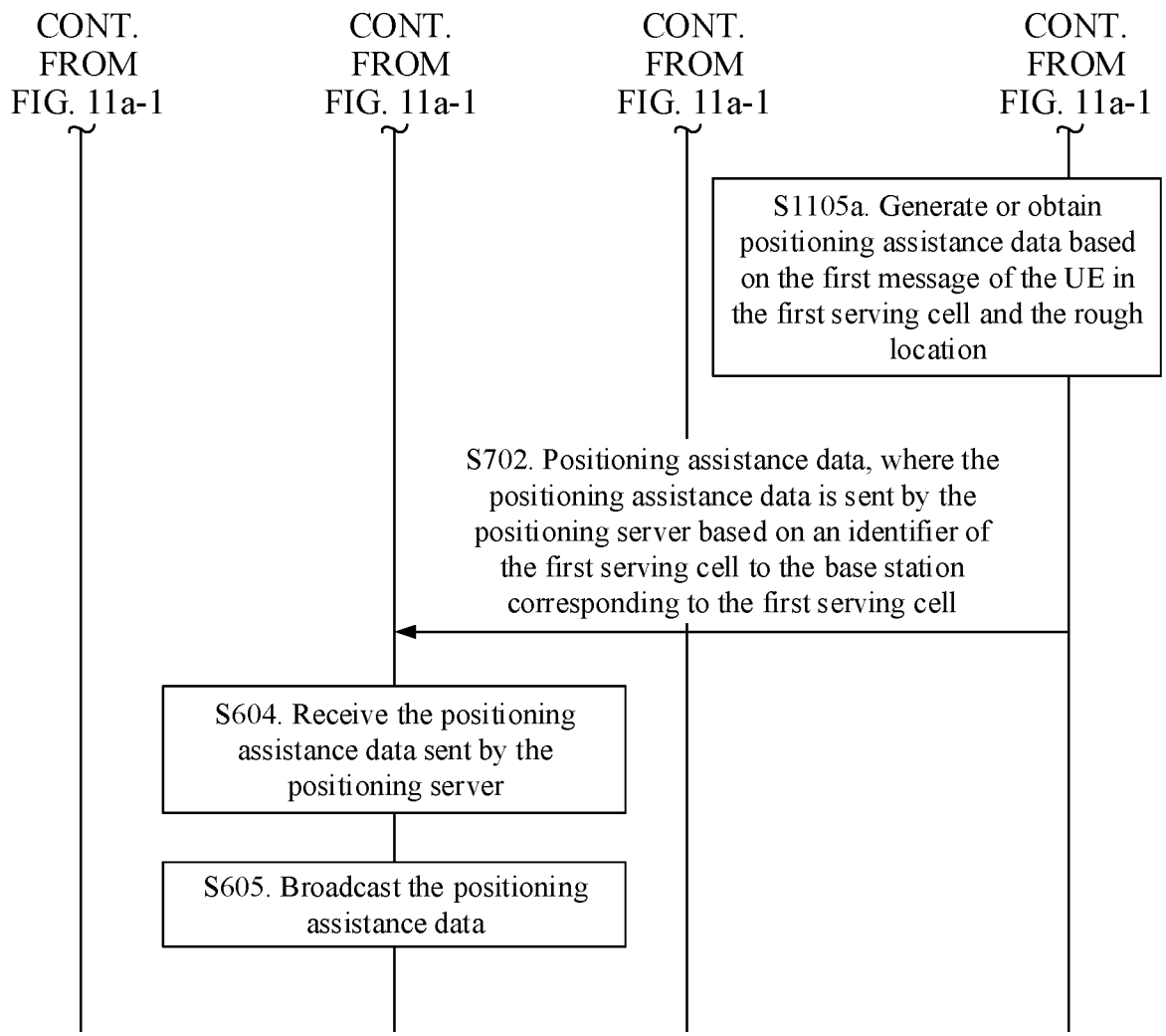

For example, in the following embodiments of the present invention, the following describes the positioning assistance data sending method provided in the embodiments of the present invention by merely using an example in which the positioning server interacts with the base station corresponding to the first serving cell, to obtain a location message of the base station corresponding to the first serving cell. Specifically, before step 603, step 702, or step 803, a positioning assistance data sending method provided in Method Embodiment 6 of this application may further include step 1101 to step 1104. For example, before step 702 in FIG. 7, the method shown in FIG. 11A and FIG. 11B may further include step 1101 to step 1104.

S1101. The positioning server sends a base station location request to the base station corresponding to the first serving cell.

For example, step 1101 may be performed by the communications interface 23 of the positioning server shown in FIG. 2.

The location request is used to request location indication information of the base station corresponding to the first serving cell, and the location indication information of the base station may indicate a location of the base station and/or a location of a cell antenna of the first serving cell.

S1102. The base station corresponding to the first serving cell receives the base station location request sent by the positioning server.

For example, step 1102 may be performed by the communications interface 33 of at least one base station shown in FIG. 3.

S1103. The base station corresponding to the first serving cell sends a base station location message to the positioning server.

For example, step 1103 may be performed by the communications interface 33 of the base station shown in FIG. 3.

Specifically, the base station location message may include the location indication information of the base station corresponding to the first serving cell.

S1104. The positioning server receives the base station location message sent by the base station corresponding to the first serving cell.

For example, step 1104 may be performed by the communications interface 23 of the positioning server shown in FIG. 2.

Before step 603, step 702, or step 803, the positioning assistance data sending method provided in Method Embodiment 6 of this application may further include step 1105. For example, before step 702 in FIG. 7, the method shown in FIG. 11A and FIG. 11B may further include step 1105.

S1105. The positioning server generates or obtains the positioning assistance data based on the base station location message, the first message of the UE that needs to be positioned in the first serving cell, and reference data.

For example, step 1105 may be performed by the communications interface 23 of the positioning server shown in FIG. 2.

The positioning assistance data may be one or more pieces of positioning assistance data of the UE that needs to be positioned in the first serving cell.

It should be noted that, although a specific step of interaction between the positioning server and a reference station is not shown in the positioning assistance data sending method provided in this embodiment of the present invention, before step 1105, the positioning server may interact with the reference station to obtain the reference data provided by the reference station. A person skilled in the art can easily implement this step. Details are not described in this embodiment of the present invention.

In the positioning assistance data sending method provided in this embodiment of the present invention, the positioning assistance data may be generated based on the positioning capability indication information and/or the positioning precision indication information and/or the service type indication information of the UE, the base station location message (that is, the location of the base station and/or the location of the cell), and the reference data. In other words, the positioning assistance data may be obtained by the positioning server by using an RTK technology. That is, positioning precision of the positioning assistance data is relatively high.

It should be noted that when a network element such as the positioning server or the core network device determines to send the positioning assistance data in unicast mode, in a process of generating or obtaining the positioning assistance data of the UE in the first serving cell, the positioning server may interact with the UE in the first serving cell, to obtain a rough location of the UE in the first serving cell. Specifically, before step 603, step 702, or step 803, the positioning assistance data sending method provided in Method Embodiment 6 of this application may further include step 1101a to step 1104a. For example, before step 702, the positioning assistance data sending method shown in FIG. 11a-1 and FIG. 11a-2 may further include step 1101a to step 1104a.

S1101a. The positioning server sends a rough-location request to the UE.

For example, step 1101a may be performed by the communications interface 23 of the positioning server shown in FIG. 2.

In step 702, the positioning server may separately send a rough-location request to one or more UEs that need to be positioned in the first serving cell, to request a rough location of corresponding UE.

S1102a. The UE receives the rough-location request sent by the positioning server.

For example, step 1102a may be performed by the communications interface 53 of at least one UE shown in FIG. 5.

The one or more UEs that need to be positioned in the first serving cell may separately receive a corresponding rough-location request sent by the positioning server.

S1103a. The UE sends a rough location to the positioning server.

For example, step 1103a may be performed by the communications interface 53 of the UE shown in FIG. 5.

Optionally, the one or more UEs that need to be positioned in the first serving cell may send their rough locations to the positioning server at a same moment or at different moments separately. This is not limited in this embodiment of the present invention.

For example, even if step 1102a is not performed, step 1104a may be performed for sending the positioning assistance data provided in this embodiment of the present invention. In this case, the rough location of the UE may be proactively reported by the UE to the positioning server.

S1104a. The positioning server receives the rough location sent by the UE.

For example, step 1104a may be performed by the communications interface 23 of the positioning server shown in FIG. 2.

The rough location of the UE is used to obtain a precise location of the UE or perform positioning measurement on the UE.

Specifically, before step 603, step 702, or step 803, the positioning assistance data sending method provided in Method Embodiment 6 of this application may further include step 1105a. For example, after step 1104a and before step 702 shown in FIG. 11a-1 and FIG. 11a-2, step 1105a may be further included: S1105a. The positioning server generates or obtains the positioning assistance data based on the first message of the UE that needs to be positioned in the first serving cell and the rough location.

For example, step 1105a may be performed by the communications interface 23 of the positioning server shown in FIG. 2.

Specifically, the positioning server may generate or obtain the positioning assistance data based on the first message of the UE that needs to be positioned in the first serving cell, the rough location, and the reference data. The reference data is sent by a reference station. The positioning assistance data is one or more pieces of positioning assistance data of one or more UEs that need to be positioned in the first serving cell.

In the positioning assistance data sending method provided in this embodiment of the present invention, the positioning assistance data is generated based on at least one of the positioning capability indication information, the positioning precision indication information, and/or the service type indication information of the UE that needs to be positioned, the rough location of the UE, and the reference data. In other words, the positioning assistance data provided in this embodiment of the present invention may be obtained by the positioning server by using an RTK technology. That is, positioning precision of the positioning assistance data is relatively high.

Figure 12:
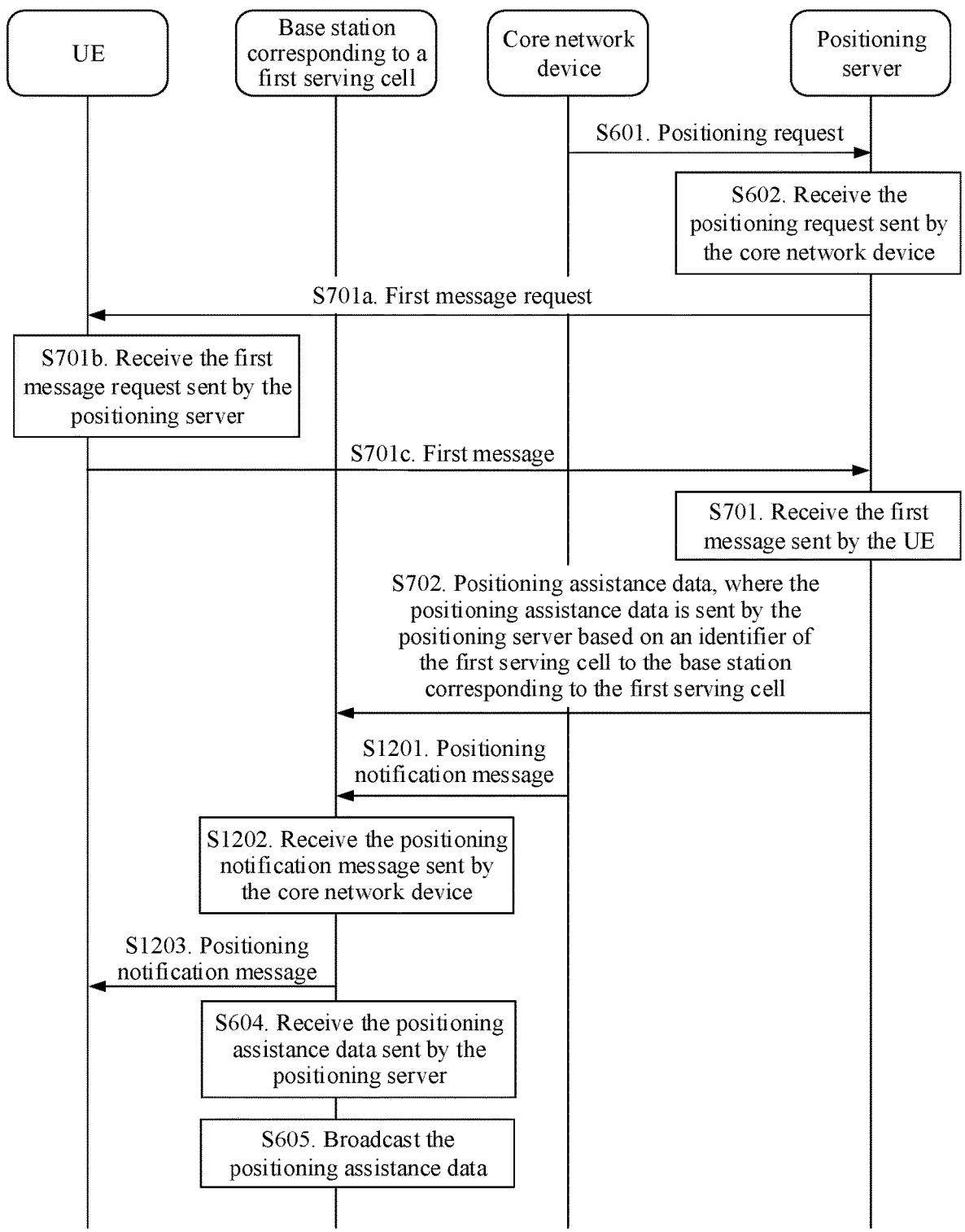
FIG. 12 is an eighth schematic flowchart of a positioning assistance data sending method according to an embodiment of the present invention.

In a positioning assistance data sending method provided in Embodiment 7 of this application, before step 604, step 1201 to step 1203 may be further included. For example, before step 604 in FIG. 7, the method shown in FIG. 12 may further include step 1201 to step 1203.

S1201. The core network device sends a positioning notification message to the base station corresponding to the first serving cell.

For example, step 1201 may be performed by the communications interface 43 of the core network device shown in FIG. 4.

The positioning notification message is used to indicate that positioning measurement and/or positioning-related calculation need to be performed when a positioning request is initiated by a network side for UE. The network side includes devices such as the core network device and the positioning server.

The positioning notification message may be a paging message. A specific implementation of performing positioning notification is as follows: The paging message carries a field used to indicate that the terminal needs to perform a positioning-related operation, such as a positioning request or a high-precision positioning request, or may include a request for a specific positioning method, such as an RTK positioning request or an OTDOA positioning request.

S1202. The base station corresponding to the first serving cell receives the positioning notification message sent by the core network device.

The positioning notification message carries the positioning request. For example, the positioning notification message may be a paging message that carries the positioning request.

It should be noted that, because the positioning notification message includes the positioning request, and each positioning request message in the positioning request includes the identifier of the UE and the identifier of the serving cell of the UE, when the base station subsequently receives the at least one piece of positioning assistance data, the base station can identify the UE and the first serving cell based on the identifier of the UE and the identifier of the serving cell of the UE.

S1203. The base station corresponding to the first serving cell sends the positioning notification message to the UE that needs to be positioned.

For example, both step 1202 and step 1203 may be performed by the communications interface 33 of the base station shown in FIG. 3.

Specifically, the positioning notification message sent by the base station to the UE may alternatively be a paging message. After receiving the paging message, the base station sends the paging message to the UE, where the paging message carries positioning request indication information of specific UE (for example, UE that needs to be positioned in the first serving cell). Further, the paging message may indicate a positioning method used by UE that requests to be positioned, such as an RTK method, an OTDOA method, or a PPP-RTK method. The positioning request may be carried in a paging record of the paging message, and a positioning request is performed for each UE. Specifically, the positioning request represented as the paging message indicates a positioning method, such as an RTK positioning request or an OTDOA request.

After receiving the paging message, the UE finds that there is a positioning request, for example, a positioning request using the RTK method or a positioning request using the OTDOA method. In this case, if the positioning assistance data including the positioning method is broadcast, the UE may obtain the positioning assistance data, and perform positioning calculation or positioning measurement. If an RTK method or a UE-based OTDOA method (UE-based OTDOA) is used, the UE performs positioning calculation. If a UE assisted-OTDOA method is used, the UE performs corresponding positioning measurement or calculation. After performing positioning calculation or positioning measurement, the UE enters a connected state from an idle state, and sends a calculation result or a measurement result to the positioning server.

Figure 13:
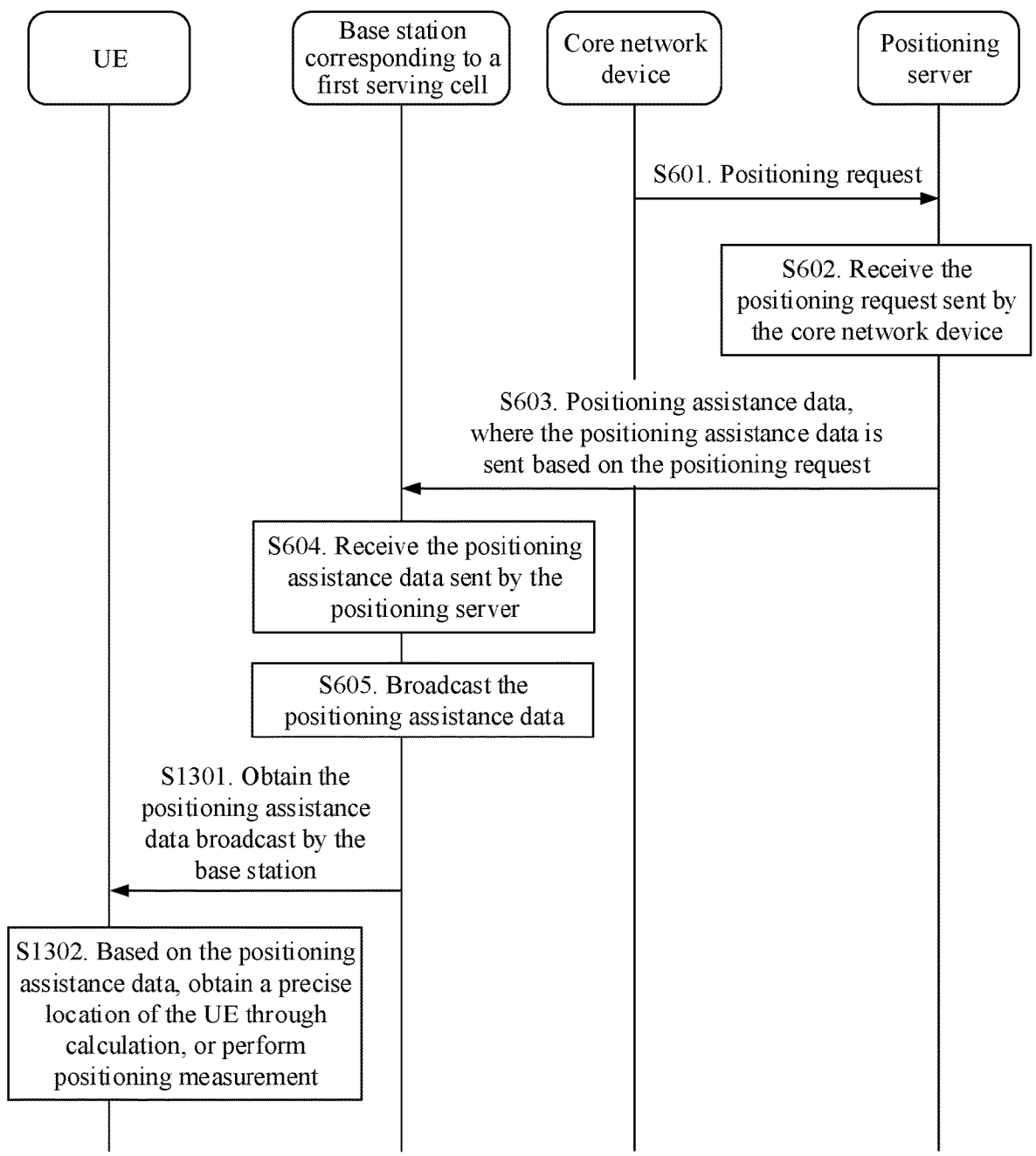
FIG. 13 is a ninth schematic flowchart of a positioning assistance data sending method according to an embodiment of the present invention.

After step 605, a positioning assistance data sending method provided in Method Embodiment 8 of this application may further include step 1301 and step 1302. For example, as shown in FIG. 13, after step 605 in FIG. 6, the method may further include step 1301 and step 1302.

S1301. The UE obtains the positioning assistance data broadcast by the base station.

For example, step 1301 may be performed by the communications interface 53 of the UE shown in FIG. 5.

One or more UEs that need to be positioned in the first serving cell may obtain corresponding positioning assistance data at different moments or at a same moment separately.

Specifically, when the UE triggers positioning, the UE needs to clearly know which type of positioning assistance data is broadcast. It is assumed that a plurality of types of assistance data may be broadcast in one SIB. If the UE is not notified of the assistance data, the UE may need to receive redundant information. Possible notification information may be an LPP message, a paging message, an RRC message, or the like.

Specifically, before reading a system message that carries the positioning assistance data, the UE may receive indication information, where the indication information is used to indicate which type of positioning assistance data is broadcast. If the base station notifies the UE of assistance data that is being broadcast currently, the base station may notify the UE by using an RRC message or a paging message. Alternatively, the positioning server may notify the UE by using an LPP message. Specific types include data using different positioning methods, data in different global navigation satellite systems (Global Navigation Satellite System, GNSS), positioning assistance data at different rates, or assistance data at different sending frequencies.

S1302. Based on the positioning assistance data, the UE obtains a precise location of the UE through calculation or performs positioning measurement.

For example, step 1301 may be performed by the processor 51 of the UE shown in FIG. 5.

Specifically, when the positioning assistance data is sent in broadcast mode, based on the corresponding positioning assistance data, UE in the first serving cell may obtain a precise location of the UE in the first serving cell through calculation or perform positioning measurement.

When the positioning assistance data is sent in unicast manner, based on the corresponding positioning assistance data and information that is obtained by the UE in the first serving cell through measurement, the UE may obtain a precise location of the UE or perform positioning measurement.

It should be noted that, in addition to receiving the positioning assistance data to calculate the positioning location, the UE may further perform precise calculation by using data sent by a satellite observed by the UE.

It should be noted that, in the positioning assistance data sending method provided in this embodiment of the present invention, the UE may obtain the positioning assistance data broadcast by the base station, and the positioning assistance data is obtained by using the RTK technology. For example, the positioning assistance data is obtained by the positioning server based on the rough location of the UE, the base station location message, or the positioning capability indication information of the UE. Therefore, positioning precision calculated based on the at least one piece of positioning assistance data by the UE that needs to be positioned is relatively high. In addition, because the at least one piece of positioning assistance data may be sent in broadcast mode, resource utilization is relatively high.

Figure 14:
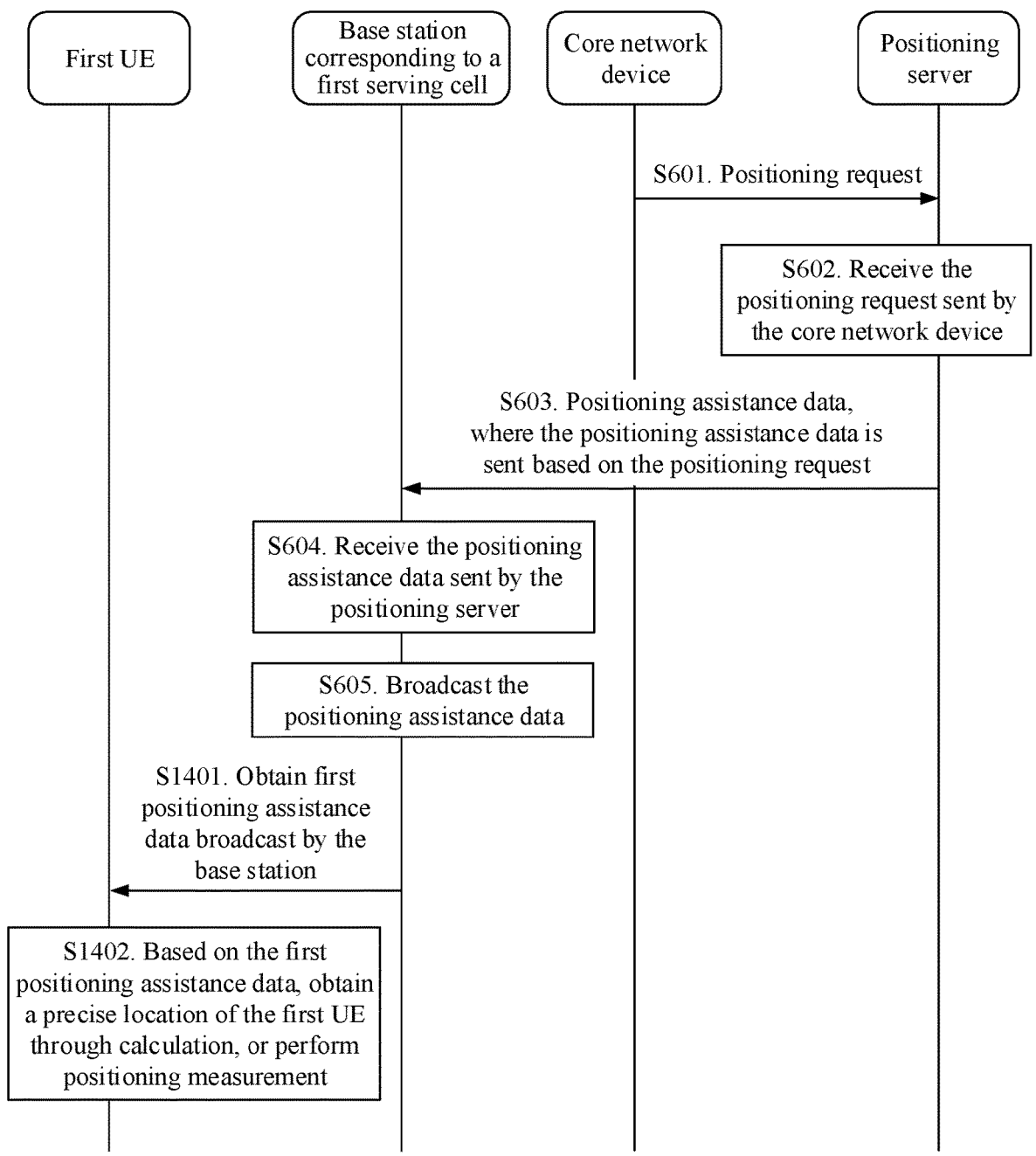
FIG. 14 is a tenth schematic flowchart of a positioning assistance data sending method according to an embodiment of the present invention.

In the following embodiments of the present invention, the positioning assistance data sending method provided in the embodiments of the present invention is further described by merely using an example in which the positioning server, the base station, and the core network device interact with one UE (first UE). In a positioning assistance data sending method provided in Method Embodiment 9 of this application, step 1301 and step 1302 shown in FIG. 13 may be replaced with step 1401 and step 1402. For example, in the positioning assistance data sending method shown in FIG. 14, step 1301 and step 1302 shown in FIG. 13 may be replaced with step 1401 and step 1402.

S1401. The first UE obtains first positioning assistance data broadcast by the base station corresponding to the first serving cell.

For example, step 1401 may be performed by the communications interface 53 of the UE shown in FIG. 5.

The first positioning assistance data is used by the first UE to obtain a precise location, or the first positioning assistance data is used by the first UE to perform positioning measurement. The first UE is UE served by the first serving cell, and the first UE corresponds to the first positioning assistance data.

S1402. Based on the first positioning assistance data, the first UE obtains the precise location of the first UE through calculation or performs positioning measurement.

For example, step 1402 may be performed by the processor 51 of the UE shown in FIG. 5.

Figure 15:
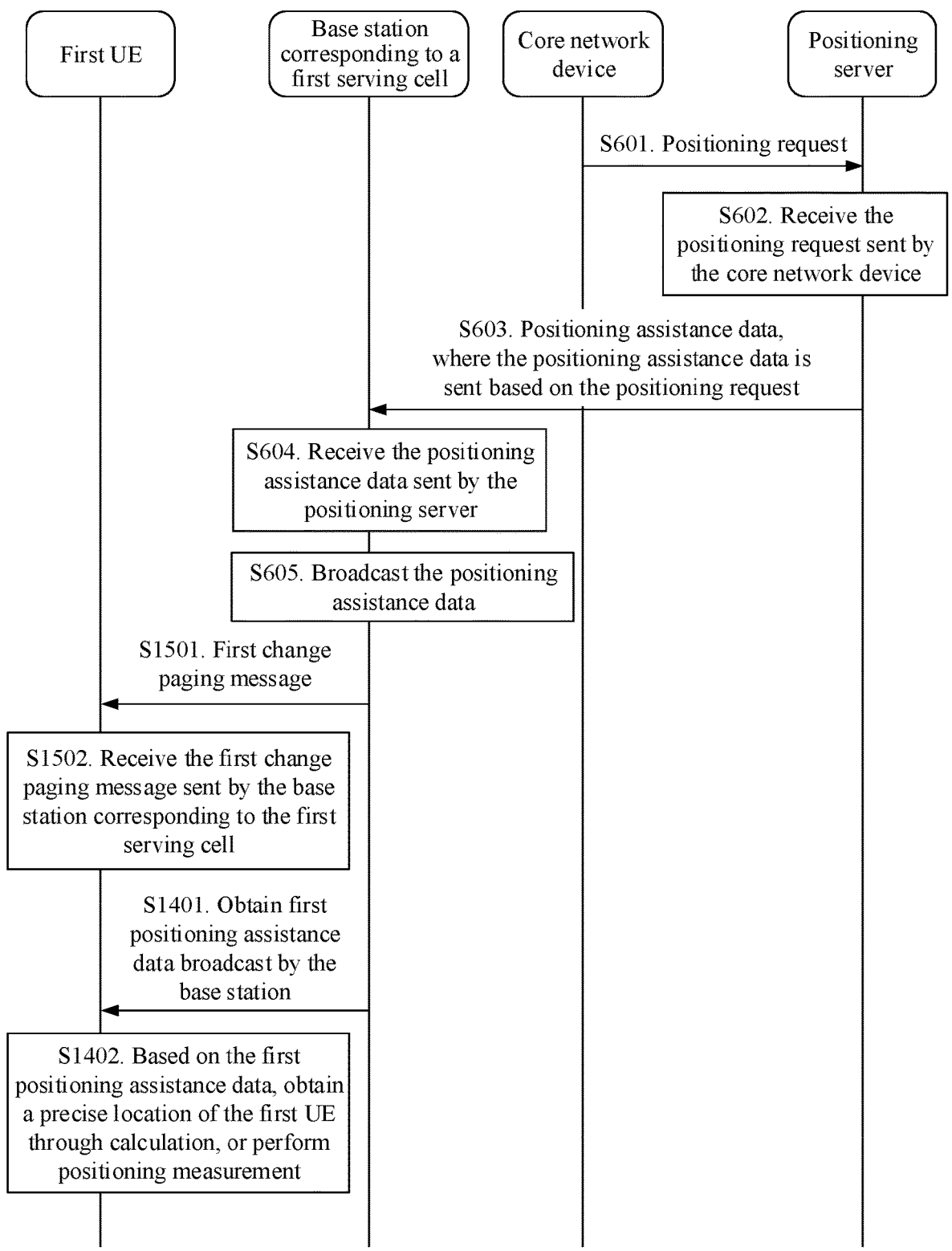
FIG. 15 is an eleventh schematic flowchart of a positioning assistance data sending method according to an embodiment of the present invention.

Because a quantity of UEs that need to be positioned may change, a positioning request received by the positioning server may change. Therefore, positioning assistance data generated based on the positioning request may change. Further, the positioning assistance data broadcast by the base station may change. Before step 605, a positioning assistance data sending method provided in Method Embodiment 10 of this application may further include step 1501. For example, before step 605 shown in FIG. 14, the method shown in FIG. 15 may further include step 1501.

S1501. The base station corresponding to the first serving cell sends a first change paging message to the first UE.

For example, step 1501 may be performed by the communications interface 33 of the base station shown in FIG. 3.

The first change paging message is a paging message that carries change indication information, and may be used to indicate that a system message related to the first positioning assistance data changes. For example, if at a first moment, a system message broadcast by the base station does not carry the first positioning assistance data, the first UE cannot obtain the first positioning assistance data from the system message broadcast by the base station. Subsequently, at a second moment, a system message broadcast by the base station carries the first positioning assistance data. In this case, the base station may send the first change paging message to the first UE, to instruct the first UE to obtain the first positioning assistance data through broadcasting. On the contrary, if the base station broadcasts the positioning assistance data of the UE at the first moment, and the base station stops broadcasting at the second moment, the base station may also send the paging message to the UE, to notify the base station that broadcasting of the positioning assistance data is stopped. The change indication message may be used to notify the UE of a change of the positioning assistance data, such as no change, an increase, a decrease, or an update, and specifically, may be a change indication of positioning assistance data (MAC, VRS, or FKP) related to the RTK method, a change indication of positioning assistance data using the OTDOA method, or an indication of another method. Specifically, for example, whether positioning assistance data in a VRS method changes is notified. That is, a specific change notification may indicate whether a system message related to a positioning method changes, such as a system message related to an RTK method, a system message related to a PPP-RTK method, or a system message related to a correction in a VRS method. This is not specifically limited.

S1502. The first UE receives the first change paging message sent by the base station corresponding to the first serving cell.

For example, step 1502 may be performed by the communication interface 53 of the UE shown in FIG. 5.

For example, after receiving the first change paging message, the first UE may learn whether the positioning assistance data changes or not, specifically, whether positioning assistance data related to a positioning method changes or not. Then, the first UE receives the assistance data or performs another operation based on a specific situation.

It should be noted that, in the method provided in this embodiment of the present invention, when the positioning assistance data is sent in broadcast mode, before the UE that needs to be positioned obtains the positioning assistance data of the UE, the UE may not receive a message from another network element. After the paging message that indicates a change of the system message and that is sent by the base station is received, corresponding positioning assistance data broadcast by the base station may start to be received. In this way, spectral efficiency and resource utilization in a positioning process of the UE that needs to be positioned can be improved.

In addition to indicating, by using the foregoing method, whether the system message changes or not, an indication message indicating whether the system message related to the positioning assistance data changes or not may alternatively be broadcast in the system message. For example, the indication message may carry a field or a value flag (value tag). Specifically, the field or value flag may be in a SIB 1 or in another system message. The UE may store a value related to a system message. When a value stored in the UE is different from the value flag in the system message, the UE may learn that the system message changes, and obtain the system message. Specifically, a change of the value flag is related only to one or more SIBs. Alternatively, a system message related to each method may include a value flag. For example, a SIB 25 includes a correction (for example, reference data) in a VRS method, and a SIB 26 includes an SSR-related correction that is in PPP-RTK. Therefore, two value flags or a bitmap may be used to indicate whether the system message changes. The value flag may be represented by one bit, two bits, or another quantity of bits. For example, two bits may indicate four values, and a value is increased by 1 each time the system message changes. A specific working principle is similar to an existing manner of setting a value flag in a SIB 1. The value flag may be in the SIB 1, a SIB 2, or another system message. The bitmap may be a string including a group of binary digits, and each bit may correspondingly indicate whether a system message changes. For example, if a bit in a bitmap in a system message changes from 0 to 1, it indicates that the system message changes; otherwise, it indicates that the system message remains unchanged. When the value stored in the terminal is different from the value of the value flag in the system message or the bit corresponding to the bitmap, it may be learned that the system message changes, and the system message is obtained.

The foregoing methods for indicating a change in the system message in a method related to the positioning assistance data may be used in combination. For example, when a value flag indicating a system message related to positioning assistance data in a SIB 1 changes, or a value flag used to indicate whether another system message changes in a SIB 1 changes, the UE may continue to query whether a value flag or a bitmap of a specific system message, for example, a value flag of a system message including a VRS method, changes. If the value flag or the bitmap of the system message changes, and the UE supports the positioning method, the UE needs to re-obtain the system message.

Specifically, after the paging message indicates that a system message related to the positioning assistance data changes or indicates that a system message changes, the UE may continue to query whether a value flag or a bitmap of a specific system message, for example, a value flag of a system message including a VRS method, changes. If the value flag or the bitmap of the system message changes, and the UE supports the positioning method, the UE needs to re-obtain the system message.

When the first UE is in an idle state, either the core network device or the base station may request to connect to the first UE. Specifically, when requesting to connect to the first UE, the core network device may send the paging message to the base station. In this case, the base station may send paging to the first UE, to indicate that the core network device is to connect to the first UE.

Figure 16:
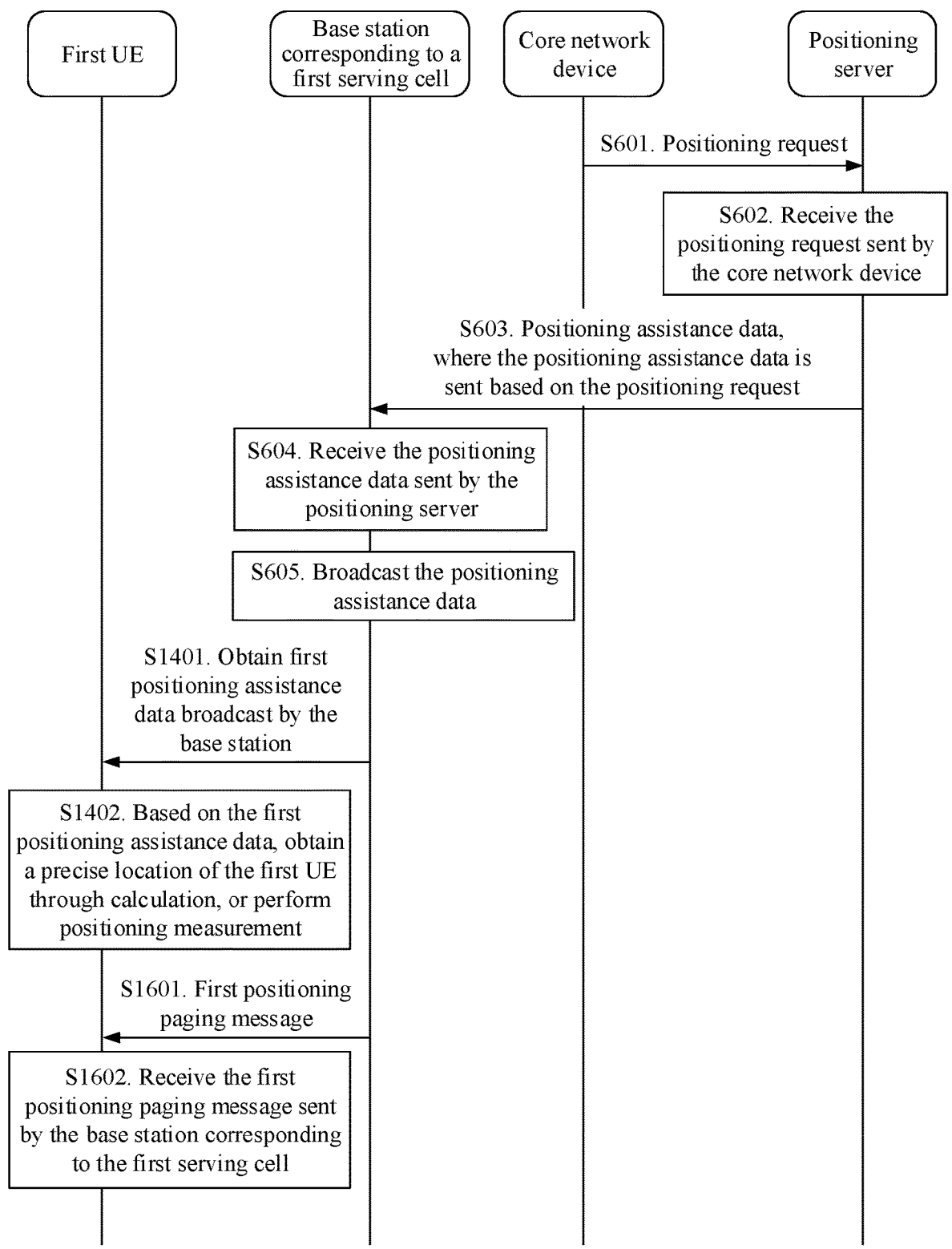
FIG. 16 is a twelfth schematic flowchart of a positioning assistance data sending method according to an embodiment of the present invention.

Specifically, after step 1302 or step 1402, a positioning assistance data sending method provided in Method Embodiment 11 of this application may further include step 1601 and step 1602. For example, after step 1402 in FIG. 14, the positioning assistance data sending method shown in FIG. 16 may further include step 1601 and step 1602.

S1601. The base station corresponding to the first serving cell sends a first positioning paging message to the first UE.

For example, step 1601 may be performed by the communications interface 33 of the base station shown in FIG. 3.

The first positioning paging message is a paging message that carries positioning request indication information, and is used to request to connect to the first UE.

S1602. The first UE receives the first positioning paging message sent by the base station corresponding to the first serving cell.

For example, step 1602 may be performed by the communications interface 53 of the UE shown in FIG. 5.

In this way, the first UE can establish a connection to the core network device or the base station, and interact with the core network device or the base station.

It should be noted that, before establishing the connection to the core network device or the base station, the first UE may obtain, based on the first positioning assistance data broadcast by the base station. Therefore, before connecting to the core network device or the base station, the first UE can be precisely positioned based on the first positioning assistance data, improving spectral efficiency and resource utilization.

Figure 17:
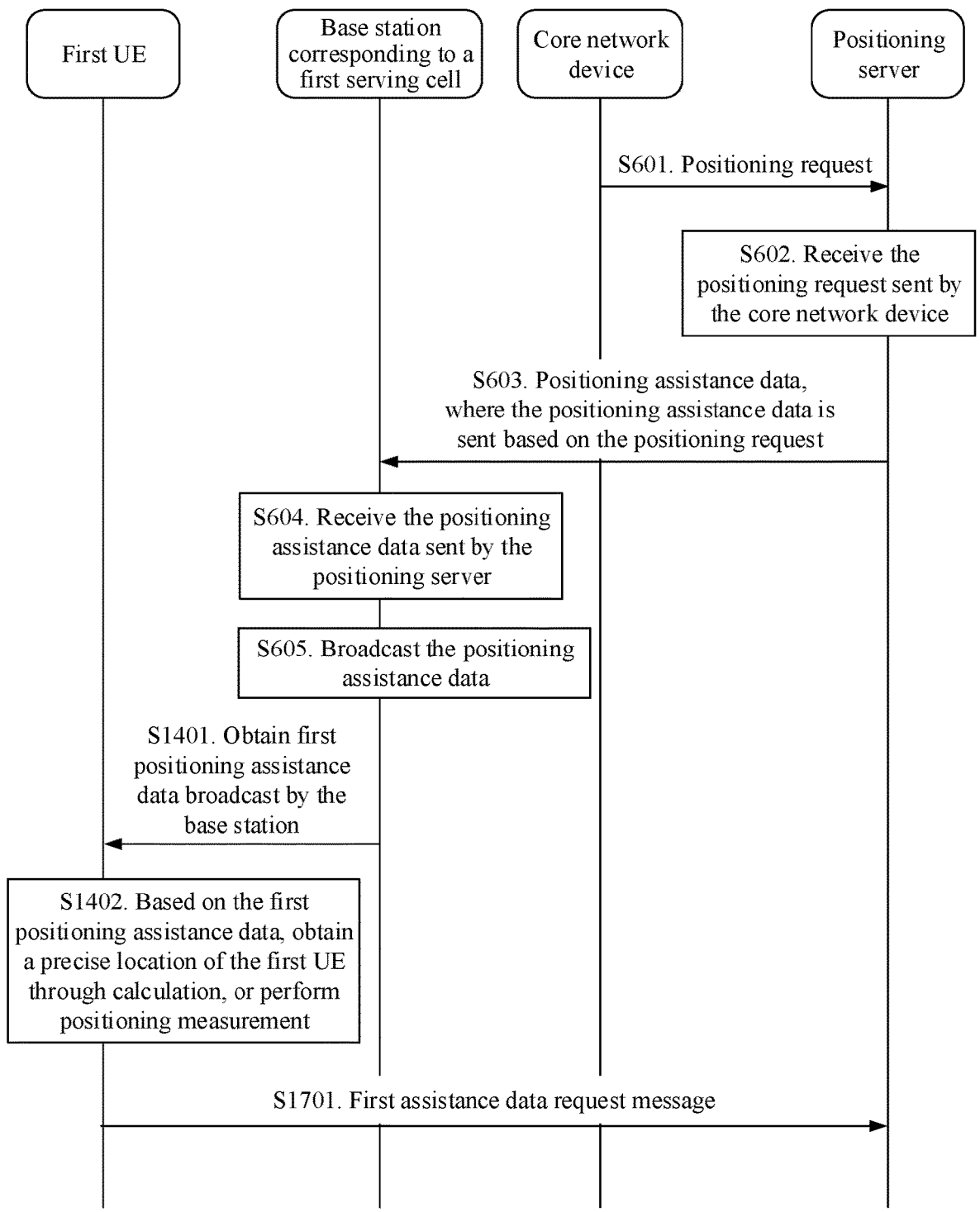
FIG. 17 is a thirteenth schematic flowchart of a positioning assistance data sending method according to an embodiment of the present invention.

After the first UE obtains the first positioning assistance data and obtains the precise location of the first UE, positioning precision of the precise location may not meet a requirement. In this case, after step 1402, a positioning assistance data sending method provided in Method Embodiment 12 of this application may further include step 1701. For example, after step 1402 in FIG. 14, the positioning assistance data sending method shown in FIG. 17 may further include step 1701.

S1701. The first UE sends a first assistance data request message to the positioning server.

For example, step 1701 may be performed by the communications interface 53 of the UE shown in FIG. 5.

The first assistance data request message carries additional request indication information used to request additional first positioning assistance information.

Specifically, after the UE has received the positioning assistance data through broadcasting, if precision of the positioning assistance data does not meet a precision requirement, the UE sends, to the positioning server, a message for requesting positioning assistance data. The message is used to request other positioning assistance information than the broadcast positioning assistance information. Specifically, the first assistance data request message may be a message that is indicated by adding an information element (information element, IE) or a field or by adding a new message. The positioning assistance data may be positioning assistance data using an OTDOA method or positioning assistance data using another method.

It should be noted that the positioning server may receive the first assistance data request message sent by the first UE, and interact with the first UE, so that the first UE obtains the additional first positioning assistance information. Therefore, the first UE may obtain, based on the additional first positioning assistance information, a precise location that meets the positioning precision of the first UE.

Optionally, after the first UE obtains the additional first positioning assistance data from the positioning server, and obtains a precise location of the first UE again, if positioning precision of the precise location still cannot meet a requirement, the first UE may send the first assistance data request message to the positioning server again, to obtain additional first positioning assistance data again.

In the positioning assistance data sending method provided in this embodiment of the present invention, the UE that needs to be positioned may obtain, based on positioning precision required by the UE, the positioning assistance data of the UE and one or more pieces of additional positioning assistance data that are generated on a side of the positioning server. In this way, positioning precision in a positioning process of the UE that needs to be positioned can be improved to meet the positioning precision required by the UE.

The foregoing mainly describes the solutions provided in the embodiments of the present invention from a perspective of interaction between network elements. It may be understood that, to implement the foregoing functions, various network elements such as the positioning server, the base station, the core network device, and the one or more UEs include corresponding hardware structures and/or software modules for performing the functions. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of the present invention, the positioning server, the base station, and the like may be divided into modules based on the foregoing method examples. For example, the modules are obtained through division based on corresponding functions, or two or more functions may be integrated into one processing module. The integrated module may be implemented in a form of hardware, or may be implemented in a form of a software module. It should be noted that, in the embodiments of the present invention, division into the modules is an example, and is merely a logical function division. In actual implementation, another division manner may be used.

Figure 18:
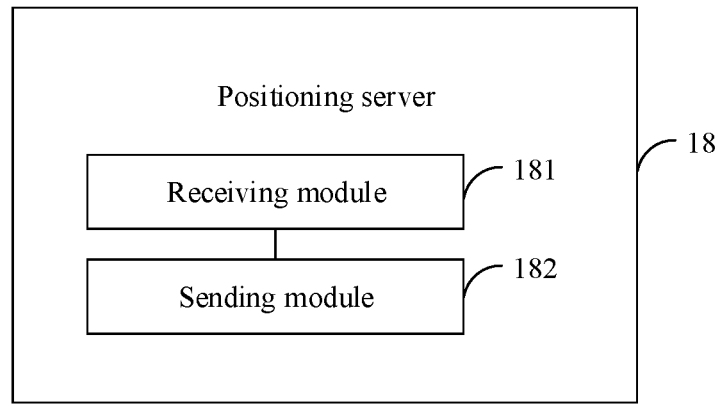
FIG. 18 is a second schematic structural diagram of a positioning server according to an embodiment of the present invention.

When each functional module is obtained through division based on each corresponding function, FIG. 18 is a possible schematic composition diagram of the positioning server provided in the foregoing embodiments. As shown in FIG. 18, the positioning server 18 may include a receiving module 181 and a sending module 182.

The receiving module 181 is configured to support the positioning server 18 in performing step 602, step 701, step 801e, step 1003, step 1104, and step 1104a in the foregoing embodiments, and/or is configured to perform another process in the technology described in this specification. The sending module 182 is configured to support the positioning server 18 in performing step 603, step 701a, step 702, step 803, step 901, step 1001a, step 1101, and step 1101a in the foregoing embodiments, and/or is configured to perform another process in the technology described in this specification.

Figure 19:
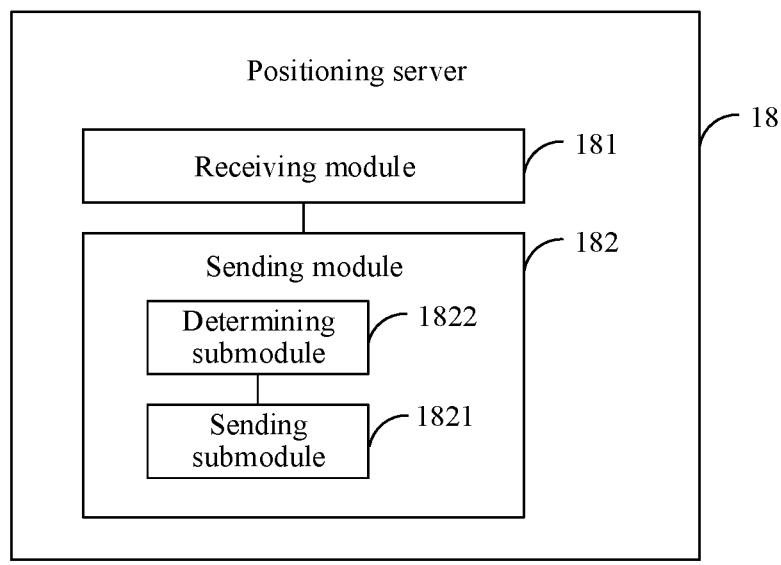
FIG. 19 is a third schematic structural diagram of a positioning server according to an embodiment of the present invention.

Further, FIG. 19 is another possible schematic composition diagram of the positioning server provided in the foregoing embodiments. In FIG. 19, the sending module 181 may include a sending submodule 1821 and a determining submodule 1822.

The sending submodule 1821 is configured to support the positioning server 18 in performing step 603, step 701a, step 701c, step 702, step 803, step 901, step 1001a, step 1101, and step 1101a in the foregoing embodiments, and/or is configured to perform another process in the technology described in this specification. The determining submodule 1822 is configured to support the positioning server 18 in performing step 801, step 801a, step 801b, step 801c, and step 801d in the foregoing embodiments, and/or is configured to perform another process in the technology described in this specification.

Figure 20:
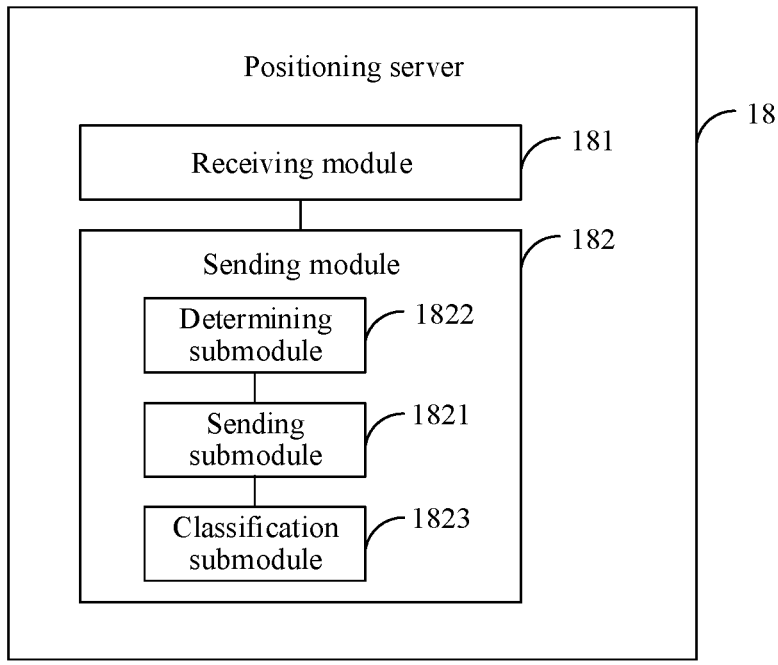
FIG. 20 is a fourth schematic structural diagram of a positioning server according to an embodiment of the present invention.

Further, FIG. 20 is another possible schematic composition diagram of the positioning server provided in the foregoing embodiments. In FIG. 20, the sending module 181 may include a classification submodule 1823.

The classification submodule 1823 is configured to support the positioning server 18 in performing step 802 in the foregoing embodiments, and/or is configured to perform another process in the technology described in this specification.

Figure 21:
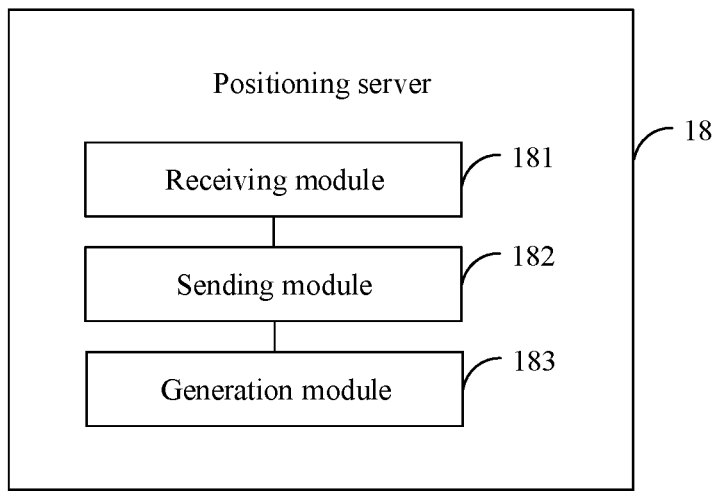
FIG. 21 is a fifth schematic structural diagram of a positioning server according to an embodiment of the present invention.

Further, FIG. 21 is another possible schematic composition diagram of the positioning server provided in the foregoing embodiments. In FIG. 21, the positioning server may further include a generation module 183.

The generation module 183 is configured to support the positioning server 18 in performing step 1105 and step 1105a in the foregoing embodiments, and/or is configured to perform another process in the technology described in this specification.

When an integrated unit is used, the determining submodule 1822, the classification submodule 1823, the generation module 183, and the like may be integrated into one processing module for implementation. The processing module may be a processor or a controller, for example, a CPU, a general-purpose processor, a digital signal processor (Digital Signal Processor, DSP), an application-specific integrated circuit (Application-Specific Integrated Circuit, ASIC), a field programmable gate array (Field Programmable Gate Array, FPGA), another programmable logic device, transistor logic device, or hardware component, or any combination thereof. The controller/processor may implement or execute various illustrative logical blocks, modules, and circuits described with reference to content disclosed in the present invention. The processing unit may be a combination implementing a computing function, for example, a combination of one or more microprocessors, or a combination of a DSP and a microprocessor. The sending submodule 1821 and the receiving module 182 may be integrated into one communications interface. A storage module may be a memory.

With reference to the positioning server shown in FIG. 2 in the foregoing embodiment, the processing module may be one or more processors such as the processor 21 and the processor 25 shown in FIG. 2. The storage module may be the memory 22 shown in FIG. 2. The sending submodule 1821 may be implemented by using the communications interface 23.

The communications bus 24 may be specifically a peripheral component interconnect (Peripheral Component Interconnect, PCI) bus, an extended industry standard architecture (Extended Industry Standard Architecture, EISA) bus, or the like. The communications bus 24 may be classified into an address bus, a data bus, a control bus, and the like. This is not limited in this embodiment of the present invention.

It should be noted that, for detailed descriptions of the modules of the positioning server 18 provided in this embodiment of the present invention and technical effects brought after the modules perform related method steps in the foregoing embodiments, refer to related descriptions in the method embodiments of the present invention. Details are not described herein.

Figure 22:
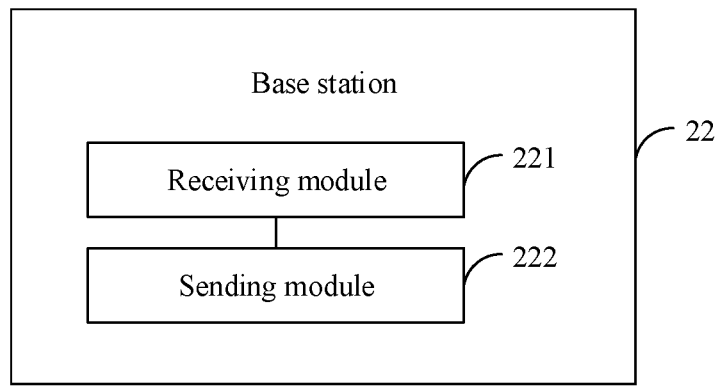
FIG. 22 is a second schematic structural diagram of a base station according to an embodiment of the present invention.

When each functional module is obtained through division based on each corresponding function, FIG. 22 is a possible schematic composition diagram of the base station provided in the foregoing embodiments. As shown in FIG. 22, the base station 22 may include a receiving unit 221 and a sending unit 222.

The receiving module 221 is configured to support the base station 22 in performing step 604, step 804, step 902, step 1102, step 1202, and step 1401 in the foregoing embodiments, and/or is configured to perform another process in the technology described in this specification. The sending module 222 is configured to support the base station 22 in performing step 605, step 805, step 1103, step 1203, step 1301, step 1501, and step 1601 in the foregoing embodiments, and/or is configured to perform another process in the technology described in this specification.

Figure 23:
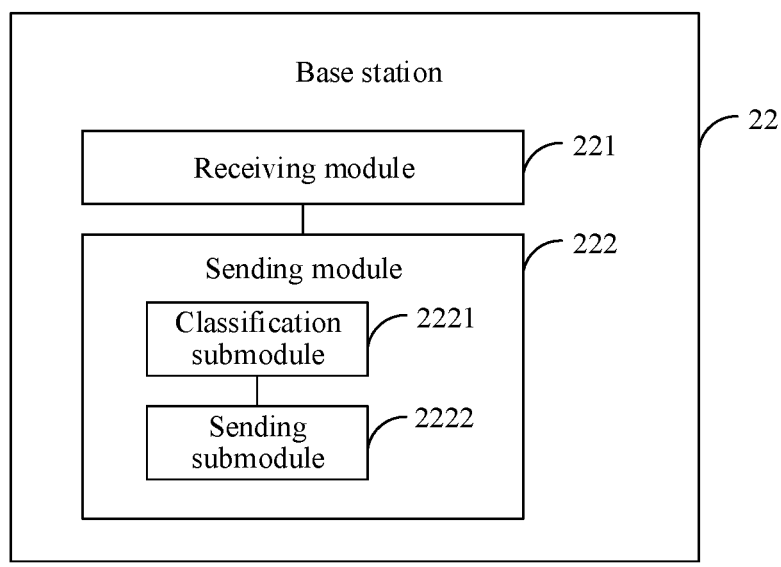
FIG. 23 is a second schematic structural diagram of a base station according to an embodiment of the present invention.

Further, FIG. 23 is another possible schematic composition diagram of the base station provided in the foregoing embodiments. In FIG. 23, the sending module 222 may include a classification submodule 2221 and a sending submodule 2222.

The classification submodule 2221 is configured to support the base station 22 in performing step 605a in the foregoing embodiment, and/or is configured to perform another process in the technology described in this specification. The sending submodule 2222 is configured to support the base station 22 in performing step 605, step 805, step 1103, step 1301, step 1501, and step 1601 in the foregoing embodiments, and/or is configured to perform another process in the technology described in this specification.

When an integrated unit is used, the classification submodule 2221 may be implemented by a processing module. The processing module may be a processor or a controller, for example, a CPU, a general-purpose processor, a DSP, an ASIC, an FPGA, another programmable logic device, transistor logic device, or hardware component, or any combination thereof. The controller/processor may implement or execute various illustrative logical blocks, modules, and circuits described with reference to content disclosed in the present invention. The processing unit may be a combination implementing a computing function, for example, a combination of one or more microprocessors, or a combination of a DSP and a microprocessor. The sending submodule 2222 and the receiving module 221 may be integrated into one communications interface. A storage module may be a memory.

With reference to the base station shown in FIG. 3 in the foregoing embodiment, the processing module may be one or more processors such as the processor 31 and the processor 35 shown in FIG. 3. The storage module may be the memory 32 shown in FIG. 3. The sending submodule 2222 may be implemented by using the communications interface 33.

The communications bus 34 may be specifically a PCI bus, an EISA bus, or the like. The communications bus 34 may be classified into an address bus, a data bus, a control bus, and the like. This is not limited in this embodiment of the present invention.

It should be noted that, for detailed descriptions of the modules of the base station 22 provided in this embodiment of the present invention and technical effects brought after the modules perform related method steps in the foregoing embodiments, refer to related descriptions in the method embodiments of the present invention. Details are not described herein.

Figure 24:
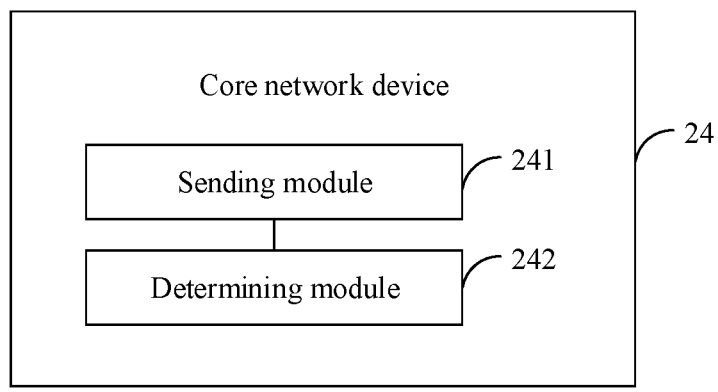
FIG. 24 is a second schematic structural diagram of a core network device according to an embodiment of the present invention.

When each functional module is obtained through division based on each corresponding function, FIG. 24 is a possible schematic structural diagram of the core network device provided in the foregoing embodiments. As shown in FIG. 24, the core network device 24 may include a sending module 241 and a determining module 242.

The sending module 241 is configured to support the core network device 24 in performing step 601, step 1001, step 1002, and step 1201 in the foregoing embodiments, and/or is configured to perform another process in the technology described in this specification. The determining module 242 is configured to support the core network device 24 in performing "determining that the first condition is satisfied" and "determining that the second condition is satisfied" in the foregoing embodiments, and/or is configured to perform another process in the technology described in this specification.

Figure 25:
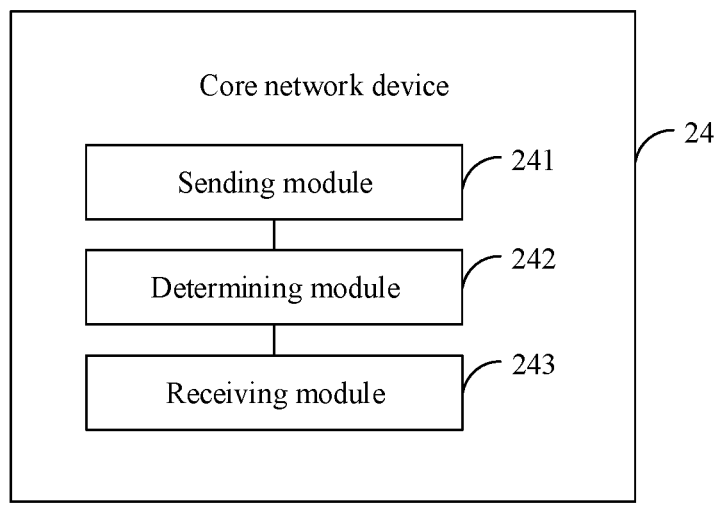
FIG. 25 is a third schematic structural diagram of a core network device according to an embodiment of the present invention.

Further, FIG. 25 is another possible schematic composition diagram of the core network device provided in the foregoing embodiments. In FIG. 25, the core network device 24 may further include a receiving module 243.

The receiving module 243 is configured to support the core network device 24 in performing step 1001b in the foregoing embodiment, and/or is configured to perform another process in the technology described in this specification.

When an integrated unit is used, the determining module 242 may be implemented by a processing module. The processing module may be a processor or a controller, for example, a CPU, a general-purpose processor, a DSP, an ASIC, an FPGA, another programmable logic device, transistor logic device, or hardware component, or any combination thereof. The controller/processor may implement or execute various illustrative logical blocks, modules, and circuits described with reference to content disclosed in the present invention. The processing unit may be a combination implementing a computing function, for example, a combination of one or more microprocessors, or a combination of a DSP and a microprocessor. The sending module 241 and the receiving module 243 may be integrated into one communications interface. A storage module may be a memory.

With reference to the core network device shown in FIG. 4 in the foregoing embodiment, the processing module may be one or more processors such as the processor 41 and the processor 45 shown in FIG. 4. The storage module may be the memory 42 shown in FIG. 4. The sending module 241 and the receiving module 243 may be integrated into the communications interface 43 for implementation.

The communications bus 44 may be specifically a PCI bus, an EISA bus, or the like. The communications bus 44 may be classified into an address bus, a data bus, a control bus, and the like. This is not limited in this embodiment of the present invention.

It should be noted that, for detailed descriptions of the core network device 24 provided in this embodiment of the present invention and technical effects brought after the modules perform related method steps in the foregoing embodiments, refer to related descriptions in the method embodiments of the present invention. Details are not described herein.

Because a positioning assistance data sending system provided in the embodiments of the present invention includes one or more UEs that may be the same. Therefore, in the embodiments of the present invention, merely division of any one of the one or more UEs into functional modules is specifically described.

Figure 26:
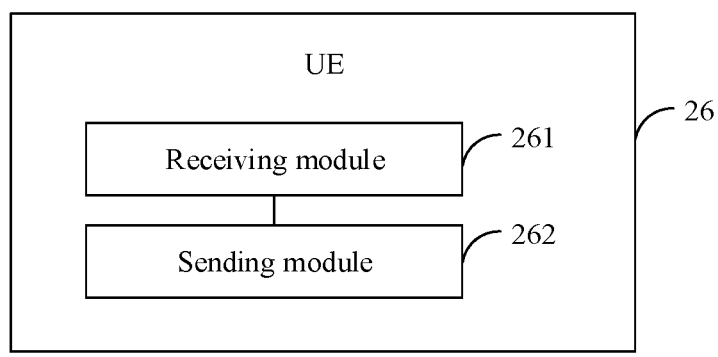
FIG. 26 is a second schematic structural diagram of UE according to an embodiment of the present invention.

When each functional module is obtained through division based on each corresponding function, FIG. 26 is a possible schematic composition diagram of the UE provided in the foregoing embodiments. As shown in FIG. 26, the UE 26 may include a receiving module 261 and a sending module 262.

The receiving module 261 is configured to support the UE 26 in performing step 701b, step 1102a, step 1301, step 1401, step 1502, and step 1602 in the foregoing embodiments, and/or is configured to perform another process in the technology described in this specification. The sending module 262 is configured to support the core network device 24 in performing step 701c, step 1103a, and step 1701 in the foregoing embodiments.

Figure 27:
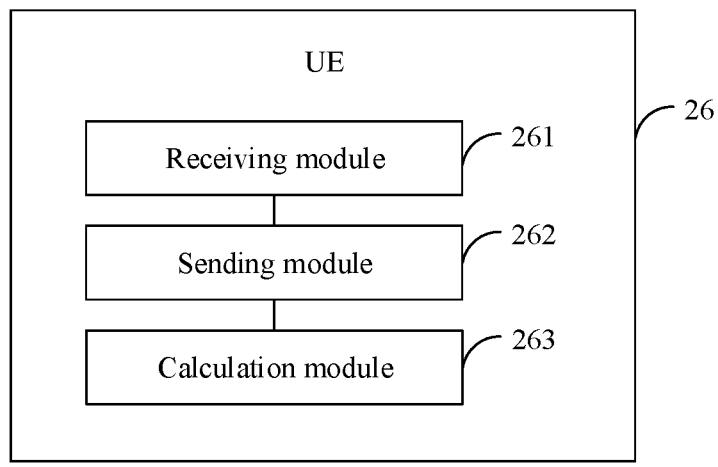
FIG. 27 is a third schematic structural diagram of UE according to an embodiment of the present invention.

Further, FIG. 27 is another possible schematic composition diagram of the UE provided in the foregoing embodiments. In FIG. 27, the UE 26 may further include a calculation module 263.

The calculation module 263 is configured to support the UE 26 in performing step 1302 and step 1402 in the foregoing embodiments, and/or is configured to perform another process in the technology described in this specification.

When an integrated unit is used, the calculation module 263 may be implemented by a processing module. The processing module may be a processor or a controller, for example, a CPU, a general-purpose processor, a DSP, an ASIC, an FPGA, another programmable logic device, transistor logic device, or hardware component, or any combination thereof. The controller/processor may implement or execute various illustrative logical blocks, modules, and circuits described with reference to content disclosed in the present invention. The processing unit may be a combination implementing a computing function, for example, a combination of one or more microprocessors, or a combination of a DSP and a microprocessor. The sending module 262 and the receiving module 261 may be integrated into one communications interface. A storage module may be a memory.

With reference to the UE shown in FIG. 5 in the foregoing embodiment, the processing module may be one or more processors such as the processor 51 and the processor 55 shown in FIG. 5. The storage module may be the memory 42 shown in FIG. 5. The sending module 262 and the receiving module 261 may be integrated into the communications interface 53 for implementation.

The communications bus 54 may be specifically a PCI bus, an EISA bus, or the like. The communications bus 44 may be classified into an address bus, a data bus, a control bus, and the like. This is not limited in this embodiment of the present invention.

It should be noted that, for detailed descriptions of the core network device 24 provided in this embodiment of the present invention and technical effects brought after the modules perform related method steps in the foregoing embodiments, refer to related descriptions in the method embodiments of the present invention. Details are not described herein.

The foregoing descriptions about implementations allow a person skilled in the art to understand that, for the purpose of convenient and brief description, division into the foregoing functional modules is taken as an example for illustration. In actual application, the foregoing functions can be allocated to different modules and implemented based on a requirement, that is, an inner structure of an apparatus is divided into different functional modules to implement all or some of the functions described above. For a detailed working process of the foregoing system, apparatuses, and units, refer to a corresponding process in the foregoing method embodiments, and details are not described herein again.

In the several embodiments provided in this application, it should be understood that the disclosed system, apparatuses, and methods may be implemented in other manners. For example, the described apparatus embodiments are merely examples. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A positioning assistance data sending method, comprising:
   receiving, by a positioning server, at least one positioning request from a core network device, wherein the positioning request comprises an identifier of a user equipment (UE) and an identifier of a first serving cell of the UE;
   receiving, by the positioning server, a first message from the UE, wherein the first message comprises positioning capability indication information of the UE;
   obtaining, by the positioning server, at least one piece of positioning assistance data by processing the at least one positioning request based on the positioning capability indication information of the UE; and
   sending, by the positioning server based on the identifier of the first serving cell in the at least one positioning request, the at least one piece of positioning assistance data to a base station corresponding to the first serving cell, wherein the at least one piece of positioning assistance data causes the base station to send the at least one piece of positioning assistance data in a broadcast mode, wherein sending the at least one piece of positioning assistance data in the broadcast mode causes a plurality of UEs in the first serving cell to receive the at least one piece of positioning assistance data.

2. The method according to claim 1, wherein the first message further comprises at least one of positioning precision indication information or service type indication information of the UE, wherein the positioning capability indication information is used to indicate a positioning capability of the UE, wherein the positioning precision indication information is used to indicate positioning precision supported by the UE, and wherein the service type indication information is used to indicate a service type supported by the UE.

3. The method according to claim 2, wherein after the sending, by the positioning server, the at least one piece of positioning assistance data to the base station based on the at least one positioning request, the method further comprises:
    sending, by the positioning server, a stop indication message to the base station corresponding to the first serving cell, wherein the stop indication message is used to indicate that sending of the at least one piece of positioning assistance data to the base station corresponding to the first serving cell is stopped.

4. A positioning assistance data sending method, comprising:
    receiving, by a base station, at least one piece of positioning assistance data from a positioning server, wherein the positioning assistance data corresponds to an identifier of a first serving cell of a user equipment (UE), wherein the at least one piece of positioning assistance data is obtained by the positioning server by processing at least one positioning request from the UE based on positioning capability indication information of the UE, wherein the at least one piece of positioning assistance data is sent by the positioning server to the base station based on the identifier of the first serving cell, and wherein the at least one piece of positioning assistance data causes the base station to send the at least one piece of positioning assistance data in a broadcast mode; and
    in response to receiving the at least one piece of positioning assistance data, broadcasting, by the base station, the at least one piece of positioning assistance data, wherein broadcasting the at least one piece of positioning assistance data causes a plurality of UEs in the first serving cell to receive the at least one piece of positioning assistance data.

5. The method according to claim 4, wherein the broadcasting, by the base station, the at least one piece of positioning assistance data comprises:
    for a base station corresponding to the first serving cell, broadcasting, by the base station corresponding to the first serving cell, at least one piece of positioning assistance data of different types.

6. The method according to claim 4, wherein the method further comprises:
    receiving, by the base station, instruction information, wherein the instruction information is used to indicate that the positioning server stops sending the at least one piece of positioning assistance data to the base station.

7. A positioning server, comprising one or more processors, a memory, a communications interface, and a bus, wherein:
    the memory is configured to store at least one instruction;
    the one or more processors, the memory, and the communications interface are connected by using the bus; and
    the at least one instruction, when executed by the one or more processors, instructs the one or more processor to:
        receive at least one positioning request from a core network device, wherein the positioning request comprises an identifier of a user equipment (UE) and an identifier of a first serving cell of the UE;
        receive a first message from the UE, wherein the first message comprises positioning capability indication information of the UE;
        obtain at least one piece of positioning assistance data by processing the at least one positioning request based on the positioning capability indication information of the UE; and
        send, based on the identifier of the first serving cell in the at least one positioning request, the at least one piece of positioning assistance data to a base station corresponding to the first serving cell, wherein the at least one piece of positioning assistance data causes the base station to send the at least one piece of positioning assistance data in a broadcast mode, wherein sending the at least one piece of positioning assistance data in the broadcast mode causes a plurality of UEs in the first serving cell to receive the at least one piece of positioning assistance data.

8. A base station, comprising one or more processors, a memory, a communications interface, and a bus, wherein:
    the memory is configured to store at least one instruction;
    the one or more processors, the memory, and the communications interface are connected by using the bus; and
    the at least one instruction, when executed by the one or more processors, instructs the one or more processor to:
        receive at least one piece of positioning assistance data from a positioning server, wherein the at least one piece of positioning assistance data corresponds to an identifier of a first serving cell of the UE, wherein the at least one piece of positioning assistance data is obtained by the positioning server by processing at least one positioning request from the UE based on positioning capability indication information of the UE, wherein the at least one piece of positioning assistance data is sent by the positioning server to the base station based on the identifier of the first serving cell, and wherein the at least one piece of positioning assistance data causes the base station to send the at least one piece of positioning assistance data in a broadcast mode; and
        in response to receiving the at least one piece of positioning assistance data, broadcast the at least one piece of positioning assistance data, wherein broadcasting the at least one piece of positioning assistance data causes a plurality of UEs in the first serving cell to receive the at least one piece of positioning assistance data.

9. A communication system, comprising a positioning server and a base station, wherein:
    the positioning server is configured to:
        receive at least one positioning request from a core network device, wherein the positioning request comprises an identifier of a user equipment (UE) and an identifier of a first serving cell of the UE;
        receive a first message from the UE, wherein the first message comprises positioning capability indication information of the UE;
        obtain, by the positioning server, at least one piece of positioning assistance data by processing the at least one positioning request based on the positioning capability indication information of the UE, wherein the at least one piece of positioning assistance data corresponds to the identifier of the first serving cell of the UE; and
        send, based the identifier of the first serving cell in the at least one positioning request, the at least one piece of positioning assistance data to a base station corresponding to the first serving cell, wherein the at least one piece of positioning assistance data causes the base station to send the at least one piece of positioning assistance data in a broadcast mode, wherein sending the at least one piece of positioning assistance data in the broadcast mode causes a plurality of UEs in the first serving cell to receive the at least one piece of positioning assistance data;

the base station is configured to:
    receive the at least one piece of positioning assistance data from the positioning server; and
    in response to receiving the at least one piece of positioning assistance data, broadcast the at least one piece of positioning assistance data, wherein broadcasting the at least one piece of positioning assistance data causes a plurality of UEs in the first serving cell to receive the at least one piece of positioning assistance data.

\* \* \* \* \*